United States Patent
Kawamura et al.

(10) Patent No.: US 9,321,960 B2
(45) Date of Patent: Apr. 26, 2016

(54) NEMATIC LIQUID CRYSTAL COMPOSITION AND LIQUID CRYSTAL DISPLAY DEVICE USING SAME

(71) Applicant: DIC CORPORATION, Tokyo (JP)

(72) Inventors: Joji Kawamura, Kitaadachi-gun (JP); Makoto Negishi, Kitaadachi-gun (JP); Masahiro Niwa, Kitaadachi-gun (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

(21) Appl. No.: 14/378,269

(22) PCT Filed: Dec. 11, 2012

(86) PCT No.: PCT/JP2012/082085
§ 371 (c)(1),
(2) Date: Aug. 12, 2014

(87) PCT Pub. No.: WO2014/091560
PCT Pub. Date: Jun. 19, 2014

(65) Prior Publication Data
US 2015/0001444 A1 Jan. 1, 2015

(51) Int. Cl.
C09K 19/44 (2006.01)
C09K 19/12 (2006.01)
C09K 19/30 (2006.01)
C09K 19/04 (2006.01)

(52) U.S. Cl.
CPC .............. *C09K 19/3066* (2013.01); *C09K 19/44* (2013.01); *C09K 2019/0448* (2013.01); *C09K 2019/0466* (2013.01); *C09K 2019/122* (2013.01); *C09K 2019/123* (2013.01); *C09K 2019/3004* (2013.01); *C09K 2019/3009* (2013.01); *C09K 2019/3016* (2013.01); *C09K 2019/3025* (2013.01); *C09K 2019/3071* (2013.01); *C09K 2019/3077* (2013.01); *C09K 2019/3078* (2013.01)

(58) Field of Classification Search
CPC .............. C09K 19/42; C09K 19/3066; C09K 2019/3016; C09K 2019/0466; C09K 2019/3025; C09K 2019/0448; C09K 2019/122; C09K 2019/123; C09K 2019/3004; C09K 2019/3009; C09K 19/44
USPC ......................... 252/299.63, 299.66; 428/1.1
See application file for complete search history.

(56) References Cited

U.S. PATENT DOCUMENTS

| | | | |
|---|---|---|---|
| 2007/0001149 A1* | 1/2007 | Manabe et al. | 252/299.66 |
| 2008/0303001 A1 | 12/2008 | Hattori et al. | |
| 2010/0271576 A1 | 10/2010 | Pauluth et al. | |
| 2012/0256124 A1* | 10/2012 | Ohgiri et al. | 252/299.61 |

FOREIGN PATENT DOCUMENTS

| | | |
|---|---|---|
| JP | 2003-301179 A | 10/2003 |
| JP | 2008-007752 A | 1/2008 |
| JP | 2011-508270 A | 3/2011 |
| JP | 2011-153202 A | 8/2011 |
| TW | 201202400 A1 | 1/2012 |
| TW | 201215667 A1 | 4/2012 |
| TW | 201229201 A1 | 7/2012 |
| TW | 2012235450 A1 | 9/2012 |
| TW | 201243034 A1 | 11/2012 |
| TW | 201247844 A1 | 12/2012 |
| WO | 2007/077872 A1 | 7/2007 |
| WO | 2008/114821 A1 | 9/2008 |

OTHER PUBLICATIONS

International Search Report dated Mar. 19, 2013, issued in corresponding application No. PCT/JP2012/082085.
Japanese Office Action dated Jul. 23, 2014, issued in Japanese Patent Application No. 2013-523803, w/English translation (4 pages).
Taiwanese Notice of Allowance dated Jul. 21, 2014, issued in Taiwanese Patent Application No. 101146593, w/English translation of search report (4 pages).

* cited by examiner

*Primary Examiner* — Shean C Wu
(74) *Attorney, Agent, or Firm* — Westerman, Hattori, Daniels & Adrian, LLP

(57) ABSTRACT

A composition containing a compound represented by general formula (i) and a compound represented by general formula (ii):

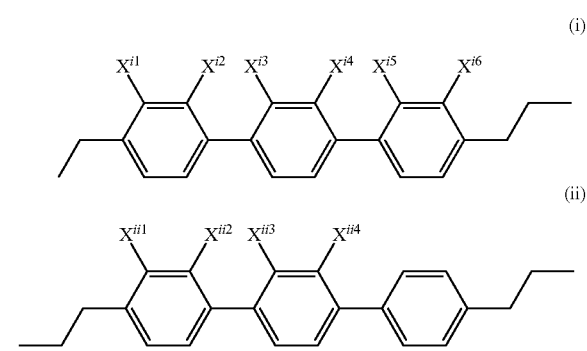

in the formulas, each of $X^{i1}$ to $X^{i6}$ independently represents a hydrogen atom, a fluorine atom or a chlorine atom, and each of $X^{ii1}$ to $X^{ii4}$ independently represents a hydrogen atom, a fluorine atom or a chlorine atom.

10 Claims, 1 Drawing Sheet

NEMATIC LIQUID CRYSTAL COMPOSITION AND LIQUID CRYSTAL DISPLAY DEVICE USING SAME

TECHNICAL FIELD

The present invention relates to a nematic liquid crystal composition which exhibits a positive value for the dielectric anisotropy (Δ∈) and is particularly useful as a liquid crystal display material, as well as a liquid crystal display device which uses this composition.

BACKGROUND ART

Liquid crystal display devices are used not only in watches and electronic calculators, but also in various measurement instruments, panels for vehicles, word processors, electronic organizers, printers, computers, televisions, clocks and advertising display boards and the like. Representative examples of the liquid crystal display method include the TN (twisted nematic) method, the STN (super twisted nematic) method, and methods using TFT (thin film transistor) such as the vertical alignment method and the IPS (in-plane switching) method. The liquid crystal compositions used in these liquid crystal display devices require good stability relative to external stimuli such as moisture, air, heat and light, must exhibit a liquid crystal phase across as broad a temperature range as possible, centered about room temperature, and also require low viscosity and a low drive voltage. Moreover, in order to ensure optimal values for the dielectric anisotropy (Δ∈) and the refractive index anisotropy (Δn) and the like for various display devices, the liquid crystal composition is typically composed of several compounds through to several tens of compounds.

In horizontal alignment displays such as TN, STN and IPS (in-plane switching) displays, a liquid crystal composition having a positive Δ∈ value is used. Further, a drive method has been reported in which a liquid crystal composition having a positive Δ∈ value is aligned vertically when no voltage is applied, and display is achieved by applying a horizontal electric field, and therefore the demand for liquid crystal compositions having a positive Δ∈ value is growing.

Furthermore, these drive methods require low-voltage driving, high-speed response, and a broad operating temperature range. In other words, a positive Δ∈ with a large absolute value, a low viscosity (η), and a high nematic phase-isotropic liquid phase transition temperature (Tni) are required. Further, from the viewpoint of setting the value of the product regarding Δn and the cell gap (d), namely Δn×d, the value of Δn for the liquid crystal composition must be adjusted to an appropriate range in accordance with the cell gap. In addition, when the liquid crystal display device is used in a television or the like, a high-speed response is particularly important, and therefore a liquid crystal composition having a small rotational viscosity (γ1) is required.

Examples of compositions that have been disclosed as liquid crystal compositions include liquid crystal compositions containing a compound represented by formula (A-1a) or (A-1b) shown below and a compound represented by one of formulas (B-1a) to (B-1c) shown below (see Patent Document 1), and

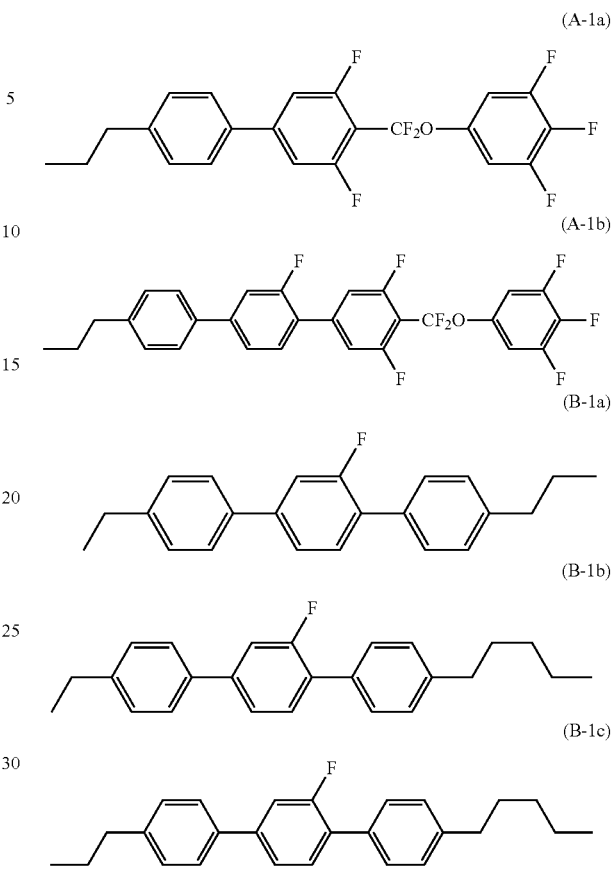

liquid compositions containing a compound represented by formula (A-3) shown below, a compound represented by formula (A-2a) or (A-2b) shown below, and a compound represented by formula (B-2a) shown below (see Patent Document 2).

[Chemical Formula 2]

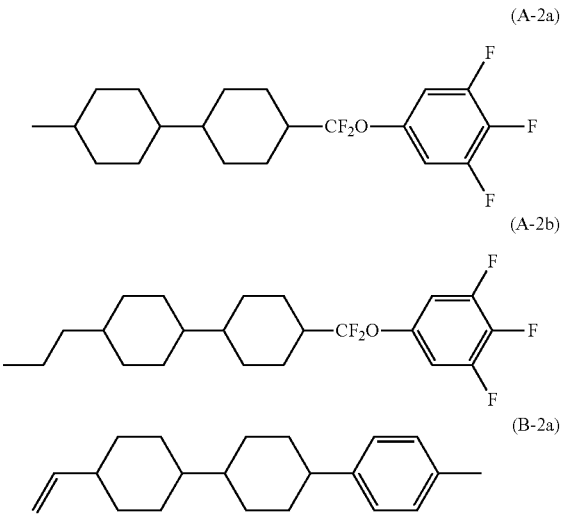

Features of these liquid crystal compositions include the fact that the cyclic structure of the liquid crystal compound having a positive ΔE value contains 3 rings and includes a —CF$_2$O— structure as a linking group.

On the other hand, as the number of applications for liquid crystal display devices continues to expand, large changes are being seen in the methods of using liquid crystal display devices, and the methods of producing these devices. In order to cope with these changes, properties other than the conventionally known basic physical properties now require optimization. In other words, the VA type, IPS type and the like are now widely used in liquid crystal display devices that use liquid crystal compositions, and extremely large display devices of 50 inches or more are now being used in practical applications. As the substrate size has increased, the method used for injecting the liquid crystal composition onto the substrate has also changed, with the predominant injection method changing from the conventional vacuum injection method to the one drop fill (ODF) method, but a problem has arisen in that dropping mark defects which occur when the liquid crystal composition is dropped onto the substrate can cause a deterioration in the display quality.

Moreover, in a liquid crystal display device production process using the ODF method, the liquid crystal must be dropped in an injection volume optimized for the size of the liquid crystal display device. If this injection volume varies significantly from the optimal value, then the balance between the preset refractive index and the drive electric field for the liquid crystal display device collapses, and display defects such as spot formation or contrast faults tend to occur.

Particularly in the case of small liquid crystal display devices such as those used widely in popular smart phones, because the optimal liquid crystal injection volume is small, controlling the variation in volume from the optimal value within a specific range is difficult.

Accordingly, in order to maintain a high yield for the liquid crystal display device, the liquid crystal composition must be minimally affected by the sudden pressure changes and impacts that occur inside the dropping apparatus when the liquid crystal is being dropped, and must be able to be dropped continuously in a stable manner over a long period of time.

In this manner, in the field of liquid crystal compositions for use in active matrix driven liquid crystal display devices driven by TFT devices or the like, not only the properties conventionally regarded as important for liquid crystal displays such as a high specific resistance value or high voltage holding rate, and good stability relative to external stimuli such as light and heat be realized, but also the development of liquid crystal compositions which consider the method used for producing the liquid crystal display device while maintaining the properties and performance required of liquid crystal displays such as high-speed response performance are now being demanded.

DOCUMENTS OF CONVENTIONAL ART

Patent Documents

Patent Document 1: Japanese Unexamined Patent Application, First Publication No. 2008-7752 (Example 1)
Patent Document 2: Japanese Unexamined Patent Application, First Publication No. 2011-153202 (Example 3)

SUMMARY OF THE INVENTION

Problems to be Solved by the Invention

An object of the present invention is to provide a composition which exhibits a positive ΔE value, and is stable relative to heat and light.

Means to Solve the Problems

The inventors of the present invention investigated all manner of compounds, and discovered that the above object could be achieved by combining specific compounds, thus enabling them to complete the present invention.

In other words, the present invention provides a composition containing a compound represented by general formula (i) shown below and a compound represented by general formula (ii) shown below.

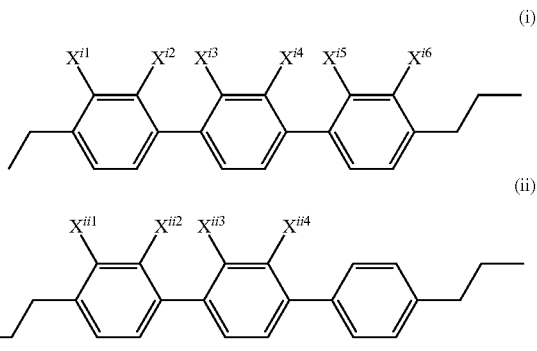

In the above formulas, each of $X^{i1}$ to $X^{i6}$ independently represents a hydrogen atom, a fluorine atom or a chlorine atom, and each of $X^{ii1}$ to $X^{ii4}$ independently represents a hydrogen atom, a fluorine atom or a chlorine atom.

Effects of the Invention

The composition of the present invention can obtain low viscosity, exhibits a stable nematic phase at low temperature, and undergoes extremely little variation in the specific resistance and the voltage holding rate following heating or UV irradiation, and therefore the practical applicability of the composition within products is high, and TN liquid crystal display devices and the like using the composition can achieve a high-speed response. Further, because the composition exhibits stable performance during the production process for a liquid crystal display device, display defects caused by the production process can be suppressed, and the liquid crystal display device can be produced in high yield, and therefore the composition is extremely useful.

EMBODIMENTS FOR CARRYING OUT THE INVENTION

Figure 1:
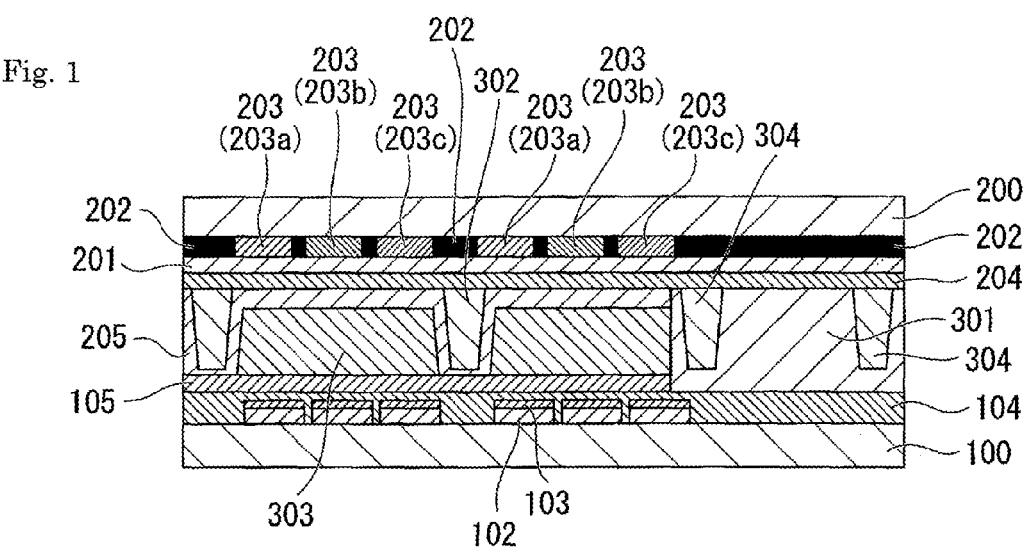
FIG. 1 is a cross-sectional view of a liquid crystal display device of the present invention. A substrate including 100 to 105 is termed the "back plane" and a substrate including 200 to 205 is termed the "front plane".

The composition of the present invention contains a compound represented by general formula (i) shown below.

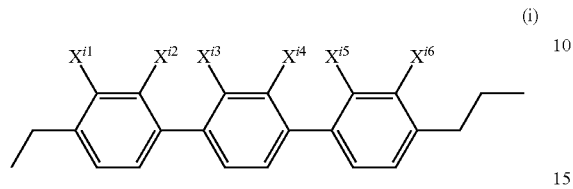
(i)

In general formula (i), each of $X^{i1}$ to $X^{i6}$ independently represents a hydrogen atom, a fluorine atom or a chlorine atom.

It is preferable that at least one of $X^{i1}$ to $X^{i6}$ in general formula (i) is a fluorine atom. Specific examples include compounds represented by formulas (i-1) to (i-25) shown below.

(i-1)

(i-2)

(i-3)

(i-4)

(i-5)

(i-6)

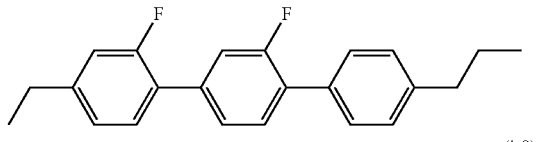
(i-7)

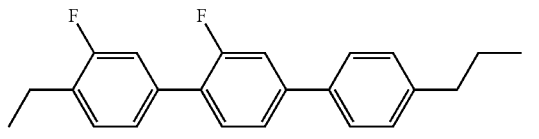
(i-8)

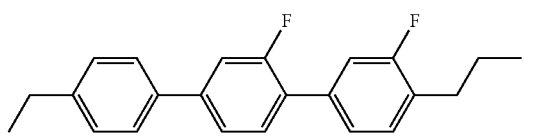
(i-9)

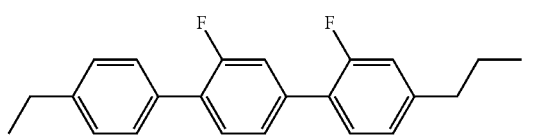
(i-10)

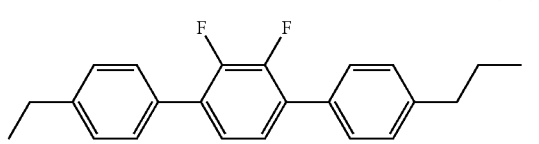
(i-11)

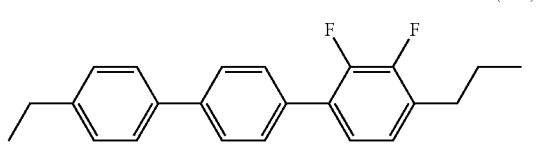
(i-12)

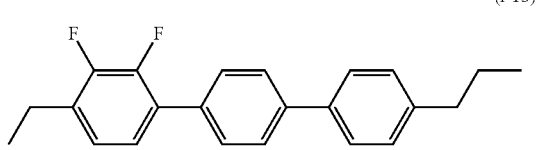
(i-13)

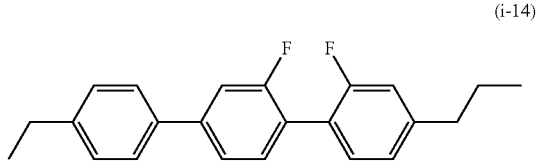
(i-14)

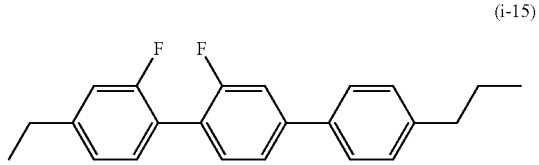
(i-15)

(i-16)

-continued

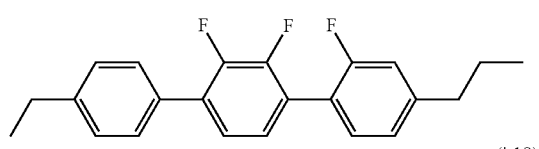
(i-17)

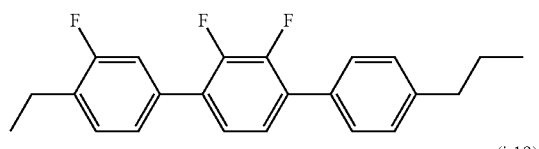
(i-18)

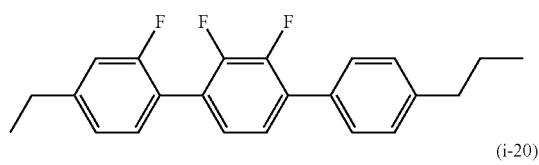
(i-19)

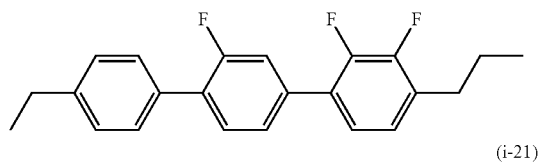
(i-20)

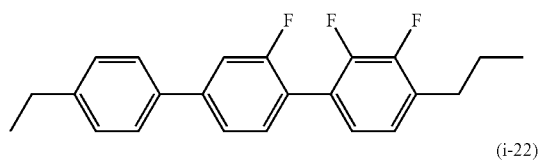
(i-21)

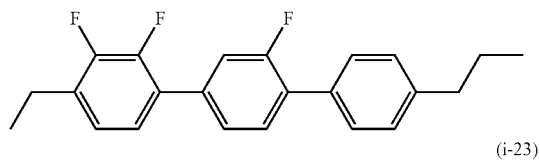
(i-22)

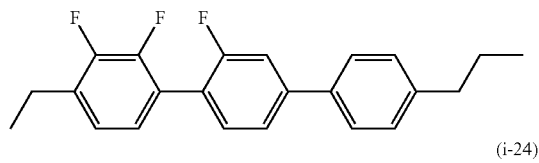
(i-23)

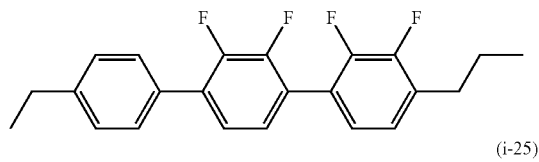
(i-24)

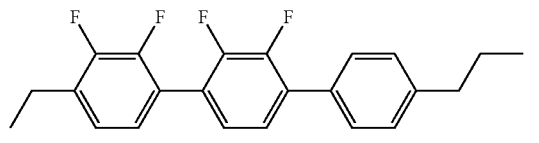
(i-25)

Among the compounds represented by formulas (i-1) to (i-25), the compounds represented by formulas (i-1) to (i-10) are preferable, the compounds represented by formula (i-1), formula (i-2), formula (i-4) and formula (i-5) are more preferable, the compounds represented by formula (i-1) and formula (i-2) are still more preferable, and the compound represented by formula (i-1) is the most preferable.

The composition may contain only a single compound represented by general formula (i), or two or more such compounds, but combining compounds appropriately in accordance with the performance required is preferable. The composition of the present invention preferably contains one to three types of compounds, and more preferably one or two compounds, from among the compounds represented by general formula (i).

The amount of the compound represented by general formula (i), relative to the total mass of the composition, is preferably at least 3% by mass, and more preferably 5% by mass or more, and is preferably not more than 30% by mass, more preferably 20% by mass or less, still more preferably 15% by mass or less, and most preferably 10% by mass or less.

The composition of the present invention contains a compound represented by general formula (ii) shown below.

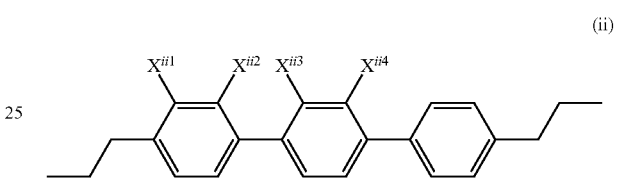
(ii)

In general formula (ii), each of $X^{ii1}$ to $X^{ii4}$ independently represents a hydrogen atom, a fluorine atom or a chlorine atom.

It is preferable that at least one of $X^{ii1}$ to $X^{ii4}$ in general formula (ii) is a fluorine atom. Specific examples include compounds represented by formulas (ii-1) to (ii-13) shown below.

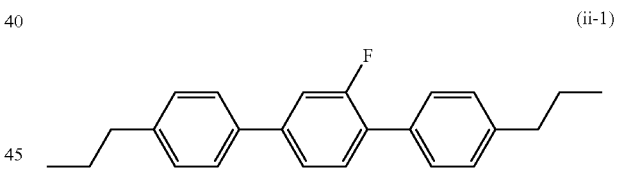
(ii-1)

(ii-2)

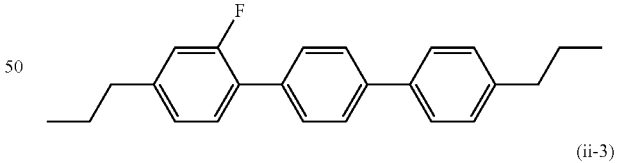
(ii-3)

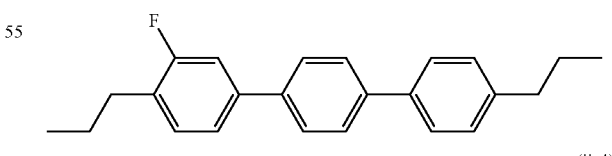
(ii-4)

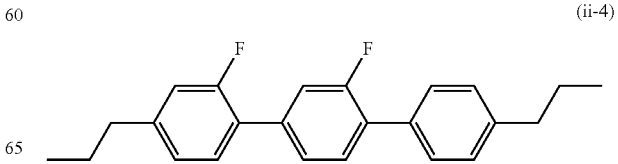

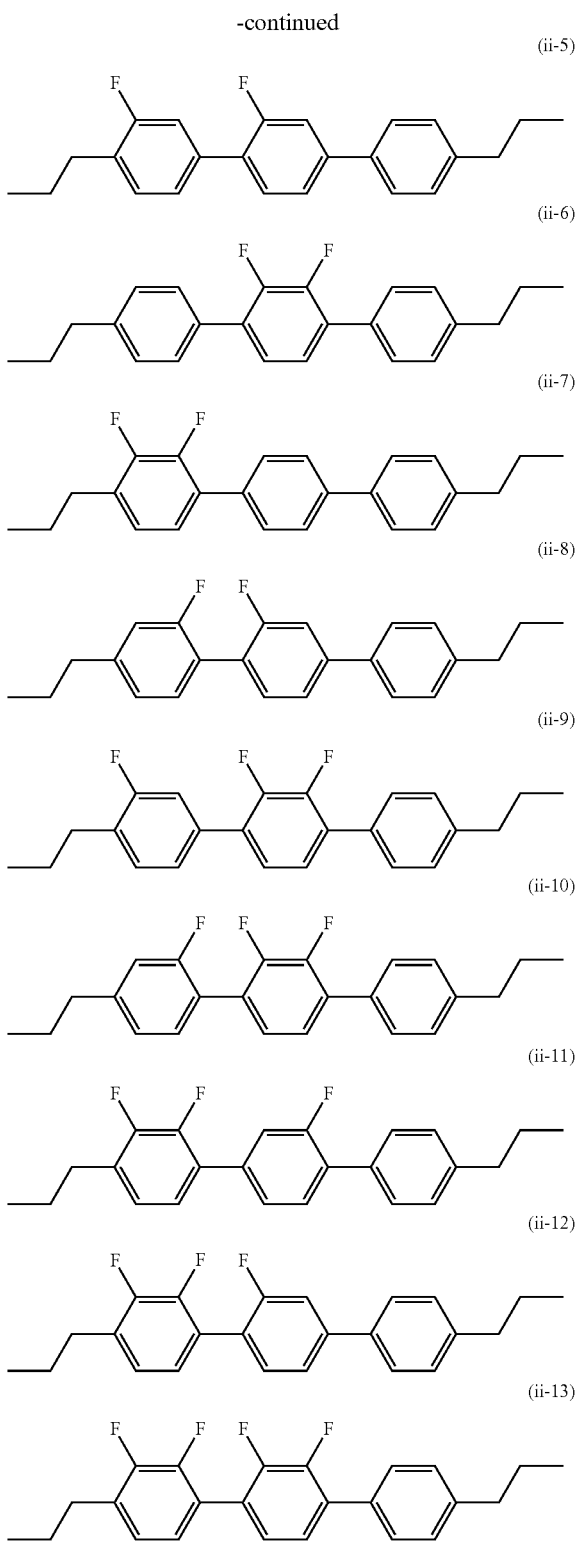

Among the compounds represented by the above formulas (ii-1) to (ii-13), the compounds represented by formulas (ii-1) to (ii-5) are preferable, the compounds represented by formula (ii-1), formula (ii-2) and formula (ii-4) are more preferable, the compounds represented by formula (ii-1) and formula (ii-2) are still more preferable, and the compound represented by formula (ii-1) is the most preferable.

The composition may contain only a single compound represented by general formula (ii), or two or more such compounds, but combining compounds appropriately in accordance with the performance required is preferable. The composition of the present invention preferably contains one to three types of compounds, and more preferably one or two compounds, from among the compounds represented by general formula (ii).

The amount of the compound represented by general formula (ii), relative to the total mass of the composition, is preferably at least 3% by mass, more preferably 5% by mass or more, still more preferably 7% by mass or more, and most preferably 8% by mass or more, and is preferably not more than 30% by mass, more preferably 20% by mass or less, still more preferably 15% by mass or less, and most preferably 10% by mass or less.

The composition of the present invention preferably contains a compound represented by general formula (i) and a compound represented by general formula (ii).

The compound represented by general formula (i) is a compound in which the side chains at the two molecular terminals are different alkyl groups (an ethyl group and an n-propyl group), whereas the compound represented by general formula (ii) is a compound in which the side chains at the two molecular terminals are alkyl groups of the same type (n-propyl groups). By combining these compounds, the temperature range of the nematic phase of the liquid crystal composition widens, and the storage stability also improves. The combination of the compound represented by general formula (i) and the compound represented by general formula (ii) and the compositional ratio between the compounds may be selected so that the compounds form a eutectic mixture. In a eutectic mixture, the melting point adopts a minimum value, and indicates a eutectic point that is markedly lower than the melting point of either of the components. In those cases where the liquid crystal composition also contains other compounds, including the compound represented by general formula (i) and the compound represented by general formula (ii) suppresses precipitation of compounds during storage, and can improve the storage stability of the composition.

The combination of $X^{i1}$ to $X^{i6}$ in general formula (i) and $X^{ii1}$ to $X^{ii4}$ in general formula (ii) is arbitrary, and the compound represented by general formula (i) and the compound represented by general formula (ii) may be a combination of homologues that differ only in the length of the side chain alkyl groups. In other words, possible combinations include the cases in which:

(a) $X^{ii1}$ in general formula (ii) is equivalent to $X^{i1}$ in general formula (i), $X^{ii2}$ in general formula (ii) is equivalent to $X^{i2}$ in general formula (i), $X^{ii3}$ in general formula (ii) is equivalent to $X^{i3}$ in general formula (i), $X^{ii4}$ in general formula (ii) is equivalent to $X^{i4}$ in general formula (i), and $X^{i5}$ and $X^{i6}$ in general formula (i) are both hydrogen atoms, or (b) $X^{ii1}$ in general formula (ii) is equivalent to $X^{i6}$ in general formula (i), $X^{ii2}$ in general formula (ii) is equivalent to $X^{i5}$ in general formula (i), $X^{ii3}$ in general formula (ii) is equivalent to $X^{i4}$ in general formula (i), $X^{ii4}$ in general formula (ii) is equivalent to $X^{i3}$ in general formula (i), and $X^{i1}$ and $X^{i2}$ in general formula (i) are both hydrogen atoms.

Further, in the compound represented by general formula (ii), by ensuring $X^{ii1}$ and $X^{ii2}$ are both hydrogen atoms, the benzene rings including the side chains can be made symmetrical.

The combined amount of the compound represented by general formula (i) and the compound represented by general formula (ii), relative to the total mass of the composition, is preferably at least 5% by mass, more preferably 10% by mass or more, and still more preferably 13% by mass or more, and is preferably not more than 30% by mass, more preferably 25% by mass or less, still more preferably 20% by mass or less, and most preferably 18% by mass or less.

A preferred combination of the compound represented by general formula (i) and the compound represented by general formula (ii) is a combination of the compound represented by formula (i-1) and the compound represented by formula (ii-1). The compound represented by formula (ii-1) has a high Tni value, and because the substituents substituted to the left and right of the central benzene ring of the terphenyl structure are the same, the compound can be produced with relative ease, meaning it can be obtained inexpensively. However, this compound has a property of readily forming crystals upon addition to a liquid crystal composition, and therefore precipitation of the compound from the liquid crystal composition is problematic. However, it was found that by using the compound in combination with the compound represented by general formula (i) in which only the carbon number of the side chain alkyl groups differs, precipitation could be suppressed.

The liquid crystal composition of the present invention may also contain one or more compounds represented by general formula (L).

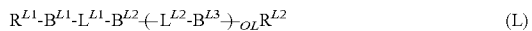  (L)

In the formula, each of $R^{L1}$ and $R^{L2}$ independently represents an alkyl group of 1 to 8 carbon atoms, wherein one —$CH_2$— group or two or more non-adjacent —$CH_2$— groups within the alkyl group may each be independently substituted with —CH=CH—, —C≡C—, —O—, —CO—, —COO— or —OCO—, OL represents 0, 1, 2 or 3, each of $B^{L1}$, $B^{L2}$ and $B^{L3}$ independently represents a group selected from the group consisting of:

(a) a 1,4-cyclohexylene group (wherein one —$CH_2$— group or two or more non-adjacent —$CH_2$— groups that exist within this group may each be substituted with —O—), and (b) a 1,4-phenylene group (wherein one —CH= group or two or more non-adjacent —CH= groups that exist within this group may each be substituted with —N=), wherein the aforementioned group (a) and group (b) may each be independently substituted with a cyano group, a fluorine atom or a chlorine atom, each of $L^{L1}$ and $L^{L2}$ independently represents a single bond, —$CH_2CH_2$—, —$(CH_2)_4$—, —$OCH_2$—, —$CH_2O$—, —COO—, —OCO—, —$OCF_2$—, —$CF_2O$—, —CH=N—N=CH—, —CH=CH—, —CF=CF— or —C≡C—, and when OL represents 2 or 3 and a plurality of $L^{L2}$ exists, the $L^{L2}$ may be the same or different, and when OL represents 2 or 3 and a plurality of $B^{L3}$ exists, the $B^{L3}$ may be the same or different, provided that the compound represented by general formula (L) excludes compounds represented by general formula (i) and compounds represented by general formula (ii).

There are no particular limitations on the types of these compounds that can be combined, and compounds can be combined and used as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 5 types of compounds may be used. In yet another embodiment of the present invention, 6 types of compounds may be used. In yet another embodiment of the present invention, 7 types of compounds may be used. In yet another embodiment of the present invention, 8 types of compounds may be used. In yet another embodiment of the present invention, 9 types of compounds may be used. Moreover, in yet another embodiment of the present invention, 10 or more types of compounds may be used.

In the liquid crystal composition of the present invention, it is necessary to appropriately adjust the amount of the compound represented by general formula (L) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 1%. Alternatively, in another embodiment of the present invention, the lower limit is 10%. Further, in yet another embodiment of the present invention, the lower limit is 20%. In yet another embodiment of the present invention, the lower limit is 30%. In yet another embodiment of the present invention, the lower limit is 40%. In yet another embodiment of the present invention, the lower limit is 50%. In yet another embodiment of the present invention, the lower limit is 55%. In yet another embodiment of the present invention, the lower limit is 60%. In yet another embodiment of the present invention, the lower limit is 65%. In yet another embodiment of the present invention, the lower limit is 70%. In yet another embodiment of the present invention, the lower limit is 75%. Moreover, in yet another embodiment of the present invention, the lower limit is 80%.

In addition, the upper limit for a preferred amount of the compound relative to the total mass of the liquid crystal composition of the present invention is 95% in one embodiment of the present invention. Further, in another embodiment of the present invention, the upper limit is 85%. In yet another embodiment of the present invention, the upper limit is 75%. In yet another embodiment of the present invention, the upper limit is 65%. In yet another embodiment of the present invention, the upper limit is 55%. In yet another embodiment of the present invention, the upper limit is 45%. In yet another embodiment of the present invention, the upper limit is 35%. Moreover, in yet another embodiment of the present invention, the upper limit is 25%.

When it is necessary to maintain the viscosity of the liquid crystal composition of the present invention at a low value, and obtain a liquid crystal composition having a fast response speed, it is preferable that the lower limit and the upper limit mentioned above are high values. Moreover, when it is necessary to maintain the Tni of the liquid crystal composition of the present invention at a high value, and obtain a liquid crystal composition having good temperature stability, it is preferable that the lower limit and the upper limit mentioned above are high values. Further, when it is desirable to have a large dielectric anisotropy in order to ensure a low drive voltage, it is preferable that the lower limit and the upper limit mentioned above are low values.

When the cyclic structures to which $R^{L1}$ and $R^{L2}$ are bonded are phenyl groups (aromatic groups), each of $R^{L1}$ and $R^{L2}$ is preferably a linear alkyl group of 1 to 5 carbon atoms, a linear alkoxy group of 1 to 4 (or more) carbon atoms, or an alkenyl group of 4 or 5 carbon atoms, whereas when the cyclic structures to which $R^{L1}$ and $R^{L2}$ are bonded are saturated cyclic structures such as cyclohexane, pyran or dioxane rings, each of $R^{L1}$ and $R^{L2}$ is preferably a linear alkyl group of 1 to 5 carbon atoms, a linear alkoxy group of 1 to 4 (or more) carbon atoms, or a linear alkenyl group of 2 to 5 carbon atoms.

When the liquid crystal composition requires good chemical stability, the compound represented by general formula (L) preferably does not contain a chlorine atom within the molecule.

The compound represented by general formula (L) is, for example, preferably a compound selected from the group of compounds represented by general formula (I).

$$R^{11}\text{-}A^{11}\text{-}A^{12}\text{-}R^{12} \qquad (I)$$

In the formula, each of $R^{11}$ and $R^{12}$ independently represents an alkyl group of 1 to 5 carbon atoms, an alkoxy group of 1 to 5 carbon atoms, or an alkenyl group of 2 to 5 carbon atoms, and each of $A^{11}$ and $A^{12}$ independently represents a 1,4-cyclohexylene group, 1,4-phenylene group, 2-fluoro-1,4-phenylene group or 3-fluoro-1,4-phenylene group.

There are no particular limitations on the types of these compounds that can be combined, and compounds can be combined and used as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 5 types of compounds may be used. Moreover, in yet another embodiment of the present invention, 6 or more types of compounds may be used.

In the liquid crystal composition of the present invention, it is necessary to appropriately adjust the amount of the compound represented by general formula (I) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 3%. Alternatively, in another embodiment of the present invention, the lower limit is 15%. Further, in yet another embodiment of the present invention, the lower limit is 18%. In yet another embodiment of the present invention, the lower limit is 20%. In yet another embodiment of the present invention, the lower limit is 29%. In yet another embodiment of the present invention, the lower limit is 35%. In yet another embodiment of the present invention, the lower limit is 42%. In yet another embodiment of the present invention, the lower limit is 47%. In yet another embodiment of the present invention, the lower limit is 53%. In yet another embodiment of the present invention, the lower limit is 56%. In yet another embodiment of the present invention, the lower limit is 60%. Moreover, in yet another embodiment of the present invention, the lower limit is 65%.

In addition, the upper limit for a preferred amount of the compound relative to the total mass of the liquid crystal composition of the present invention is 75% in one embodiment of the present invention. Further, in another embodiment of the present invention, the upper limit is 65%. In yet another embodiment of the present invention, the upper limit is 55%. In yet another embodiment of the present invention, the upper limit is 50%. In yet another embodiment of the present invention, the upper limit is 45%. In yet another embodiment of the present invention, the upper limit is 40%. In yet another embodiment of the present invention, the upper limit is 35%. Moreover, in yet another embodiment of the present invention, the upper limit is 30%.

When it is necessary to maintain the viscosity of the liquid crystal composition of the present invention at a low value, and obtain a liquid crystal composition having a fast response speed, it is preferable that the lower limit and the upper limit mentioned above are high values. Moreover, when it is necessary to maintain the Tni of the liquid crystal composition of the present invention at a high value, and obtain a liquid crystal composition having good temperature stability, it is preferable that the lower limit and the upper limit mentioned above are mid-range values. Further, when it is desirable to have a large dielectric anisotropy in order to ensure a low drive voltage, it is preferable that the lower limit and the upper limit mentioned above are low values.

Moreover, the compound represented by general formula (I) is preferably a compound selected from the group of compounds represented by general formula (I-1).

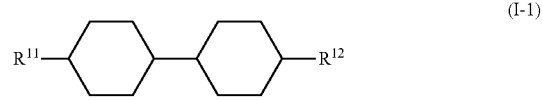

(I-1)

In the formula, each of $R^{11}$ and $R^{12}$ independently represents an alkyl group of 1 to 5 carbon atoms, an alkoxy group of 1 to 5 carbon atoms, or an alkenyl group of 2 to 5 carbon atoms.

There are no particular limitations on the types of these compounds that can be combined, and compounds can be combined and used as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. In yet another embodiment of the present invention, three types of compounds may be used. In yet another embodiment of the present invention, 4 types of compounds may be used. Furthermore, in yet another embodiment of the present invention, 5 or more types of compounds may be used.

In the liquid crystal composition of the present invention, it is necessary to appropriately adjust the amount of the compound represented by general formula (I-1) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 3%. Alternatively, in another embodiment of the present invention, the lower limit is 15%. Further, in yet another embodiment of the present invention, the lower limit is 18%. In yet another embodiment of the present invention, the lower limit is 25%. In yet another embodiment of the present invention, the lower limit is 29%. In yet another embodiment of the present invention, the lower limit is 31%. In yet another embodiment of the present invention, the lower limit is 35%. In yet another embodiment of the present invention, the lower limit is 43%. In yet another embodiment of the present invention, the lower limit is 47%. In yet another embodiment of the present invention, the lower limit is 50%. In yet another embodiment of the present invention, the lower limit is 53%. Moreover, in yet another embodiment of the present invention, the lower limit is 56%.

In addition, the upper limit for a preferred amount of the compound relative to the total mass of the liquid crystal composition of the present invention is 70% in one embodiment of the present invention. Further, in another embodiment of the present invention, the upper limit is 60%. In yet another embodiment of the present invention, the upper limit is 50%. In yet another embodiment of the present invention, the upper limit is 45%. In yet another embodiment of the present invention, the upper limit is 40%. In yet another embodiment of the present invention, the upper limit is 35%. In yet another embodiment of the present invention, the upper limit is 30%. Moreover, in yet another embodiment of the present invention, the upper limit is 26%.

When it is necessary to maintain the viscosity of the liquid crystal composition of the present invention at a low value, and obtain a liquid crystal composition having a fast response speed, it is preferable that the lower limit and the upper limit mentioned above are high values. Moreover, when it is necessary to maintain the Tni of the liquid crystal composition of the present invention at a high value, and obtain a liquid crystal composition having good temperature stability, it is preferable that the lower limit and the upper limit mentioned above are mid-range values. Further, when it is desirable to have a large dielectric anisotropy in order to ensure a low drive voltage, it is preferable that the lower limit and the upper limit mentioned above are low values.

Moreover, the compound represented by general formula (I-1) is preferably a compound selected from the group of compounds represented by general formula (I-1-1).

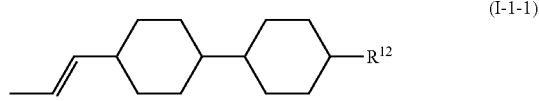

(I-1-1)

In the formula, $R^{12}$ represents an alkyl group of 1 to 5 carbon atoms, an alkenyl group of 2 to 5 carbon atoms, or an alkoxy group of 1 to 5 carbon atoms.

In the liquid crystal composition of the present invention, it is necessary to appropriately adjust the amount of the compound represented by general formula (I-1-1) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 2%. Alternatively, in another embodiment of the present invention, the lower limit is 4%. Further, in yet another embodiment of the present invention, the lower limit is 7%. In yet another embodiment of the present invention, the lower limit is 11%. In yet another embodiment of the present invention, the lower limit is 13%. In yet another embodiment of the present invention, the lower limit is 15%. In yet another embodiment of the present invention, the lower limit is 17%. In yet another embodiment of the present invention, the lower limit is 20%. In yet another embodiment of the present invention, the lower limit is 25%. In yet another embodiment of the present invention, the lower limit is 30%. In yet another embodiment of the present invention, the lower limit is 32%. Moreover, in yet another embodiment of the present invention, the lower limit is 35%.

In addition, the upper limit for a preferred amount of the compound relative to the total mass of the liquid crystal composition of the present invention is 60% in one embodiment of the present invention. Further, in another embodiment of the present invention, the upper limit is 50%. In yet another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 25%. In yet another embodiment of the present invention, the upper limit is 20%. Moreover, in yet another embodiment of the present invention, the upper limit is 15%.

Moreover, the compound represented by general formula (I-1-1) is preferably a compound selected from the group of compounds represented by formula (1.1) to formula (1.3), is more preferably a compound represented by formula (1.2) or formula (1.3), and is particularly preferably a compound represented by formula (1.3).

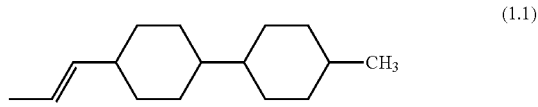

(1.1)

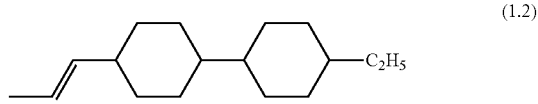

(1.2)

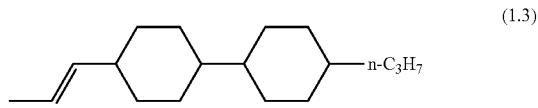

(1.3)

When the compound represented by formula (1.2) or formula (1.3) is used alone, using a larger amount of the compound represented by formula (1.2) has the effect of improving the response speed, whereas the amount of the compound represented by formula (1.3) preferably satisfies the range indicated below, as this yields a liquid crystal composition having a fast response speed, and superior electrical and optical reliability.

The amount of the compound represented by formula (1.3) relative to the total mass of the liquid crystal composition of the present invention is preferably at least 1% by mass, more preferably 2% by mass or more, and particularly preferably 4% by mass or more. Further, the maximum amount of the compound that can be included is preferably not more than 35% by mass, more preferably 25% by mass or less, and still more preferably 20% by mass or less.

Moreover, the compound represented by general formula (I-1) is preferably a compound selected from the group of compounds represented by general formula (I-1-2).

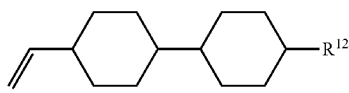

(I-1-2)

In the formula, $R^{12}$ represents an alkyl group of 1 to 5 carbon atoms, an alkoxy group of 1 to 5 carbon atoms, or an alkenyl group of 2 to 5 carbon atoms.

There are no particular limitations on the types of these compounds that can be combined, and compounds can be combined and used as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used.

In the liquid crystal composition of the present invention, it is necessary to appropriately adjust the amount of the compound represented by general formula (I-1-2) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 7%. Alternatively, in another embodiment of the present invention, the lower limit is 15%. Further, in yet another embodiment of the present invention, the lower limit is 18%. In yet another embodiment of the present invention, the lower limit is 21%. In yet another embodiment of the present invention, the lower limit is 24%. In yet another embodiment of the present invention, the lower limit is 27%. In yet another embodiment of the present invention, the lower limit is 30%. In yet another embodiment of the present invention, the lower limit is 34%. In yet another embodiment of the present invention, the lower limit is 37%. In yet another embodiment of the present invention, the lower limit is 41%. In yet another embodiment of the present invention, the lower limit is 47%. Moreover, in yet another embodiment of the present invention, the lower limit is 50%.

In addition, the upper limit for a preferred amount of the compound relative to the total mass of the liquid crystal composition of the present invention is 60% in one embodiment of the present invention. Further, in another embodiment of the present invention, the upper limit is 55%. In yet another embodiment of the present invention, the upper limit is 45%. In yet another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 25%. Moreover, in yet another embodiment of the present invention, the upper limit is 20%.

Moreover, the compound represented by general formula (I-1-2) is preferably a compound selected from the group of compounds represented by formula (2.1) to formula (2.5), and is more preferably a compound represented by formula (2.2) to formula (2.5). In particular, the compound represented by formula (2.2) yields a particular improvement in the response speed of the liquid crystal composition of the present invention, and is consequently preferred. Further, when a high Tni is required rather than a fast response speed, the use of a compound represented by formula (2.3) or formula (2.4) is preferable. In order to ensure good solubility at low temperature, it is not desirable to increase the amount of the compound represented by formula (2.4) or formula (2.5) beyond 30%.

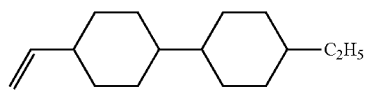

(2.1)

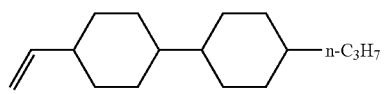

(2.2)

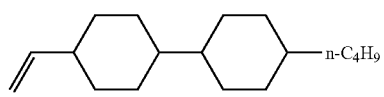

(2.3)

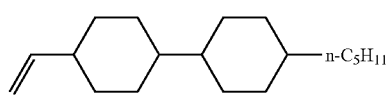

(2.4)

In the liquid crystal composition of the present invention, the amount of the compound represented by formula (2.2) relative to the total mass of the liquid crystal composition of the present invention is preferably at least 5% by mass, more preferably 10% by mass or more, still more preferably 14% by mass or more, still more preferably 17% by mass or more, still more preferably 19% by mass or more, still more preferably 22% by mass or more, still more preferably 25% by mass or more, still more preferably 27% by mass or more, and particularly preferably 30% by mass or more. Further, the maximum amount of the compound that can be included is preferably not more than 55% by mass, more preferably 50% by mass or less, still more preferably 45% by mass or less, still more preferably 40% by mass or less, and particularly preferably 36% by mass or less.

The liquid crystal composition of the present invention may also contain a compound represented by formula (2.5), which has a structure similar to that of the compound represented by general formula (I-1-2).

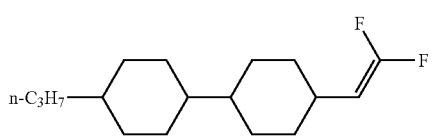

(2.5)

The amount of the compound represented by formula (2.5) is preferably adjusted in accordance with the desired level of performance for properties such as the solubility at low temperature, the transition temperature, the electrical reliability and the birefringence, and the amount of this compound relative to the total mass of the liquid crystal composition of the present invention is preferably at least 11% by mass, more preferably 15% by mass or more, still more preferably 23% by mass or more, still more preferably 26% by mass or more, and particularly preferably 28% by mass or more.

Moreover, the compound represented by general formula (I) is preferably a compound selected from the group of compounds represented by general formula (I-2).

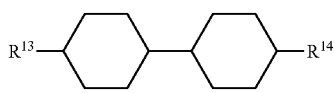

(I-2)

In the formula, each of $R^{13}$ and $R^{14}$ independently represents an alkyl group of 1 to 5 carbon atoms.

There are no particular limitations on the types of these compounds that can be combined, and compounds can be combined as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used.

In the liquid crystal composition of the present invention, it is necessary to appropriately adjust the amount of the compound represented by general formula (I-2) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the above compound relative to the total mass of the liquid crystal composition of the present invention is 3%. Alternatively, in another embodiment of the present invention, the lower limit is 4%. Further, in yet another embodiment of the present invention, the lower limit is 15%. In yet another embodiment of the present invention, the lower limit is 25%. In yet another embodiment of the present invention, the lower limit is 30%. In yet another embodiment of the present invention, the lower limit is 35%. In yet another embodiment of the present invention, the lower limit is 38%. In yet another embodiment of the present invention, the lower limit is 40%. In yet another embodiment of the present invention, the lower limit is 42%. In yet another embodiment of the present invention, the lower limit is 45%. In yet another embodiment of the present invention, the lower limit is 47%. Moreover, in yet another embodiment of the present invention, the lower limit is 50%.

In addition, the upper limit for a preferred amount of the compound relative to the total mass of the liquid crystal composition of the present invention is 60% in one embodiment of the present invention. Further, in another embodiment of the present invention, the upper limit is 55%. In yet another embodiment of the present invention, the upper limit is 45%. In yet another embodiment of the present invention, the upper limit is 40%. In yet another embodiment of the present invention, the upper limit is 30%. In yet another embodiment of the present invention, the upper limit is 20%. In yet another embodiment of the present invention, the upper limit is 15%. Moreover, in yet another embodiment of the present invention, the upper limit is 5%. In addition, the compound represented by general formula (I-2) is preferably a compound selected from the group of compounds represented by formula (3.1) to formula (3.4), and is more preferably a compound represented by formula (3.1), formula (3.3) or formula (3.4). In particular, the compound represented by formula (3.2) yields a particular improvement in the response speed of the liquid crystal composition of the present invention, and is consequently preferred. Further, when a high Tni is required rather than a fast response speed, the use of a compound represented by formula (3.3) or formula (3.4) is preferable. In order to ensure good solubility at low temperature, it is not desirable to increase the amount of the compound represented by formula (3.3) or formula (3.4) beyond 20%.

Moreover, the compound represented by general formula (I-2) is preferably a compound selected from the group of compounds represented by formula (3.1) to formula (3.4), and is more preferably a compound represented by formula (3.1), formula (3.3) and/or formula (3.4).

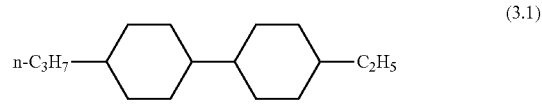

(3.1)

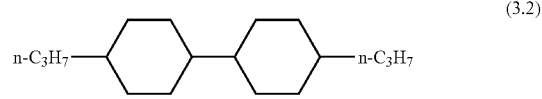

(3.2)

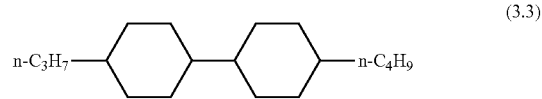

(3.3)

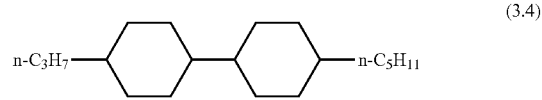

(3.4)

In the liquid crystal composition of the present invention, the amount of the compound represented by formula (3.3) relative to the total mass of the liquid crystal composition of the present invention is preferably at least 2% by mass, more preferably 3% by mass or more, still more preferably 4% by mass or more, still more preferably 10% by mass or more, still more preferably 12% by mass or more, still more preferably 14% by mass or more, still more preferably 16% by mass or more, still more preferably 20% by mass or more, still more preferably 23% by mass or more, still more preferably 26% by mass or more, and particularly preferably 30% by mass or more. Further, the maximum amount of the compound that can be included is preferably not more than 40% by mass, more preferably 37% by mass or less, still more preferably 34% by mass or less, and particularly preferably 32% by mass or less.

Moreover, the compound represented by general formula (I) is preferably a compound selected from the group of compounds represented by general formula (I-3).

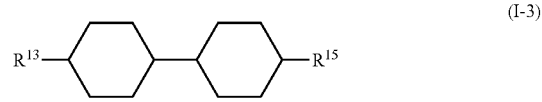

(I-3)

In the formula, $R^{13}$ represents an alkyl group of 1 to 5 carbon atoms, and $R^{15}$ represents an alkoxy group of 1 to 4 carbon atoms.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used.

In the liquid crystal composition of the present invention, it is necessary to appropriately adjust the amount of the compound represented by general formula (I-3) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 3%. Alternatively, in another embodiment of the present invention, the lower limit is 4%. Further, in yet another embodiment of the present invention, the lower limit is 15%. In yet another embodiment of the present invention, the lower limit is 25%. In yet another embodiment of the present invention, the lower limit is 30%. In yet another embodiment of the present invention, the lower limit is 35%. In yet another embodiment of the present invention, the lower limit is 38%. In yet another embodiment of the present invention, the lower limit is 40%. In yet another embodiment of the present invention, the lower limit is 42%. In yet another embodiment of the present invention, the lower limit is 45%. In yet another embodiment of the present invention, the lower limit is 47%. Moreover, in yet another embodiment of the present invention, the lower limit is 50%.

In addition, the upper limit for a preferred amount of the compound relative to the total mass of the liquid crystal composition of the present invention is 60% in one embodiment of the present invention. Further, in another embodiment of the present invention, the upper limit is 55%. In yet another embodiment of the present invention, the upper limit is 45%. In yet another embodiment of the present invention, the upper limit is 40%. In yet another embodiment of the present invention, the upper limit is 30%. In yet another embodiment of the present invention, the upper limit is 20%. In yet another embodiment of the present invention, the upper limit is 15%. Moreover, in yet another embodiment of the present invention, the upper limit is 5%.

When the solubility at low temperature is deemed important, setting the amount to a larger value yields a superior effect, whereas in contrast, when response speed is deemed important, setting the amount to a smaller value yields a superior effect. Moreover, when it is desirable to improve the level of dropping mark defects and the burn-in properties, the amount is preferably set to a mid-range value.

Moreover, the compound represented by general formula (I-3) is preferably a compound selected from the group of compounds represented by formula (4.1) to formula (4.3), and is more preferably a compound represented by formula (4.3).

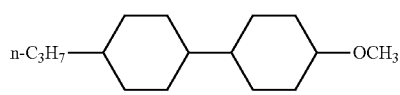

(4.1)

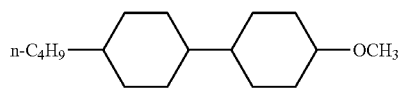

(4.2)

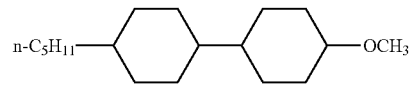

(4.3)

The amount of the compound represented by formula (4.3) relative to the total mass of the liquid crystal composition of the present invention is preferably at least 2% by mass, more preferably 4% by mass or more, still more preferably 6% by mass or more, still more preferably 8% by mass or more, still more preferably 10% by mass or more, still more preferably 12% by mass or more, still more preferably 14% by mass or more, still more preferably 16% by mass or more, still more preferably 18% by mass or more, still more preferably 20% by mass or more, and particularly preferably 22% by mass or more. Further, the maximum amount of the compound that can be included is preferably not more than 30% by mass, more preferably 25% by mass or less, still more preferably 24% by mass or less, and particularly preferably 23% by mass or less.

Moreover, the compound represented by general formula (I) is preferably a compound selected from the group of compounds represented by general formula (I-4).

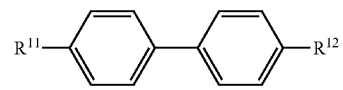

(I-4)

In the formula, each of $R^{11}$ and $R^{12}$ independently represents an alkyl group of 1 to 5 carbon atoms, an alkenyl group of 4 or 5 carbon atoms, or an alkoxy group of 1 to 4 carbon atoms.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used.

In the liquid crystal composition of the present invention, it is necessary to appropriately adjust the amount of the compound represented by general formula (I-4) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 3%. Alternatively, in another embodiment of the present invention, the lower limit is 5%. Further, in yet another embodiment of the present invention, the lower limit is 6%. In yet another embodiment of the present invention, the lower limit is 8%. In yet another embodiment of the present invention, the lower limit is 10%. In yet another embodiment of the present invention, the lower limit is 12%. In yet another embodiment of the present invention, the lower limit is 15%. In yet another embodiment of the present invention, the lower limit is 20%. In yet another embodiment of the present invention, the lower limit is 25%.

In yet another embodiment of the present invention, the lower limit is 30%. In yet another embodiment of the present invention, the lower limit is 35%. Moreover, in yet another embodiment of the present invention, the lower limit is 40%.

In addition, the upper limit for a preferred amount of the compound relative to the total mass of the liquid crystal composition of the present invention is 50% in one embodiment of the present invention. Further, in another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 20%. In yet another embodiment of the present invention, the upper limit is 15%. In yet another embodiment of the present invention, the upper limit is 10%. Moreover, in yet another embodiment of the present invention, the upper limit is 5%.

When a high birefringence is required, setting the amount to a larger value yields a superior effect, whereas in contrast, when a high Tni value is deemed important, setting the amount to a smaller value yields a superior effect. Moreover, when it is desirable to improve the level of dropping mark defects and the burn-in properties, the amount is preferably set to a mid-range value.

Moreover, the compound represented by general formula (I-4) is preferably a compound selected from the group of compounds represented by formula (5.1) to formula (5.4), and is more preferably a compound represented by formula (5.2) to formula (5.4).

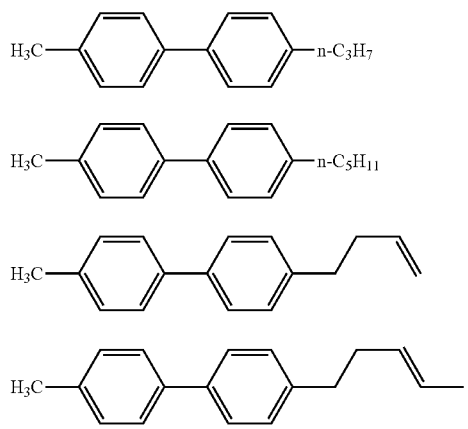

The amount of the compound represented by formula (5.4) relative to the total mass of the liquid crystal composition of the present invention is preferably at least 2% by mass, more preferably 4% by mass or more, still more preferably 6% by mass or more, still more preferably 7% by mass or more, and particularly preferably 8% by mass or more. Further, the maximum amount of the compound that can be included is preferably not more than 30% by mass, more preferably 25% by mass or less, still more preferably 20% by mass or less, and particularly preferably 18% by mass or less.

Moreover, the compound represented by general formula (I) is preferably a compound selected from the group of compounds represented by general formula (I-5).

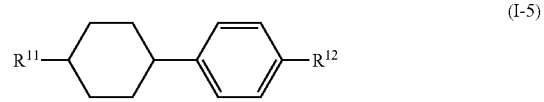

In the formula, each of $R^{11}$ and $R^{12}$ independently represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used.

In the liquid crystal composition of the present invention, it is necessary to appropriately adjust the amount of the compound represented by general formula (I-5) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 1%. Alternatively, in another embodiment of the present invention, the lower limit is 5%. Further, in yet another embodiment of the present invention, the lower limit is 8%. In yet another embodiment of the present invention, the lower limit is 11%. In yet another embodiment of the present invention, the lower limit is 13%. In yet another embodiment of the present invention, the lower limit is 15%. In yet another embodiment of the present invention, the lower limit is 17%. In yet another embodiment of the present invention, the lower limit is 20%. In yet another embodiment of the present invention, the lower limit is 25%. In yet another embodiment of the present invention, the lower limit is 30%. In yet another embodiment of the present invention, the lower limit is 35%. Moreover, in yet another embodiment of the present invention, the lower limit is 40%.

In addition, the upper limit for a preferred amount of the compound relative to the total mass of the liquid crystal composition of the present invention is 50% in one embodiment of the present invention. Further, in another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 20%. In yet another embodiment of the present invention, the upper limit is 15%. In yet another embodiment of the present invention, the upper limit is 10%. Moreover, in yet another embodiment of the present invention, the upper limit is 5%.

When the solubility at low temperature is deemed important, setting the amount to a larger value yields a superior effect, whereas in contrast, when the response speed is deemed important, setting the amount to a smaller value yields a superior effect. Moreover, when it is desirable to improve the level of dropping mark defects and the burn-in properties, the amount is preferably set to a mid-range value.

Moreover, the compound represented by general formula (I-5) is preferably a compound selected from the group of compounds represented by formula (6.1) to formula (6.7), and is more preferably a compound represented by formula (6.3), formula (6.4) or formula (6.6).

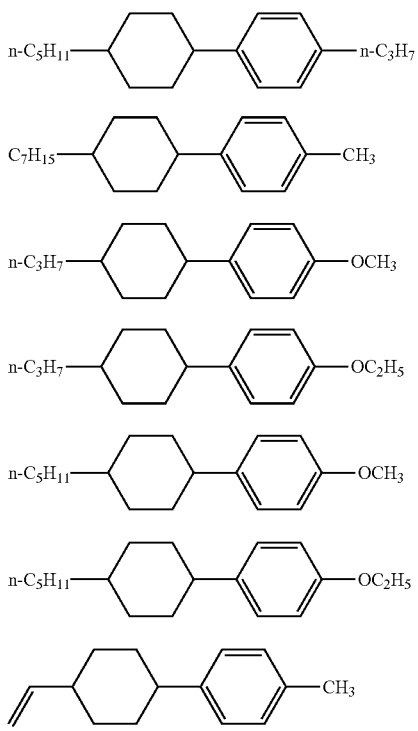

For example, the amount of the compound represented by formula (6.6) relative to the total mass of the liquid crystal composition of the present invention is preferably at least 2% by mass, more preferably 4% by mass or more, still more preferably 5% by mass or more, still more preferably 6% by mass or more, still more preferably 9% by mass or more, still more preferably 12% by mass or more, still more preferably 14% by mass or more, still more preferably 16% by mass or more, still more preferably 18% by mass or more, still more preferably 20% by mass or more, and particularly preferably 22% by mass or more. Further, the maximum amount of the compound that can be included is preferably not more than 30% by mass, more preferably 25% by mass or less, still more preferably 24% by mass or less, and particularly preferably 23% by mass or less.

The amount of the compound represented by formula (6.7) is preferably adjusted in accordance with the level of performance required for properties such as the solubility at low temperature, the transition temperature, the electrical reliability and the birefringence, and the amount of this compound relative to the total mass of the liquid crystal composition of the present invention is preferably at least 2% by mass, more preferably 3% by mass or more, still more preferably 5% by mass or more, and particularly preferably 7% by mass or more.

Moreover, the compound represented by general formula (I) is preferably a compound selected from the group of compounds represented by general formula (I-6).

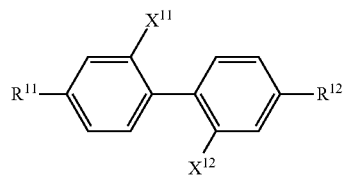

In the formula, each of $R^{11}$ and $R^{12}$ independently represents an alkyl group of 1 to 5 carbon atoms, an alkenyl group of 4 or 5 carbon atoms, or an alkoxy group of 1 to 4 carbon atoms, and each of $X^{11}$ and $X^{12}$ independently represents a fluorine atom or a hydrogen atom, provided that one of $X^{11}$ and $X^{12}$ represents a fluorine atom.

The amount of the compound represented by general formula (I-6) relative to the total mass of the liquid crystal composition of the present invention is preferably at least 2% by mass, more preferably 4% by mass or more, still more preferably 5% by mass or more, still more preferably 6% by mass or more, still more preferably 9% by mass or more, still more preferably 12% by mass or more, still more preferably 14% by mass or more, still more preferably 16% by mass or more, still more preferably 18% by mass or more, still more preferably 20% by mass or more, and particularly preferably 22% by mass or more. Further, the maximum amount of the compound that can be included is preferably not more than 30% by mass, more preferably 25% by mass or less, still more preferably 24% by mass or less, and particularly preferably 23% by mass or less.

Moreover, the compound represented by general formula (I-6) is preferably a compound represented by formula (7.1).

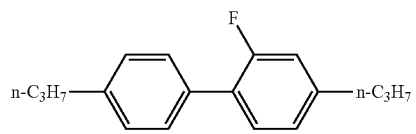

Moreover, the compound represented by general formula (I) is preferably a compound selected from the group of compounds represented by general formula (I-7).

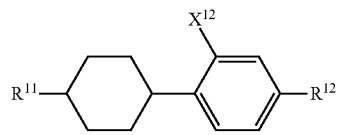

In the formula, each of $R^{11}$ and $R^{12}$ independently represents an alkyl group of 1 to 5 carbon atoms, an alkenyl group of 2 to 5 carbon atoms, or an alkoxy group of 1 to 4 carbon atoms, and $X^{12}$ represents a fluorine atom or a chlorine atom.

The amount of the compound represented by general formula (I-7) relative to the total mass of the liquid crystal composition of the present invention is preferably at least 1% by mass, more preferably 2% by mass or more, still more preferably 3% by mass or more, still more preferably 4% by mass or more, still more preferably 6% by mass or more, still more preferably 8% by mass or more, still more preferably 10% by mass or more, still more preferably 12% by mass or more, still more preferably 15% by mass or more, still more preferably 18% by mass or more, and particularly preferably 21% by mass or more. Further, the maximum amount of the compound that can be included is preferably not more than 30% by mass, more preferably 25% by mass or less, still more preferably 24% by mass or less, and particularly preferably 22% by mass or less.

Moreover, the compound represented by general formula (I-7) is preferably a compound represented by formula (8.1).

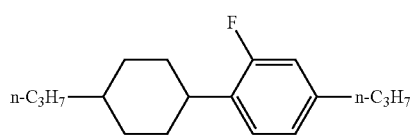

(8.1)

Moreover, the compound represented by general formula (I) is preferably a compound selected from the group of compounds represented by general formula (I-8).

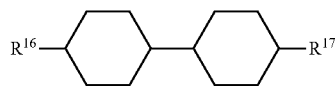

(I-8)

In the formula, each of $R^{16}$ and $R^{17}$ independently represents an alkenyl group of 2 to 5 carbon atoms.

There are no particular limitations on the types of these compounds that can be combined, but one to three types of compounds are preferably combined in accordance with the level of performance required for properties such as the solubility at low temperature, the transition temperature, the electrical reliability and the birefringence.

The amount of the compound represented by general formula (I-8) may be adjusted in accordance with the level of performance required for properties such as the solubility at low temperature, the transition temperature, the electrical reliability, the birefringence, the process compatibility, dropping mark defects, burn-in and the dielectric anisotropy, and relative to the total mass of the liquid crystal composition of the present invention, the amount is preferably at least 5% by mass, more preferably 10% by mass or more, still more preferably 15% by mass or more, still more preferably 20% by mass or more, still more preferably 25% by mass or more, still more preferably 30% by mass or more, still more preferably 35% by mass or more, still more preferably 40% by mass or more, still more preferably 45% by mass or more, still more preferably 50% by mass or more, and particularly preferably 55% by mass or more. Further, the maximum amount of the compound that can be included is preferably not more than 65% by mass, more preferably 60% by mass or less, still more preferably 58% by mass or less, and particularly preferably 56% by mass or less.

The compound represented by general formula (I-8) is preferably a compound selected from the group of compounds represented by formula (9.1) to formula (9.10), and is more preferably a compound represented by formula (9.2), formula (9.4) or formula (9.7).

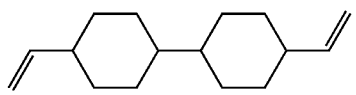

(9.1)

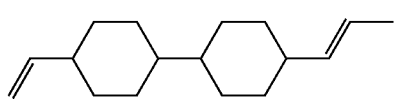

(9.2)

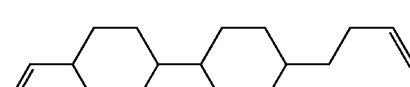

(9.3)

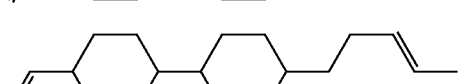

(9.4)

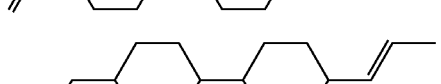

(9.5)

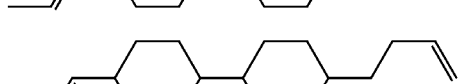

(9.6)

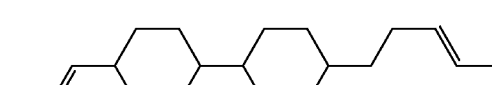

(9.7)

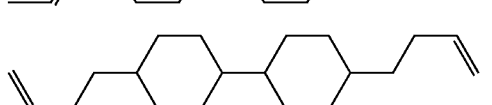

(9.8)

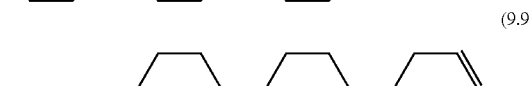

(9.9)

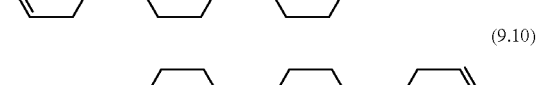

(9.10)

Moreover, the compound represented by general formula (L) is, for example, preferably a compound selected from among compounds represented by general formula (II).

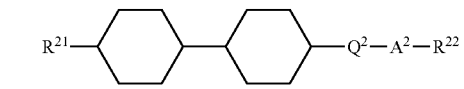

(II)

Each of $R^{21}$ and $R^{22}$ independently represents an alkenyl group of 2 to 5 carbon atoms, an alkyl group of 1 to 5 carbon atoms, or an alkoxy group of 1 to 4 carbon atoms, $A^2$ represents a 1,4-cyclohexylene group or 1,4-phenylene group, and $Q^2$ represents a single bond, —COO—, —CH$_2$—CH$_2$— or —CF$_2$O—.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. Moreover, in yet another embodiment of the present invention, 4 or more types of compounds may be used.

In the liquid crystal composition of the present invention, it is necessary to appropriately adjust the amount of the compound represented by general formula (II) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 3%. Alternatively, in another embodiment of the present invention, the lower limit is 5%. Further, in yet another embodiment of the present invention, the lower limit is 7%. In yet another embodiment of the present invention, the lower limit is 10%. In yet another embodiment of the present invention, the lower limit is 14%. In yet another embodiment of the present invention, the lower limit is 16%. In yet another embodiment of the present invention, the lower limit is 20%. In yet another embodiment of the present invention, the lower limit is 23%. In yet another embodiment of the present invention, the lower limit is 26%. In yet another embodiment of the present invention, the lower limit is 30%. In yet another embodiment of the present invention, the lower limit is 35%. Moreover, in yet another embodiment of the present invention, the lower limit is 40%.

In addition, the upper limit for a preferred amount of the compound relative to the total mass of the liquid crystal composition of the present invention is 50% in one embodiment of the present invention. Further, in another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 20%. In yet another embodiment of the present invention, the upper limit is 15%. In yet another embodiment of the present invention, the upper limit is 10%. Moreover, in yet another embodiment of the present invention, the upper limit is 5%.

Moreover, the compound represented by general formula (II) is, for example, preferably a compound selected from the group of compounds represented by general formula (II-1).

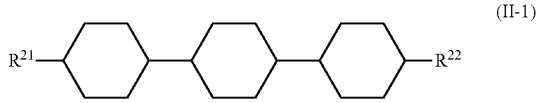
(II-1)

Each of $R^{21}$ and $R^{22}$ independently represents an alkenyl group of 2 to 5 carbon atoms, an alkyl group of 1 to 5 carbon atoms, or an alkoxy group of 1 to 4 carbon atoms.

The amount of the compound represented by general formula (II-1) is preferably adjusted in accordance with the level of performance required for properties such as the solubility at low temperature, the transition temperature, the electrical reliability and the birefringence, and the amount is preferably at least 4% by mass, more preferably 8% by mass or more, and most preferably 12% by mass or more. Further, the maximum amount of the compound that can be included is preferably not more than 24% by mass, more preferably 18% by mass or less, and still more preferably 14% by mass or less.

The compound represented by general formula (II-1) is preferably a compound represented by formula (10.1).

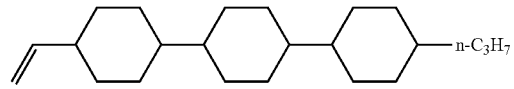
(10.1)

Moreover, the compound represented by general formula (II) is, for example, preferably a compound selected from the group of compounds represented by general formula (II-2).

(II-2)

$R^{23}$ represents an alkenyl group of 2 to 5 carbon atoms, and $R^{24}$ represents an alkyl group of 1 to 5 carbon atoms or an alkoxy group of 1 to 4 carbon atoms.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two or more types of compounds may be used.

In the liquid crystal composition of the present invention, it is necessary to appropriately adjust the amount of the compound represented by general formula (II-2) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 3%. Alternatively, in another embodiment of the present invention, the lower limit is 5%. Further, in yet another embodiment of the present invention, the lower limit is 7%. In yet another embodiment of the present invention, the lower limit is 10%. In yet another embodiment of the present invention, the lower limit is 14%. In yet another embodiment of the present invention, the lower limit is 16%. In yet another embodiment of the present invention, the lower limit is 20%. In yet another embodiment of the present invention, the lower limit is 23%. In yet another embodiment of the present invention, the lower limit is 26%. In yet another embodiment of the present invention, the lower limit is 30%. In yet another embodiment of the present invention, the lower limit is 35%. Moreover, in yet another embodiment of the present invention, the lower limit is 40%.

In addition, the upper limit for a preferred amount of the compound relative to the total mass of the liquid crystal composition of the present invention is 50% in one embodiment of the present invention. Further, in another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 20%. In yet another embodiment of the present invention, the upper limit is 15%. In yet another embodiment of the present invention, the upper limit is 10%. Moreover, in yet another embodiment of the present invention, the upper limit is 5%.

In addition, the compound represented by general formula (II-2) is preferably a compound represented by formula (11.1) to formula (11.3).

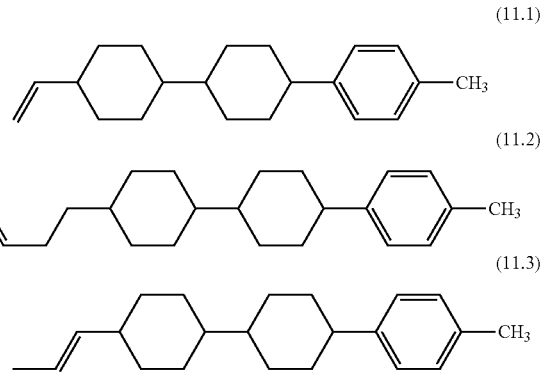

Depending on the level of performance required for properties such as the solubility at low temperature, the transition temperature, the electrical reliability and the birefringence, the composition may include the compound represented by formula (11.1), the compound represented by formula (11.2), both the compound represented by formula (11.1) and the compound represented by formula (11.2), or all of the compounds represented by formula (11.1) to formula (11.3). The amount of the compound represented by formula (11.1) or formula (11.2) relative to the total mass of the liquid crystal composition of the present invention is preferably 3% by mass, more preferably 5% by mass or more, still more preferably 7% by mass or more, still more preferably 9% by mass or more, still more preferably 11% by mass or more, still more preferably 12% by mass or more, still more preferably 13% by mass or more, still more preferably 18% by mass or more, and particularly preferably 21% by mass or more. Further, the maximum amount that can be included is preferably not more than 40% by mass, more preferably 30% by mass or less, and still more preferably 25% by mass or less. Further, the amount of the compound represented by formula (11.2) relative to the total mass of the liquid crystal composition of the present invention is preferably 3% by mass, more preferably 5% by mass or more, still more preferably 8% by mass or more, still more preferably 10% by mass or more, still more preferably 12% by mass or more, still more preferably 15% by mass or more, still more preferably 17% by mass or more, and particularly preferably 19% by mass or more. Further, the maximum amount that can be included is preferably not more than 40% by mass, more preferably 30% by mass or less, and still more preferably 25% by mass or less. When both the compound represented by formula (11.1) and the compound represented by formula (11.2) are included, the combined amount of the two compounds relative to the total mass of the liquid crystal composition of the present invention is preferably at least 15% by mass, more preferably 19% by mass or more, still more preferably 24% by mass or more, and particularly preferably 30% by mass or more. Further, the maximum amount that can be included is preferably not more than 45% by mass, more preferably 40% by mass or less, and still more preferably 35% by mass or less.

Moreover, the compound represented by general formula (II) is, for example, preferably a compound selected from the group of compounds represented by general formula (II-3).

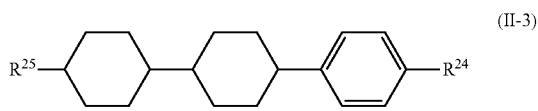

$R^{25}$ represents an alkyl group of 1 to 5 carbon atoms, and $R^{24}$ represents an alkyl group of 1 to 5 carbon atoms or an alkoxy group of 1 to 4 carbon atoms.

There are no particular limitations on the types of these compounds that can be combined, but one to three types of compounds are preferably combined in accordance with the level of performance required for properties such as the solubility at low temperature, the transition temperature, the electrical reliability and the birefringence.

It is necessary to appropriately adjust the amount of the compound represented by general formula (II-3) in accordance with the level of performance required for properties such as the solubility at low temperature, the transition temperature, the electrical reliability, the birefringence, the process compatibility, dropping mark defects, burn-in and the dielectric anisotropy. For example, the lower limit for a preferred amount of the compound relative to the total mass of the liquid crystal composition of the present invention is preferably 2%, more preferably 5%, still more preferably 8%, still more preferably 11%, still more preferably 14%, still more preferably 17%, still more preferably 20%, still more preferably 23%, still more preferably 26%, and particularly preferably 29%. Further, the upper limit for a preferred amount of the compound relative to the total mass of the liquid crystal composition of the present invention is preferably 45%, more preferably 40%, still more preferably 35%, still more preferably 30%, still more preferably 25%, still more preferably 20%, still more preferably 15%, and particularly preferably 10%.

In addition, the compound represented by general formula (II-3) is, for example, preferably a compound represented by formula (12.1) to formula (12.3).

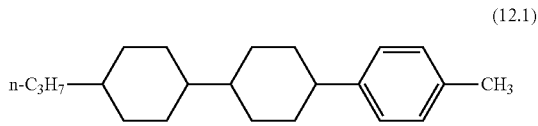

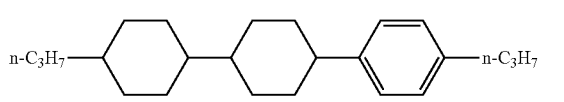

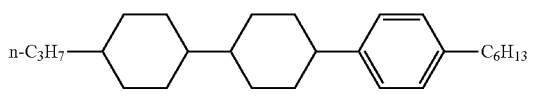

Depending on the level of performance required for properties such as the solubility at low temperature, the transition temperature, the electrical reliability and the birefringence, the composition may include the compound represented by formula (12.1), the compound represented by formula (12.2), or both the compound represented by formula (12.1) and the compound represented by formula (12.2). The amount of the compound represented by formula (12.1) or formula (11.2) relative to the total mass of the liquid crystal composition of the present invention is preferably at least 3% by mass, more preferably 5% by mass or more, still more preferably 7% by mass or more, still more preferably 9% by mass or more, still more preferably 11% by mass or more, still more preferably 12% by mass or more, still more preferably 13% by mass or more, still more preferably 18% by mass or more, and particularly preferably 21% by mass or more. Further, the maximum amount that can be included is preferably not more than 40% by mass, more preferably 30% by mass or less, and still more preferably 25% by mass or less. Further, the amount of the compound represented by formula (12.2) relative to the total mass of the liquid crystal composition of the present invention is preferably 3% by mass, more preferably 5% by mass or more, still more preferably 8% by mass or more, still more preferably 10% by mass or more, still more preferably 12% by mass or more, still more preferably 15% by mass or more, still more preferably 17% by mass or more, and particularly preferably 19% by mass or more. Further, the maximum amount that can be included is preferably not more than 40% by mass, more preferably 30% by mass or less, and still more preferably 25% by mass or less. When both the compound represented by formula (12.1) and the compound represented by formula (12.2) are included, the combined amount of the two compounds relative to the total mass of the liquid crystal composition of the present invention is preferably at least 15% by mass, more preferably 19% by mass or more, still more preferably 24% by mass or more, and particularly preferably 30% by mass or more. Further, the maximum amount that can be included is preferably not more than 45% by mass, more preferably 40% by mass or less, and still more preferably 35% by mass or less.

Furthermore, the amount of the compound represented by formula (12.3) relative to the total mass of the liquid crystal composition of the present invention is preferably at least 0.05% by mass, more preferably 0.1% by mass or more, and still more preferably 0.2% by mass or more. Further, the maximum amount that can be included is preferably not more than 2% by mass, more preferably 1% by mass or less, and still more preferably 0.5% by mass or less. The compound represented by formula (12.3) may be an optically active compound.

Moreover, the compound represented by general formula (II-3) is, for example, preferably a compound selected from the group of compounds represented by general formula (II-3-1).

(II-3-1)

$R^{25}$ represents an alkyl group of 1 to 5 carbon atoms, and $R^{26}$ represents an alkoxy group of 1 to 4 carbon atoms.

There are no particular limitations on the types of these compounds that can be combined, but one to three types of compounds are preferably combined in accordance with the level of performance required for properties such as the solubility at low temperature, the transition temperature, the electrical reliability and the birefringence.

The amount of the compound represented by general formula (II-3-1) is preferably adjusted in accordance with the level of performance required for properties such as the solubility at low temperature, the transition temperature, the electrical reliability and the birefringence, and is preferably at least 1% by mass, more preferably 4% by mass or more, and still more preferably 8% by mass or more. Further, the maximum amount that can be included is preferably not more than 24% by mass, more preferably 18% by mass or less, and still more preferably 14% by mass or less.

Moreover, the compound represented by general formula (II-3-1) is, for example, preferably a compound represented by formula (13.1) to formula (13.4), and is particularly preferably a compound represented by formula (13.3).

(13.1)

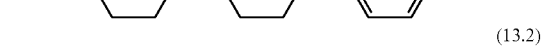

(13.2)

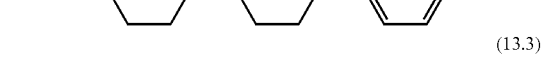

(13.3)

(13.4)

Moreover, the compound represented by general formula (II) is, for example, preferably a compound selected from the group of compounds represented by general formula (II-4).

(II-4)

Each of $R^{21}$ and $R^{22}$ independently represents an alkenyl group of 2 to 5 carbon atoms, an alkyl group of 1 to 5 carbon atoms, or an alkoxy group of 1 to 4 carbon atoms.

The composition may include only one of these compounds, or may include two or more types of compounds, wherein the compounds are preferably combined appropriately in accordance with the performance required. Although there are no particular limitations on the types of these compounds that can be combined, one or two types of compounds are preferably included in accordance with the level of performance required for properties such as the solubility at low temperature, the transition temperature, the electrical reliability and the birefringence, and a combination of one to three types of compounds is particularly preferable.

The amount of the compound represented by general formula (II-4) relative to the total mass of the liquid crystal composition of the present invention is preferably at least 1% by mass, more preferably 2% by mass or more, still more preferably 3% by mass or more, still more preferably 4% by mass or more, and particularly preferably 5% by mass or more. Further, the maximum amount of the compound that can be included is preferably not more than 15% by mass, more preferably 12% by mass or less, and still more preferably 7% by mass or less.

The compound represented by general formula (II-4) is, for example, preferably a compound represented by formula (14.1) to formula (14.5), and is particularly preferably a compound represented by formula (14.2) and/or formula (14.5).

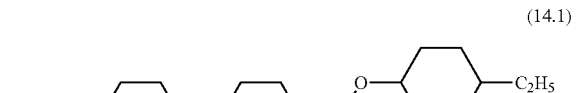
(14.1)

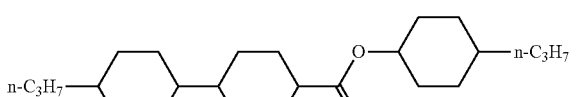
(14.2)

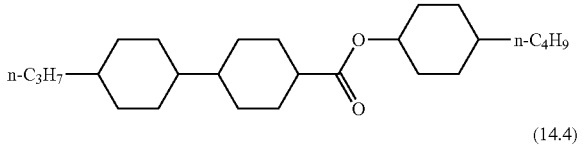
(14.3)

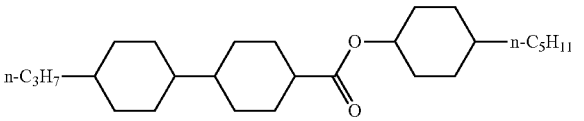
(14.4)

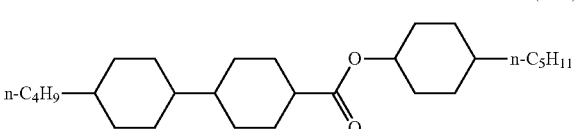
(14.5)

In addition, the compound represented by general formula (L) is preferably a compound selected from the group of compounds represented by general formula (III).

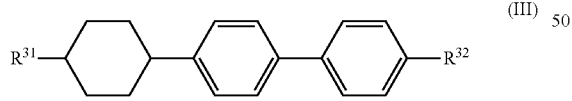
(III)

Each of $R^{31}$ and $R^{32}$ independently represents an alkenyl group of 2 to 5 carbon atoms, an alkyl group of 1 to 5 carbon atoms, or an alkoxy group of 1 to 4 carbon atoms.

The amount of the compound represented by general formula (III) is determined with due consideration of the required solubility and birefringence and the like, and is preferably at least 3% by mass, more preferably 6% by mass or more, and particularly preferably 7% by mass or more relative to the total mass of the liquid crystal composition of the present invention. Further, the maximum amount that can be included is preferably not more than 25% by mass, more preferably 20% by mass or less, and still more preferably 15% by mass or less.

The compound represented by general formula (III) is preferably a compound represented by formula (15.1) or formula (15.2), and is most preferably a compound represented by formula (15.1).

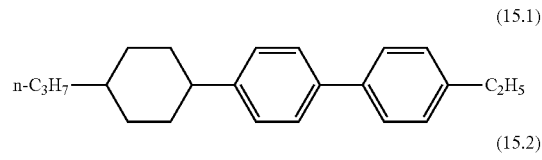
(15.1)

(15.2)

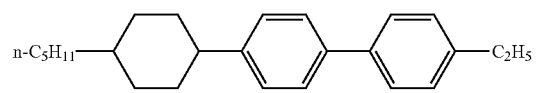

Moreover, the compound represented by general formula (III) is preferably a compound selected from the group of compounds represented by general formula (III-1).

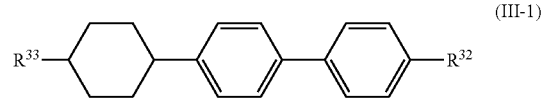
(III-1)

$R^{33}$ represents an alkenyl group of 2 to 5 carbon atoms, and $R^{32}$ represents an alkyl group of 1 to 5 carbon atoms or an alkoxy group of 1 to 4 carbon atoms.

The amount of the compound) is preferably adjusted in accordance with the level of performance required for properties such as the solubility at low temperature, the transition temperature, the electrical reliability and the birefringence, and is preferably at least 4% by mass, more preferably 6% by mass or more, and still more preferably 10% by mass or more. Further, the maximum amount that can be included is preferably not more than 23% by mass, more preferably 18% by mass or less, and still more preferably 13% by mass or less.

The compound represented by general formula (III-1) is, for example, preferably a compound represented by formula (16.1) or formula (16.2).

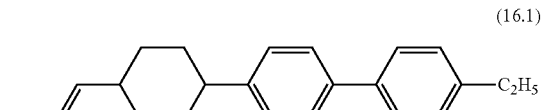
(16.1)

(16.2)

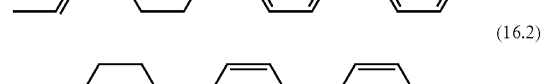

Moreover, the compound represented by general formula (III) is preferably a compound selected from the group of compounds represented by general formula (III-2).

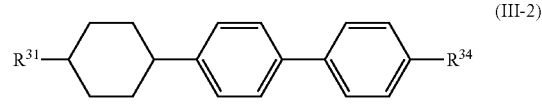
(III-2)

$R^{31}$ represents an alkyl group of 1 to 5 carbon atoms, and $R^{34}$ represents an alkoxy group of 1 to 4 carbon atoms.

The amount of the compound represented by general formula (III-2) is preferably adjusted in accordance with the level of performance required for properties such as the solubility at low temperature, the transition temperature, the electrical reliability and the birefringence, and is preferably at least 4% by mass, more preferably 6% by mass or more, and still more preferably 10% by mass or more. Further, the maximum amount that can be included is preferably not more than 23% by mass, more preferably 18% by mass or less, and still more preferably 13% by mass or less.

Moreover, the compound represented by general formula (III-2) is, for example, preferably a compound selected from the group of compounds represented by formula (17.1) to formula (17.3), and is particularly preferably a compound represented by formula (17.3).

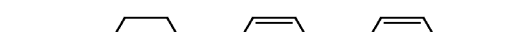

(17.1)

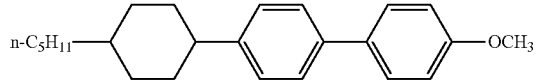

(17.2)

(17.3)

In addition, the compound represented by general formula (L) is preferably selected from the group of compounds represented by general formula (IV).

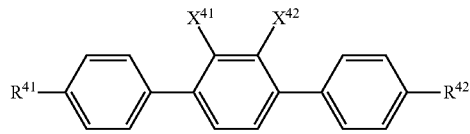

(IV)

In the formula, each of $R^{41}$ and $R^{42}$ independently represents an alkyl group of 1 to 5 carbon atoms or an alkenyl group of 2 to 5 carbon atoms, and each of $X^{41}$ and $X^{42}$ independently represents a hydrogen atom or a fluorine atom, provided that the compound represented by general formula (IV) excludes compounds represented by general formula (i) and compounds represented by general formula (ii).

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 4 types of compounds may be used. Moreover, in yet another embodiment of the present invention, or more types of compounds may be used.

The compound represented by general formula (IV) is, for example, preferably a compound selected from the group of compounds represented by general formula (IV-1).

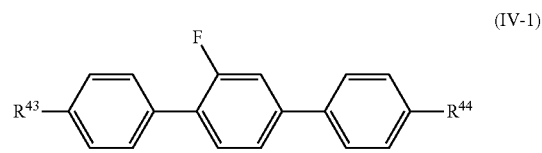

(IV-1)

In the formula, each of $R^{43}$ and $R^{44}$ independently represents an alkyl group of 1 to 5 carbon atoms, provided that the compound represented by general formula (IV-1) excludes compounds represented by general formula (i) and compounds represented by general formula (ii).

It is necessary to appropriately adjust the amount of the compound represented by general formula (IV-1) in accordance with the level of performance required for properties such as the solubility at low temperature, the transition temperature, the electrical reliability, the birefringence, the process compatibility, dropping mark defects, burn-in and the dielectric anisotropy. For example, in one embodiment of the present invention, the lower limit for a preferred amount of the compound relative to the total mass of the liquid crystal composition of the present invention is 1%. Alternatively, in another embodiment of the present invention, the lower limit is 2%. Further, in yet another embodiment of the present invention, the lower limit is 4%. In yet another embodiment of the present invention, the lower limit is 6%. In yet another embodiment of the present invention, the lower limit is 8%. In yet another embodiment of the present of the present invention, the lower limit is 10%. In yet another embodiment of the present invention, the lower limit is 12%. In yet another embodiment of the present invention, the lower limit is 15%. In yet another embodiment of the present invention, the lower limit is 18%. Moreover, in yet another embodiment of the present invention, the lower limit is 21%.

In addition, the upper limit for a preferred amount of the compound relative to the total mass of the liquid crystal composition of the present invention is 40% in one embodiment of the present invention. Further, in another embodiment of the present invention, the upper limit is 30%. In yet another embodiment of the present invention, the upper limit is 25%. In yet another embodiment of the present invention, the upper limit is 20%. In yet another embodiment of the present invention, the upper limit is 15%. In yet another embodiment of the present invention, the upper limit is 10%. In yet another embodiment of the present invention, the upper limit is 5%. Moreover, in yet another embodiment of the present invention, the upper limit is 4%.

Moreover, the compound represented by general formula (IV-1) is, for example, preferably a compound represented by formula (18.4) to formula (18.9).

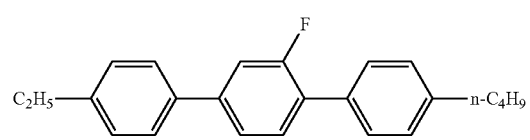

(18.4)

-continued (18.5)
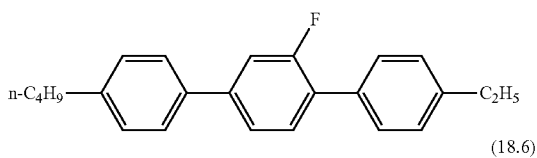

(18.6)
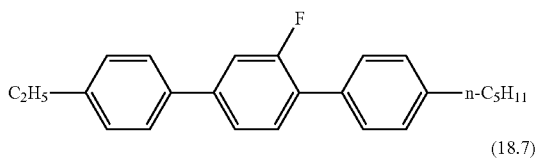

(18.7)
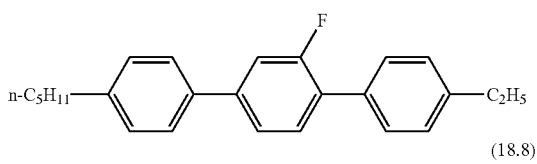

(18.8)
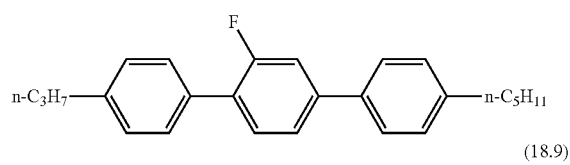

(18.9)
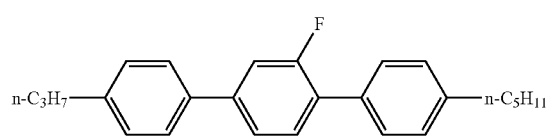

Although there are no particular limitations on the types of these compounds that can be combined, one to three types of these compounds are preferably included, and including one to four types of these compounds is more preferable. Further, a combination in which the molecular weight distribution of the selected compounds is broad is effective in improving the solubility, and therefore it is preferable, for example, to select one compound represented by formula (18.4) or formula (18.5), one compound represented by formula (18.6) or formula (18.7), and one compound represented by formula (18.8) or formula (18.9), and then combine these selected compounds in an appropriate manner. Among such options, including the compounds represented by formula (18.4), formula (18.6) and formula (18.9) is preferable.

Moreover, the compound represented by general formula (IV) is, for example, preferably a compound selected from the group of compounds represented by general formula (IV-2).

(IV-2)
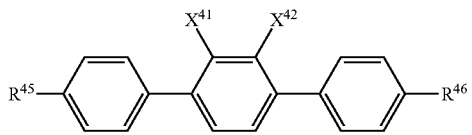

In the formula, each of $R^{45}$ and $R^{46}$ independently represents an alkyl group of 1 to 5 carbon atoms or an alkenyl group of 2 to 5 carbon atoms, provided that at least one of $R^{45}$ and $R^{46}$ represents an alkenyl group of 2 to 5 carbon atoms, and each of $X^{41}$ and $X^{42}$ independently represents a hydrogen atom or a fluorine atom.

There are no particular limitations on the types of these compounds that can be combined, and compounds can be combined in accordance with the level of performance required for properties such as the solubility at low temperature, the transition temperature, the electrical reliability and the birefringence.

It is necessary to appropriately adjust the amount of the compound represented by general formula (IV-2) in accordance with the level of performance required for properties such as the solubility at low temperature, the transition temperature, the electrical reliability, the birefringence, the process compatibility, dropping mark defects, burn-in and the dielectric anisotropy. The lower limit for a preferred amount of the compound relative to the total mass of the liquid crystal composition of the present invention is preferably 0.5%, more preferably 1%, still more preferably 2%, still more preferably 3%, still more preferably 5%, still more preferably 7%, still more preferably 9%, still more preferably 12%, still more preferably 15%, and particularly preferably 20%. Further, the upper limit for a preferred amount of the compound relative to the total mass of the liquid crystal composition of the present invention is preferably 40%, more preferably 30%, still more preferably 25%, still more preferably 20%, still more preferably 15%, still more preferably 10%, still more preferably 5%, and particularly preferably 4%.

The compound represented by general formula (IV-2) is, for example, preferably a compound represented by formula (19.1) to formula (19.8), and among these compounds, is preferably a compound represented by formula (19.2).

(19.1)
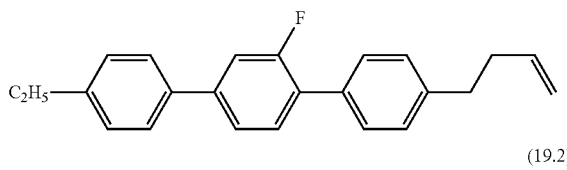

(19.2)
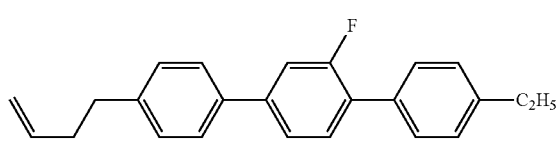

(19.3)
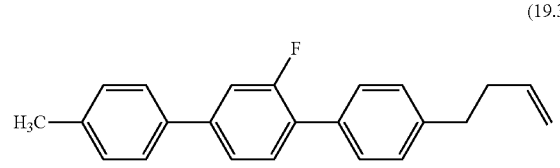

(19.4)
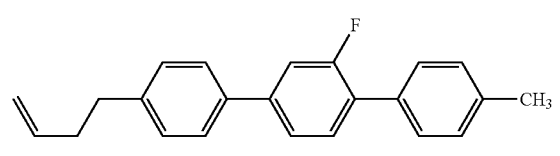

(19.5)
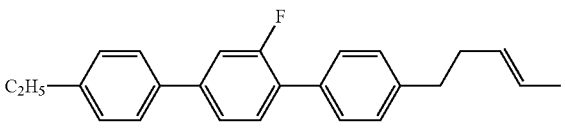

-continued

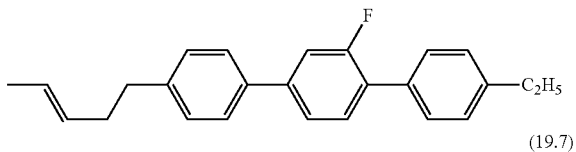

(19.6)

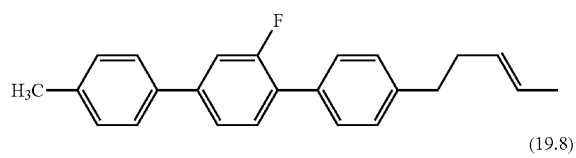

(19.7)

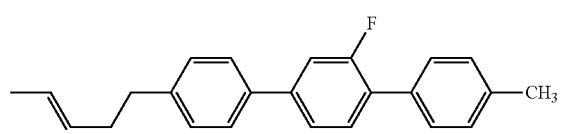

(19.8)

A broad molecular weight distribution for the compounds selected as components of the liquid crystal composition is effective in improving the solubility, and therefore it is preferable, for example, to select one compound represented by formula (19.1) or formula (19.2), one compound represented by formula (19.3) or formula (19.4), one compound represented by formula (19.5) or formula (19.6), and one compound represented by formula (19.7) or formula (19.8), and then combine these selected compounds in an appropriate manner.

In addition, the compound represented by general formula (L) is preferably a compound selected from the group of compounds represented by general formula (V).

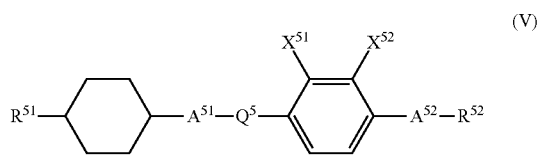

(V)

In the formula, each of $R^{51}$ and $R^{52}$ independently represents an alkyl group of 1 to 5 carbon atoms, an alkenyl group of 2 to 5 carbon atoms or an alkoxy group of 1 to 4 carbon atoms, each of $A^{51}$ and $A^{52}$ independently represents a 1,4-cyclohexylene group or a 1,4-phenylene group, $Q^5$ represents a single bond or —COO—, and each of $X^{51}$ and $X^{52}$ independently represents a fluorine atom or a hydrogen atom.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. In yet another embodiment of the present invention, three types of compounds may be used. Moreover, in yet another embodiment of the present invention, 4 types of compounds may be used.

For example, in one embodiment, the lower limit for a preferred amount of the above compound relative to the total mass of the liquid crystal composition of the present invention is 2%. Moreover, in another embodiment of the present invention, the lower limit is 4%. In yet another embodiment of the present invention, the lower limit is 7%. In yet another embodiment of the present invention, the lower limit is 10%. In yet another embodiment of the present invention, the lower limit is 12%. In yet another embodiment of the present invention, the lower limit is 15%. In yet another embodiment of the present invention, the lower limit is 17%. In yet another embodiment of the present invention, the lower limit is 18%. In yet another embodiment of the present invention, the lower limit is 20%. Moreover, in yet another embodiment of the present invention, the lower limit is 22%.

Further, the upper limit for a preferred amount of the compound relative to the total mass of the liquid crystal composition of the present invention is 40% in one embodiment of the present invention. Further, in another embodiment of the present invention, the upper limit is 30%. In yet another embodiment of the present invention, the upper limit is 25%. In yet another embodiment of the present invention, the upper limit is 20%. In yet another embodiment of the present invention, the upper limit is 15%. In yet another embodiment of the present invention, the upper limit is 10%. In yet another embodiment of the present invention, the upper limit is 5%. Moreover, in yet another embodiment of the present invention, the upper limit is 4%.

The compound represented by general formula (V) is preferably a compound represented by general formula (V-1).

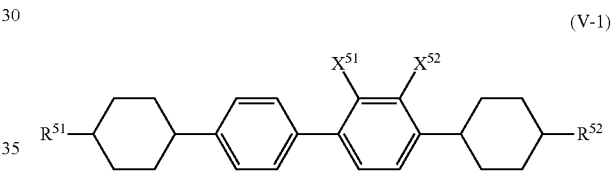

(V-1)

In the formula, each of $R^{51}$ and $R^{52}$ independently represents an alkyl group of 1 to 5 carbon atoms, an alkenyl group of 2 to 5 carbon atoms or an alkoxy group of 1 to 4 carbon atoms, and each of $X^{51}$ and $X^{52}$ independently represents a fluorine atom or a hydrogen atom.

Moreover, the compound represented by general formula (V-1) is preferably a compound represented by general formula (V-1-1).

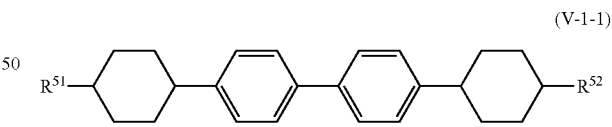

(V-1-1)

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

The amount of the compound represented by general formula (V-1-1) relative to the total mass of the liquid crystal composition of the present invention is preferably at least 1% by mass, more preferably 2% by mass or more, still more preferably 3% by mass or more, and particularly preferably 4% by mass or more. Further, the maximum amount that can be included is preferably not more than 15% by mass, more preferably 10% by mass or less, and still more preferably 8% by mass or less.

The compound represented by general formula (V-1-1) is preferably a compound represented by formula (20.1) to formula (20.4), and is more preferably a compound represented by formula (20.2).

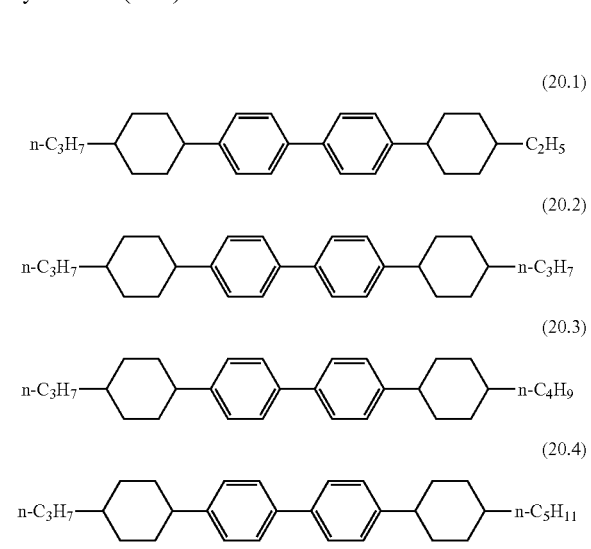

(20.1)

(20.2)

(20.3)

(20.4)

Moreover, the compound represented by general formula (V-1) is preferably a compound represented by general formula (V-1-2).

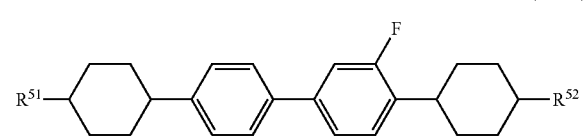

(V-1-2)

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

The amount of the compound represented by general formula (V-1-2) relative to the total mass of the liquid crystal composition of the present invention is preferably at least 1% by mass, more preferably 2% by mass or more, still more preferably 3% by mass or more, and particularly preferably 4% by mass or more. Further, the maximum amount that can be included is preferably not more than 15% by mass, more preferably 10% by mass or less, and still more preferably 8% by mass or less.

The compound represented by general formula (V-1-2) is preferably a compound represented by formula (21.1) to formula (21.3), and is more preferably a compound represented by formula (21.1).

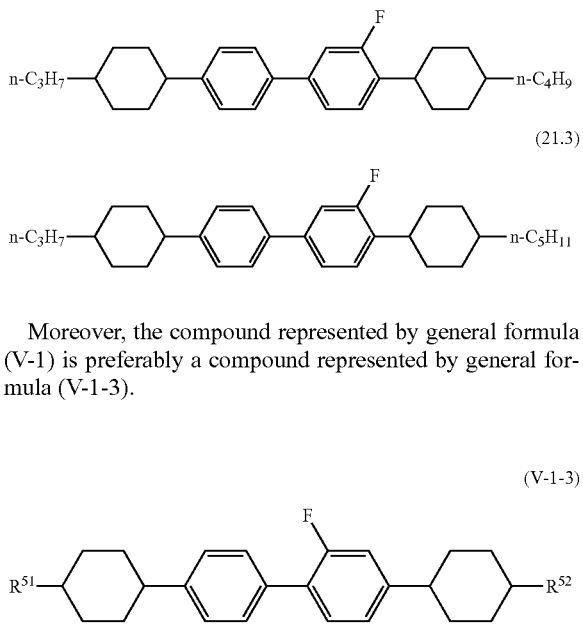

(21.1)

(21.2)

(21.3)

Moreover, the compound represented by general formula (V-1) is preferably a compound represented by general formula (V-1-3).

(V-1-3)

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

The amount of the compound represented by general formula (V-1-3) relative to the total mass of the liquid crystal composition of the present invention is preferably at least 1% by mass, more preferably 2% by mass or more, still more preferably 3% by mass or more, and particularly preferably 4% by mass or more. Further, the maximum amount that can be included is preferably not more than 15% by mass, more preferably 10% by mass or less, and still more preferably 8% by mass or less.

The compound represented by general formula (V-1-3) is preferably a compound represented by formula (22.1) to formula (22.3), and is more preferably a compound represented by formula (22.1).

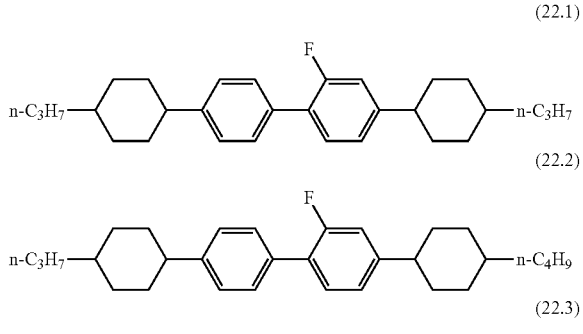

(22.1)

(22.2)

(22.3)

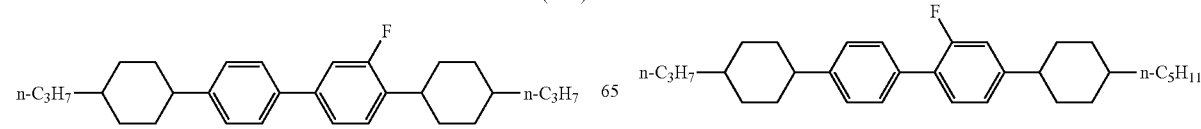

The compound represented by general formula (V) is preferably a compound represented by general formula (V-2).

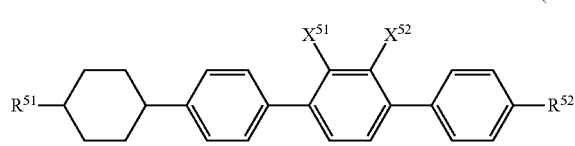
(V-2)

In the formula, each of $R^{51}$ and $R^{52}$ independently represents an alkyl group of 1 to 5 carbon atoms, an alkenyl group of 2 to 5 carbon atoms or an alkoxy group of 1 to 4 carbon atoms, and each of $X^{51}$ and $X^{52}$ independently represents a fluorine atom or a hydrogen atom.

There are no particular limitations on the types of these compounds that can be combined, and compounds can be combined as appropriate in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two or more types of compounds may be used.

In one embodiment of the present invention, the lower limit for a preferred amount of the compound relative to the total mass of the liquid crystal composition of the present invention is 2%. Alternatively, in another embodiment of the present invention, the lower limit is 4%. Further, in yet another embodiment of the present invention, the lower limit is 7%. In yet another embodiment of the present invention, the lower limit is 10%. In yet another embodiment of the present invention, the lower limit is 12%. In yet another embodiment of the present invention, the lower limit is 15%. In yet another embodiment of the present invention, the lower limit is 17%. In yet another embodiment of the present invention, the lower limit is 18%. In yet another embodiment of the present invention, the lower limit is 20%. Moreover, in yet another embodiment of the present invention, the lower limit is 22%.

In addition, the upper limit for a preferred amount of the compound relative to the total mass of the liquid crystal composition of the present invention is 40% in one embodiment of the present invention. Further, in another embodiment of the present invention, the upper limit is 30%. In yet another embodiment of the present invention, the upper limit is 25%. In yet another embodiment of the present invention, the upper limit is 20%. In yet another embodiment of the present invention, the upper limit is 15%. In yet another embodiment of the present invention, the upper limit is 10%. In yet another embodiment of the present invention, the upper limit is 5%. Moreover, in yet another embodiment of the present invention, the upper limit is 4%.

When an embodiment in which the liquid crystal composition of the present invention has a high Tni value is desirable, the amount of the compound represented by formula (V-2) is preferably increased, whereas when an embodiment having a low viscosity is desirable, the amount is preferably reduced.

Moreover, the compound represented by general formula (V-2) is preferably a compound represented by general formula (V-2-1).

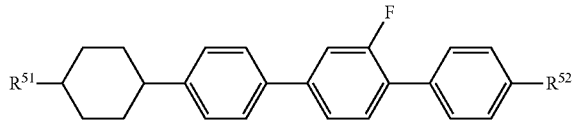
(V-2-1)

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

The compound represented by general formula (V-2-1) is preferably a compound represented by formula (23.1) to formula (23.4), and is more preferably a compound represented by formula (23.1) and/or formula (23.2).

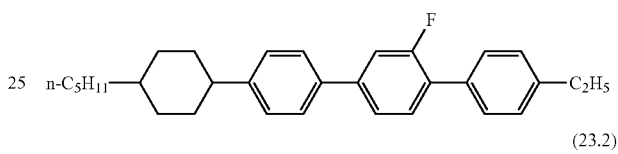
(23.1)

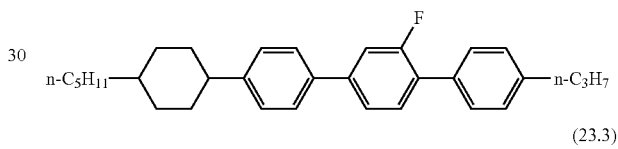
(23.2)

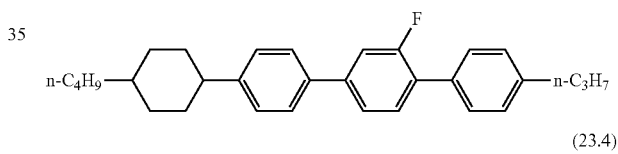
(23.3)

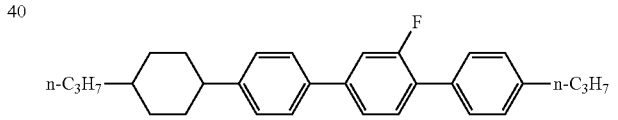
(23.4)

Moreover, the compound represented by general formula (V-2) is preferably a compound represented by general formula (V-2-2).

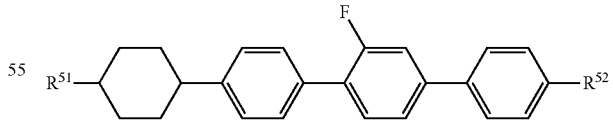
(V-2-2)

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

The compound represented by general formula (V-2-2) is preferably a compound represented by formula (24.1) to formula (24.4), and is more preferably a compound represented by formula (24.1) and/or formula (24.2).

(24.1)

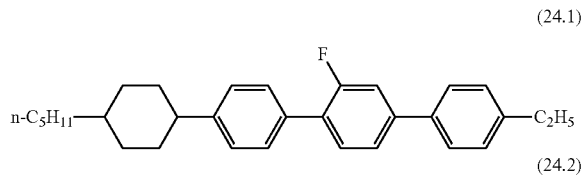

(24.2)

(24.3)

(24.4)

(25.1)

(25.2)

(25.3)

Moreover, the compound represented by general formula (V) is preferably a compound represented by general formula (V-3).

(V-3)

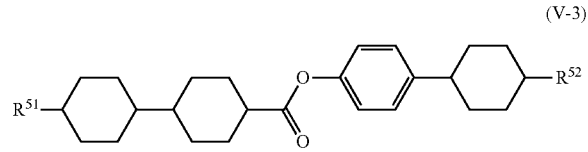

In the formula, each of $R^{51}$ and $R^{52}$ independently represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Moreover, in yet another embodiment of the present invention, three or more types of compounds may be used.

The amount of the compound represented by general formula (V-3) relative to the total mass of the liquid crystal composition of the present invention is preferably at least 2% by mass, more preferably 4% by mass or more, still more preferably 7% by mass or more, and particularly preferably 8% by mass or more. Further, the maximum amount that can be included is preferably not more than 16% by mass, more preferably 13% by mass or less, and still more preferably 11% by mass or less.

Moreover, the compound represented by general formula (V-3) is preferably a compound represented by formula (25.1) to formula (25.3).

The liquid crystal composition of the present invention may also include one or more compounds represented by general formula (VI).

(VI)

$$R^{61}\text{—}\bigcirc\text{—}R^{62}$$

In the formula, each of $R^{61}$ and $R^{62}$ independently represents a linear alkyl group of 1 to 10 carbon atoms, a linear alkoxy group of 1 to 10 carbon atoms, or a linear alkenyl group of 2 to 10 carbon atoms.

Although there are no particular limitations on the types of these compounds that can be combined, one to three types of compounds are preferably included from among these compounds in accordance with the level of performance required for properties such as the solubility at low temperature, the transition temperature, the electrical reliability and the birefringence, and a combination of 1 to 4 types of compounds is more preferable, and a combination of 1 to 5 or more types of compounds is particularly preferable. The maximum amount of the above compound that can be included in the composition is preferably not more than 35% by mass, more preferably 25% by mass or less, and still more preferably 15% by mass or less.

Specific examples of the compound represented by general formula (VI) that can be used favorably include the compounds shown below.

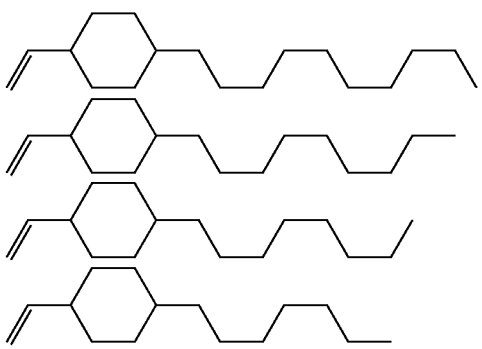

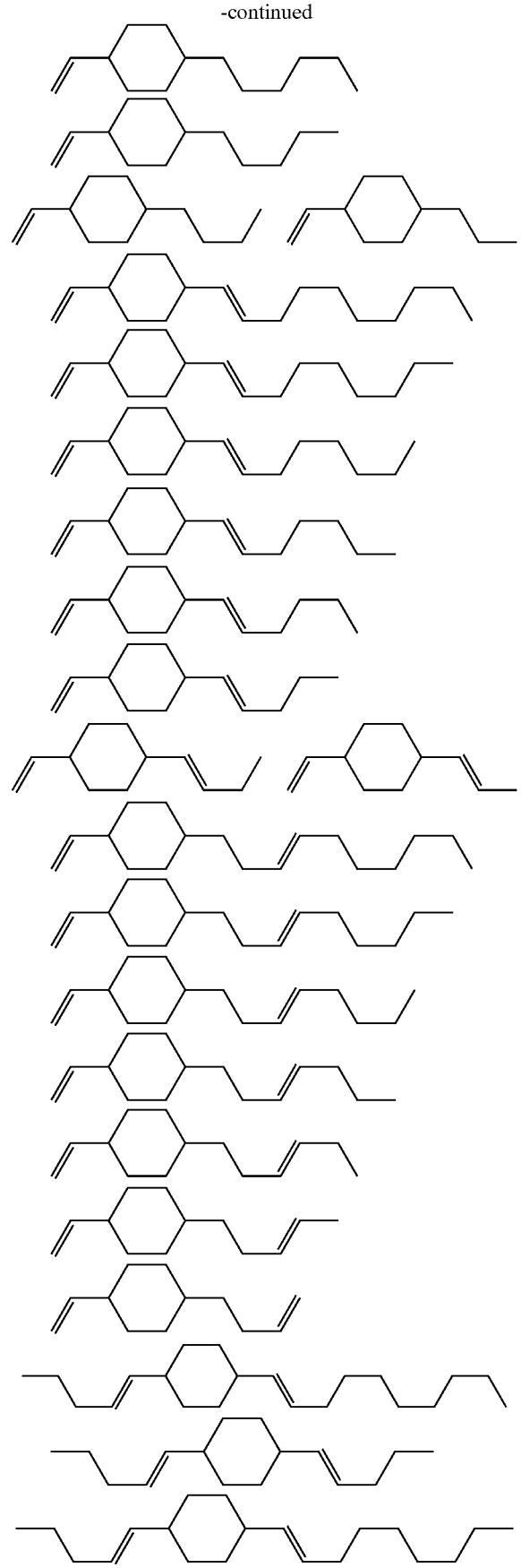
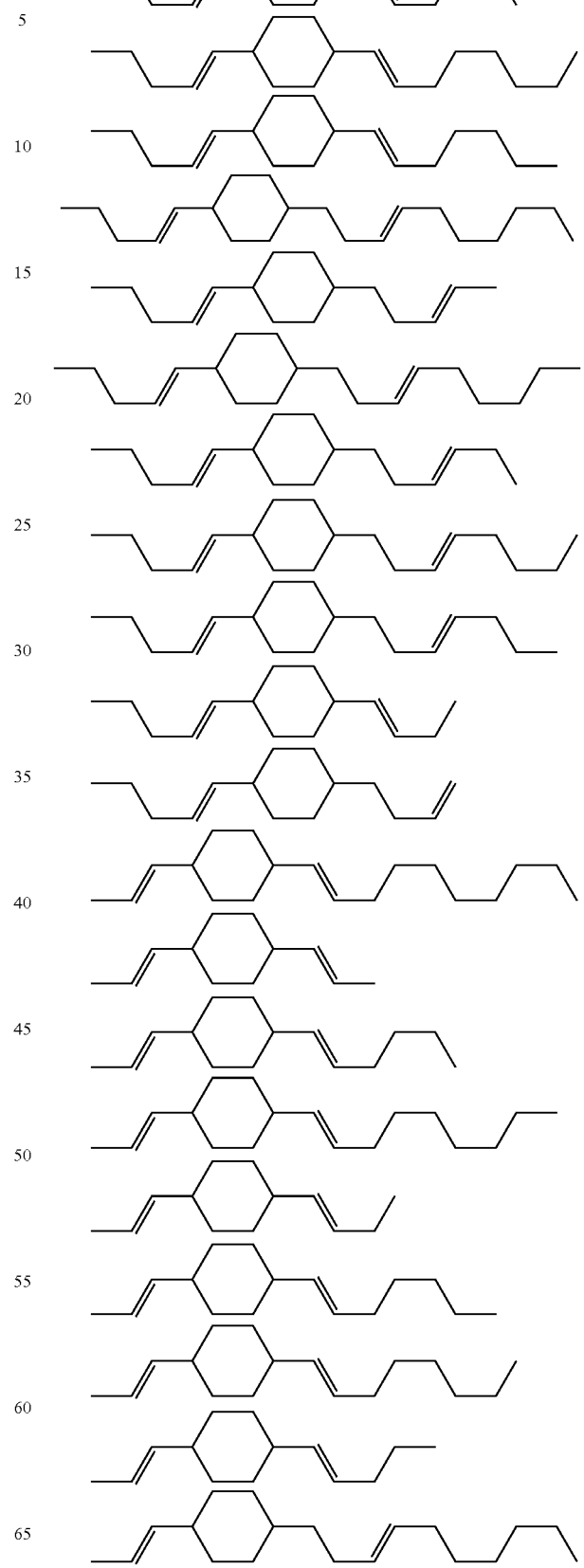

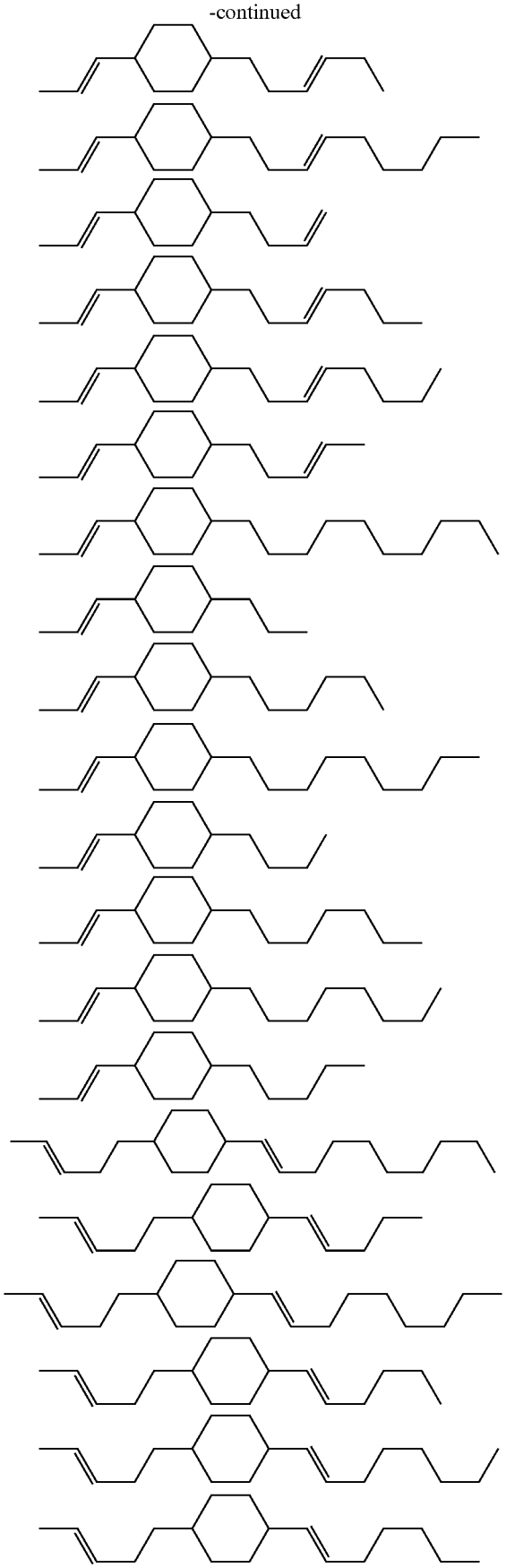

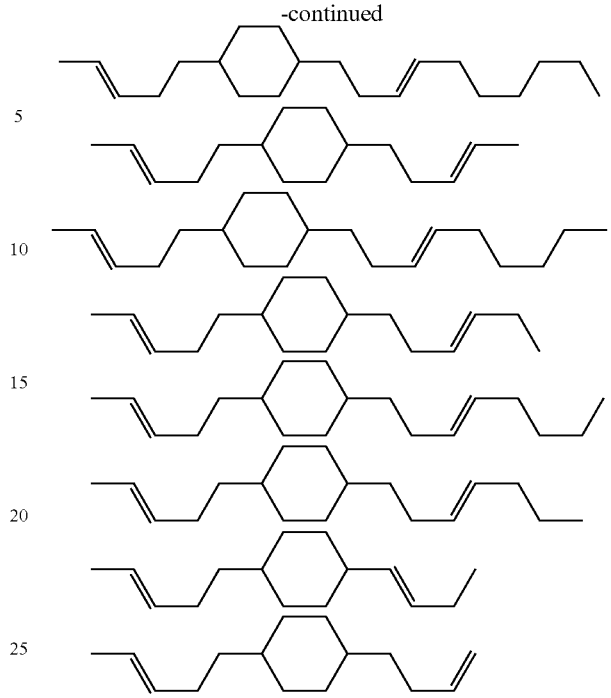

The liquid crystal composition of the present invention may also include one or more compounds represented by general formula (VII).

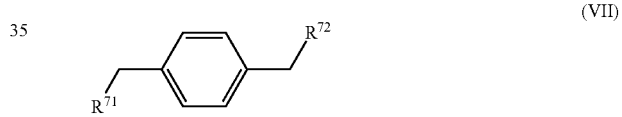

(VII)

In the formula, each of $R^{71}$ and $R^{72}$ independently represents a linear alkyl group of 1 to 10 carbon atoms, a linear alkoxy group of 1 to 10 carbon atoms, or a linear alkenyl group of 4 to 10 carbon atoms.

Although there are no particular limitations on the types of these compounds that can be combined, one to three types of compounds are preferably included from among these compounds in accordance with the level of performance required for properties such as the solubility at low temperature, the transition temperature, the electrical reliability and the birefringence, and a combination of 1 to 4 types of compounds is more preferable, and a combination of 1 to 5 or more types of compounds is particularly preferable. The maximum amount of the above compound that can be included in the composition is preferably not more than 35% by mass, more preferably 25% by mass or less, and still more preferably 15% by mass or less.

Specific examples of the compound represented by general formula (VII) that can be used favorably include the compounds shown below.

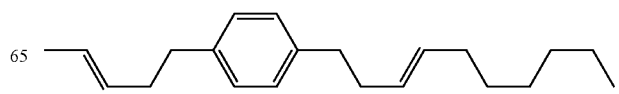

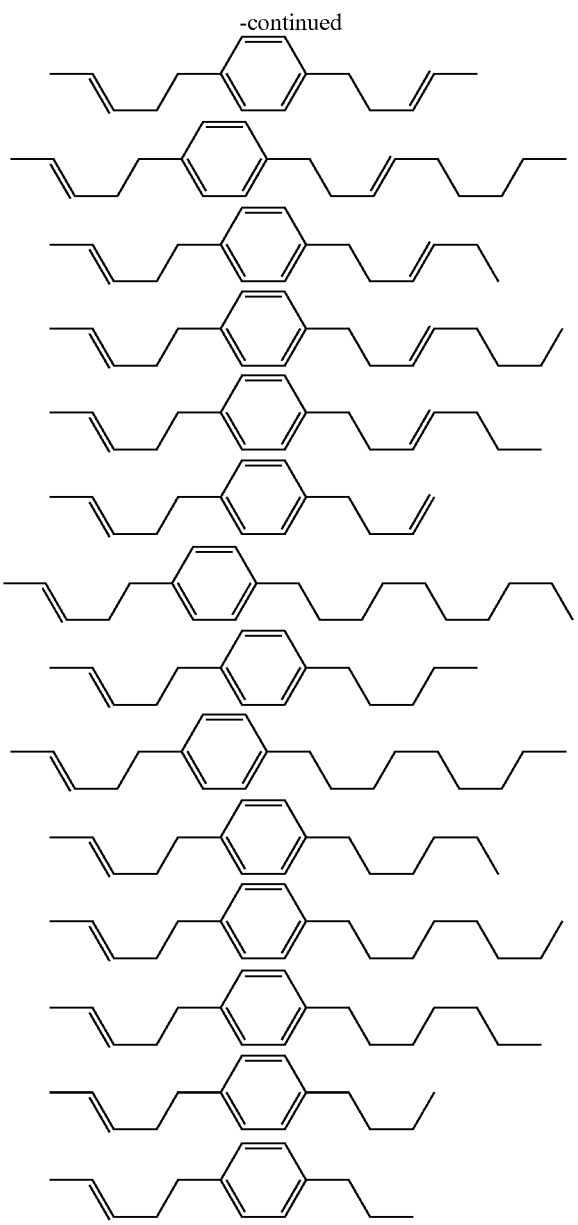

The liquid crystal composition of the present invention preferably also includes a compound represented by general formula (M) shown below.

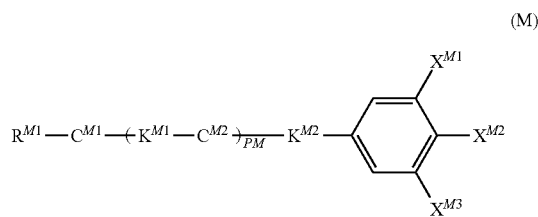

(M)

In the formula, $R^{M1}$ represents an alkyl group of 1 to 8 carbon atoms, wherein one —$CH_2$— group or two or more non-adjacent —$CH_2$— groups within the alkyl group may each be independently substituted with —CH=CH—, —C≡C—, —O—, —CO—, —COO— or —OCO—, PM represents 0, 1, 2, 3 or 4, each of $C^{M1}$ and $C^{M2}$ independently represents a group selected from the group consisting of:

(d) a 1,4-cyclohexylene group (wherein one —$CH_2$— group or two or more non-adjacent —$CH_2$— groups that exist within this group may each be substituted with —O— or —S—), and (e) a 1,4-phenylene group (wherein one —CH= group or two or more non-adjacent —CH= groups that exist within this group may each be substituted with —N=), wherein the above group (d) and group (e) may each be independently substituted with a cyano group, a fluorine atom or a chlorine atom, each of $K^{M1}$ and $K^{M2}$ independently represents a single bond, —$CH_2CH_2$—, —$(CH_2)_4$—, —$OCH_2$—, —$CH_2O$—, —$OCF_2$—, —$CF_2O$—, —COO—, —OCO— or —C≡C—, when PM represents 2, 3 or 4 and a plurality of $K^{M1}$ exists, the $K^{M1}$ may be the same or different, when PM represents 2, 3 or 4 and a plurality of $C^{M2}$ exists, the $C^{M2}$ may be the same or different, each of $X^{M1}$ and $X^{M3}$ independently represents a hydrogen atom, a chlorine atom or a fluorine atom, and $X^{M2}$ represents a hydrogen atom, fluorine atom, chlorine atom, cyano group, trifluoromethyl group, fluoromethoxy group, difluoromethoxy group, trifluoromethoxy group or 2,2,2-trifluoroethyl group, provided that the compound represented by general formula (M) excludes compounds represented by general formula (i) and compounds represented by general formula (ii).

There are no particular limitations on the types of these compounds that can be combined, and compounds can be combined and used in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 5 types of compounds may be used. In yet another embodiment of the present invention, 6 types of compounds may be used. Moreover, in yet another embodiment of the present invention, 7 or more types of compounds may be used.

In the liquid crystal composition of the present invention, it is necessary to appropriately adjust the amount of the compound represented by general formula (M) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 1%. Further, in another embodiment of the present invention, the lower limit is 10%. In yet another embodiment of the present invention, the lower limit is 20%. In yet another embodiment of the present invention, the lower limit is 30%. In yet another embodiment of the present invention, the lower limit is 40%. In yet another embodiment of the present invention, the lower limit is 45%. In yet another embodiment of the present invention, the lower limit is 50%. In yet another embodiment of the present invention, the lower limit is 55%. In yet another embodiment of the present invention, the lower limit is 60%. In yet another embodiment of the present invention, the lower limit is 65%. In yet another embodiment of the present invention, the lower limit is 70%. In yet another embodiment of the present invention, the lower limit is 75%. Moreover, in yet another embodiment of the present invention, the lower limit is 80%.

In addition, the upper limit for a preferred amount of the compound relative to the total mass of the liquid crystal composition of the present invention is 95% in one embodiment of the present invention. Further, in another embodiment of the present invention, the upper limit is 85%. In yet another embodiment of the present invention, the upper limit is 75%. In yet another embodiment of the present invention, the upper limit is 65%. In yet another embodiment of the present invention, the upper limit is 55%. In yet another embodiment of the present invention, the upper limit is 45%. In yet another embodiment of the present invention, the upper limit is 35%. Moreover, in yet another embodiment of the present invention, the upper limit is 25%.

When it is necessary to maintain the viscosity of the liquid crystal composition of the present invention at a low value, and obtain a liquid crystal composition having a fast response speed, it is preferable that the lower limit and the upper limit mentioned above are set to low values. Moreover, when it is necessary to maintain the Tni of the liquid crystal composition of the present invention at a high value, and obtain a liquid crystal composition having good temperature stability, it is preferable that the lower limit and the upper limit mentioned above are set to low values. Further, when it is desirable to have a large dielectric anisotropy in order to ensure a low drive voltage, it is preferable that the lower limit and the upper limit mentioned above are set to high values.

When the cyclic structure to which $R^{M1}$ is bonded is a phenyl group (aromatic group), $R^{M1}$ is preferably a linear alkyl group of 1 to 5 carbon atoms, a linear alkoxy group of 1 to 4 carbon atoms, or an alkenyl group of 4 or 5 carbon atoms, whereas when the cyclic structure to which $R^{M1}$ is bonded is a saturated cyclic structure such as a cyclohexane, pyran or dioxane ring, $R^{M1}$ is preferably a linear alkyl group of 1 to 5 carbon atoms, a linear alkoxy group of 1 to 4 carbon atoms, or a linear alkenyl group of 2 to 5 carbon atoms.

When the liquid crystal composition requires good chemical stability, the compound represented by general formula (M) preferably does not contain a chlorine atom within the molecule. Moreover, in the liquid crystal composition, the amount of compounds having a chlorine atom is preferably not more than 5%, more preferably 3% or less, still more preferably 1% or less, still more preferably 0.5% or less, and most preferably essentially zero. The expression "essentially zero" means that only compounds containing chlorine atoms that are introduced unintentionally, such as compounds generated as impurities during compound production, are incorporated within the liquid crystal composition.

The compound represented by general formula (M) is, for example, preferably a compound selected from the group of compounds represented by general formula (VIII).

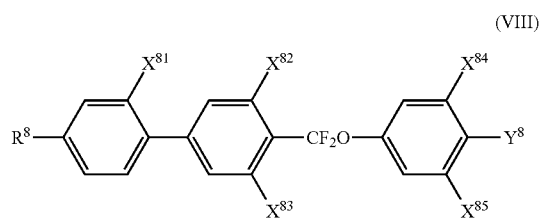

(VIII)

In the formula, $R^8$ represents an alkyl group of 1 to 5 carbon atoms, an alkenyl group of 2 to 5 carbon atoms, or an alkoxy group of 1 to 4 carbon atoms, each of $X^{81}$ to $X^{85}$ independently represents a hydrogen atom or a fluorine atom, and $Y^8$ represents a fluorine atom or —$OCF_3$.

There are no particular limitations on the types of these compounds that can be combined, and compounds can be combined and used in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three or more types of compounds may be used.

In the liquid crystal composition of the present invention, it is necessary to appropriately adjust the amount of the compound represented by general formula (VIII) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 2%. Further, in another embodiment of the present invention, the lower limit is 4%. In yet another embodiment of the present invention, the lower limit is 5%. In yet another embodiment of the present invention, the invention, the lower limit is 6%. In yet another embodiment of the present invention, the lower limit is 7%. In yet another embodiment of the present invention, the lower limit is 8%. In yet another embodiment of the present invention, the lower limit is 9%. In yet another embodiment of the present invention, the lower limit is 10%. In yet another embodiment of the present invention, the lower limit is 11%. In yet another embodiment of the present invention, the lower limit is 12%. In yet another embodiment of the present invention, the lower limit is 14%. In yet another embodiment of the present invention, invention, the lower limit is 15%. In yet another embodiment of the present invention, the lower limit is 21%. Moreover, in yet another embodiment of the present invention, the lower limit is 23%.

In addition, the upper limit for a preferred amount of the compound relative to the total mass of the liquid crystal composition of the present invention is 40% in one embodiment of the present invention. Further, in another embodiment of the present invention, the upper limit is 30%. In yet another embodiment of the present invention, the upper limit is 25%. In yet another embodiment of the present invention, the upper limit is 21%. In yet another embodiment of the present invention, the upper limit is 16%. In yet another embodiment of the present invention, the upper limit is 12%. In yet another embodiment of the present invention, the upper limit is 8%. Moreover, in yet another embodiment of the present invention, the upper limit is 5%.

When it is necessary to maintain the viscosity of the liquid crystal composition of the present invention at a low value, and obtain a liquid crystal composition having a fast response speed, it is preferable that the lower limit and the upper limit mentioned above are set to low values. Moreover, when it is necessary to maintain the Tni of the liquid crystal composition of the present invention at a high value, and obtain a liquid crystal composition having good temperature stability, it is preferable that the lower limit and the upper limit mentioned above are set to low values. Further, when it is desirable to have a large dielectric anisotropy in order to ensure a low drive voltage, it is preferable that the lower limit and the upper limit mentioned above are set to high values.

Moreover, the compound represented by general formula (VIII) is preferably a compound represented by general formula (VIII-1).

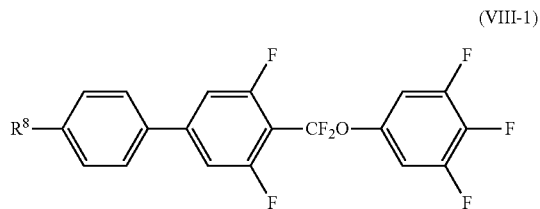
(VIII-1)

In the formula, $R^8$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined and used in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two or more types of compounds may be used.

Specifically, the compound represented by general formula (VIII-1) is preferably a compound represented by formula (26.1) to formula (26.4), more preferably a compound represented by formula (26.1) or formula (26.2), and still more preferably a compound represented by formula (26.2).

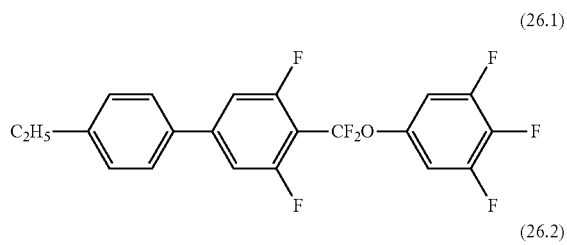
(26.1)

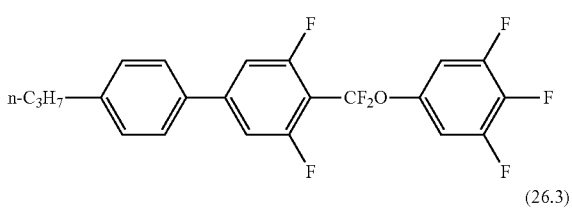
(26.2)

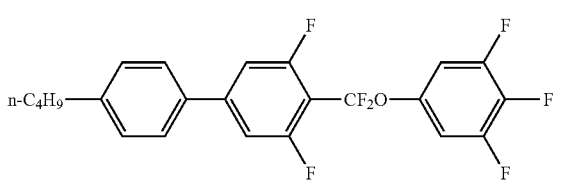
(26.3)

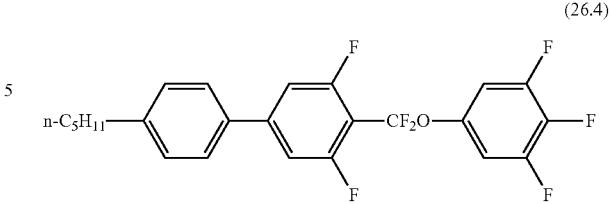
(26.4)

The amount of the compound represented by formula (26.2) is determined with due consideration of the solubility at low temperature, the transition temperature, the electrical reliability and the birefringence and the like, and relative to the total mass of the liquid crystal composition of the present invention, the amount is preferably at least 2% by mass, and more preferably 4% by mass or more. Further, in consideration of the solubility at low temperature, the transition temperature and the electrical reliability and the like, the maximum amount of the compound is preferably restricted to not more than 40% by mass, more preferably 35% by mass or less, still more preferably 30% by mass or less, still more preferably 25% by mass or less, still more preferably 21% by mass or less, and particularly preferably 16% by mass or less.

Moreover, the compound represented by general formula (VIII) is preferably a compound represented by general formula (VIII-2).

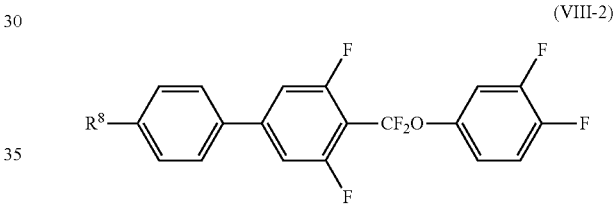
(VIII-2)

In the formula, $R^8$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined and used in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three or more types of compounds may be used.

The amount of the compound represented by general formula (VIII-2) is determined with due consideration of the solubility at low temperature, the transition temperature, the electrical reliability and the birefringence and the like, and is preferably at least 2.5% by mass, more preferably 8% by mass or more, still more preferably 10% by mass or more, and still more preferably 12% by mass or more. Further, the maximum amount that can be included is preferably not more than 25% by mass, more preferably 20% by mass or less, and still more preferably 15% by mass or less.

The compound represented by general formula (VIII-2) is preferably a compound represented by formula (27.1) to formula (27.4), and more preferably a compound represented by formula (27.2).

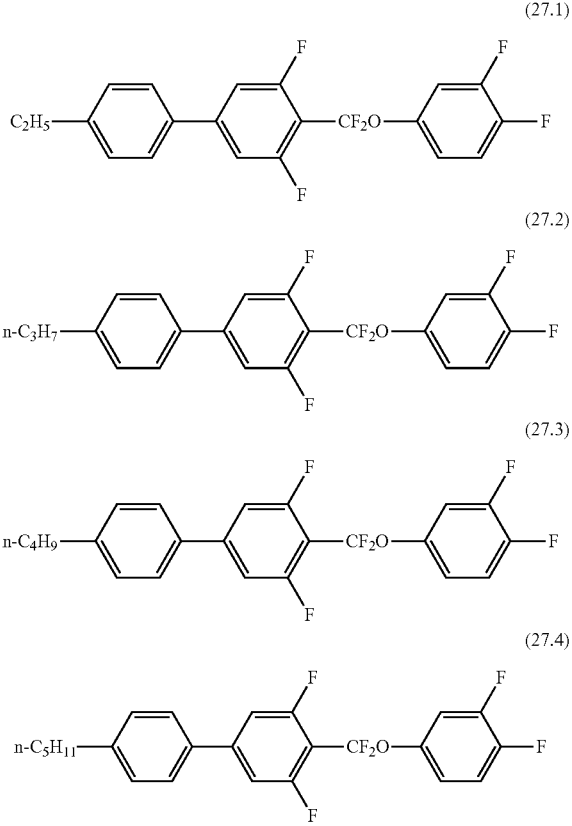

(27.1), (27.2), (27.3), (27.4)

Further, the compound represented by general formula (M) is, for example, preferably a compound selected from the group of compounds represented by general formula (IX).

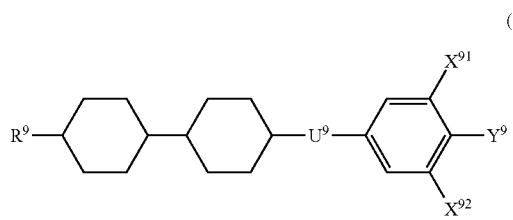

(IX)

In the formula, $R^9$ represents an alkyl group of 1 to 5 carbon atoms, an alkenyl group of 2 to 5 carbon atoms or an alkoxy group of 1 to 4 carbon atoms, each of $X^{91}$ and $X^{92}$ independently represents a hydrogen atom or a fluorine atom, $Y^9$ represents a fluorine atom, a chlorine atom or —$OCF_3$, and $U^9$ represents a single bond, —COO— or —$CF_2O$—.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 5 types of compounds may be used. Moreover, in yet another embodiment of the present invention, 6 or more types of compounds may be used.

In the liquid crystal composition of the present invention, it is necessary to appropriately adjust the amount of the compound represented by general formula (IX) in accordance with the level of performance required for properties such as the solubility at low temperature, the transition temperature, the electrical reliability, the birefringence, the process compatibility, dropping mark defects, burn-in and the dielectric anisotropy.

For example, in one embodiment of the present invention, the lower limit for a preferred amount of the above compound relative to the total mass of the liquid crystal composition of the present invention is 3%. Further, in another embodiment of the present invention, the lower limit is 5%. In yet another embodiment of the present invention, the lower limit is 8%. In yet another embodiment of the present invention, the lower limit is 10%. In yet another embodiment of the present invention, the lower limit is 12%. In yet another embodiment of the present invention, the lower limit is 15%. In yet another embodiment of the present invention, the lower limit is 17%. In yet another embodiment of the present invention, the lower limit is 20%. In yet another embodiment of the present invention, the lower limit is 24%. In yet another embodiment of the present invention, the lower limit is 28%. In yet another embodiment of the present invention, the lower limit is 30%. In yet another embodiment of the present invention, the lower limit is 34%. In yet another embodiment of the present invention, the lower limit is 39%. In yet another embodiment of the present invention, the lower limit is 40%. In yet another embodiment of the present invention, the lower limit is 42%. Moreover, in yet another embodiment of the present invention, the lower limit is 45%.

In addition, the upper limit for a preferred amount of the compound relative to the total mass of the liquid crystal composition of the present invention is 70% in one embodiment of the present invention. Further, in another embodiment of the present invention, the upper limit is 60%. In yet another embodiment of the present invention, the upper limit is 55%. In yet another embodiment of the present invention, the upper limit is 50%. In yet another embodiment of the present invention, the upper limit is 45%. In yet another embodiment of the present invention, the upper limit is 40%. In yet another embodiment of the present invention, the upper limit is 35%. In yet another embodiment of the present invention, the upper limit is 30%. In yet another embodiment of the present invention, the upper limit is 25%. In yet another embodiment of the present invention, the upper limit is 20%. In yet another embodiment of the present invention, the upper limit is 15%. Moreover, in yet another embodiment of the present invention, the upper limit is 10%.

When it is necessary to maintain the viscosity of the liquid crystal composition of the present invention at a low value, and obtain a liquid crystal composition having a fast response speed, it is preferable that the lower limit and the upper limit mentioned above are set to low values. Moreover, when it is necessary to maintain the Tni of the liquid crystal composition of the present invention at a high value, and obtain a liquid crystal composition that is resistant to burn-in, it is preferable that the lower limit and the upper limit mentioned above are set to low values. Further, when it is desirable to have a large dielectric anisotropy in order to ensure a low drive voltage, it is preferable that the lower limit and the upper limit mentioned above are set to high values.

Moreover, the compound represented by general formula (IX) is preferably a compound represented by general formula (IX-1).

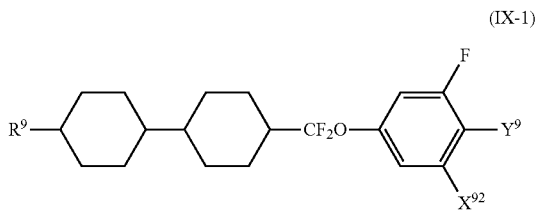

(IX-1)

In the formula, $R^9$ represents an alkyl group of 1 to 5 carbon atoms, an alkenyl group of 2 to 5 carbon atoms or an alkoxy group of 1 to 4 carbon atoms, $X^{92}$ represents a hydrogen atom or a fluorine atom, and $Y^9$ represents a fluorine atom or —$OCF_3$.

There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. In yet another embodiment of the present invention, three types of compounds may be used. Moreover, in yet another embodiment of the present invention, 4 or more types of compounds may be used.

Moreover, the compound represented by general formula (IX-1) is preferably a compound represented by general formula (IX-1-1).

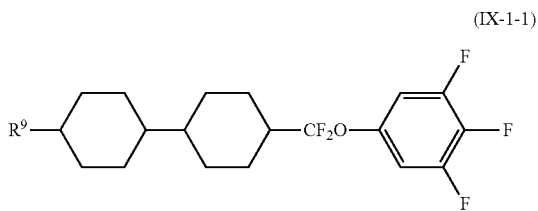

(IX-1-1)

In the formula, $R^9$ represents an alkyl group of 1 to 5 carbon atoms, an alkenyl group of 2 to 5 carbon atoms or an alkoxy group of 1 to 4 carbon atoms, There are no particular limitations on the types of these compounds that can be combined, and compounds can be combined in accordance with the level of performance required for properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Moreover, in yet another embodiment of the present invention, three or more types of compounds may be used.

The amount of the compound represented by general formula (IX-1-1) has a preferred upper limit and lower limit which are determined for each embodiment with due consideration of the solubility at low temperature, the transition temperature and the electrical reliability and the like. The lower limit for the amount of the compound relative to the total mass of the liquid crystal composition of the present invention is 1% in one embodiment, 2% in another embodiment, 4% in yet another embodiment, 10% in yet another embodiment, 14% in yet another embodiment, 16% in yet another embodiment, and 21% in yet another embodiment.

Further, the maximum amount is 40% in one embodiment, 35% in another embodiment, 30% in yet another embodiment, 25% in yet another embodiment, 10% in yet another embodiment, 7% in yet another embodiment, and 5% in yet another embodiment.

Moreover, the compound represented by general formula (Ix-1-1) is preferably a compound represented by formula (28.1) to formula (28.5), and is more preferably a compound represented by formula (28.3) and/or formula (28.5).

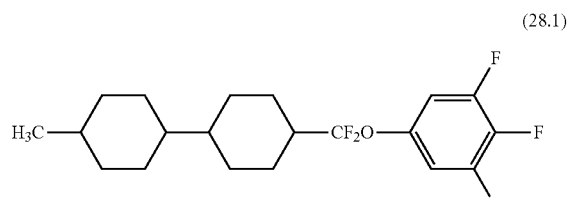

(28.1)

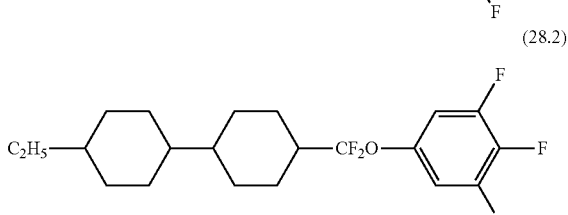

(28.2)

(28.3)

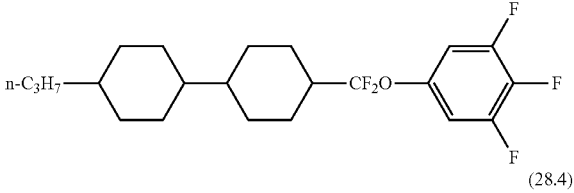

(28.4)

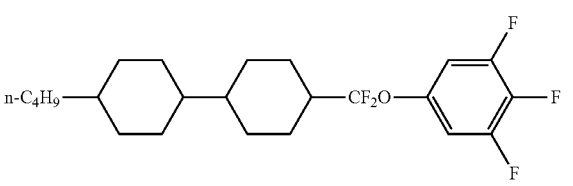

(28.5)

In the liquid crystal composition of the present invention, the amount of the compound represented by formula (28.3) relative to the total mass of the liquid crystal composition of the present invention is preferably at least 1% by mass, more preferably 5% by mass or more, still more preferably 8% by mass or more, still more preferably 10% by mass or more, still more preferably 14% by mass or more, and particularly preferably 16% by mass or more. Further, in consideration of the solubility at low temperature, the transition temperature and the electrical reliability and the like, the maximum amount of the compound is preferably restricted to not more than 30% by mass, more preferably 25% by mass or less, still more preferably 22% by mass or less, and particularly preferably less than 20% by mass.

In the liquid crystal composition of the present invention, the amount of the compound represented by formula (28.5) relative to the total mass of the liquid crystal composition of the present invention is preferably at least 3% by mass, more preferably 7% by mass or more, and particularly preferably 10% by mass or more. Further, in consideration of the solubility at low temperature, the transition temperature and the electrical reliability and the like, the maximum amount of the compound is preferably restricted to not more than 25% by mass, more preferably less than 20% by mass, still more preferably 15% by mass or less, and particularly preferably less than 13% by mass.

Moreover, the compound represented by general formula (IX-1) is preferably a compound represented by general formula (IX-1-2).

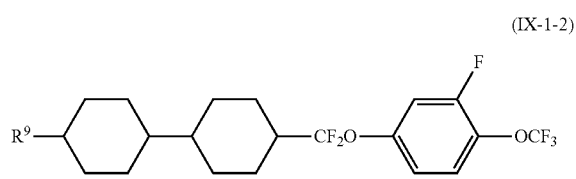
(IX-1-2)

In the formula, $R^9$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, one to three types of compounds are preferably combined with due consideration of properties such as the solubility at low temperature, the transition temperature, the electrical reliability and the birefringence, and a combination of 1 to 4 types of compounds is more preferable.

The amount of the compound represented by general formula (IX-1-2) relative to the total mass of the liquid crystal composition of the present invention is preferably at least 1% by mass, more preferably 5% by mass or more, still more preferably 8% by mass or more, still more preferably 10% by mass or more, still more preferably 14% by mass or more, and particularly preferably 16% by mass or more. Further, in consideration of the solubility at low temperature, the transition temperature and the electrical reliability and the like, the maximum amount of the compound is preferably restricted to not more than 30% by mass, more preferably 25% by mass or less, still more preferably 22% by mass or less, and particularly preferably less than 20% by mass.

Moreover, the compound represented by general formula (IX-1-2) is preferably a compound represented by formula (29.1) to formula (29.4), and is more preferably a compound represented by formula (29.2) and/or formula (29.4).

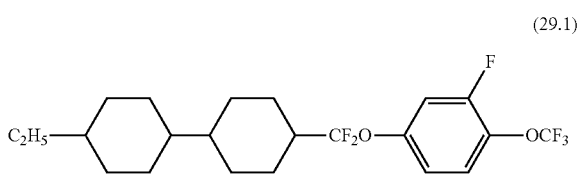
(29.1)

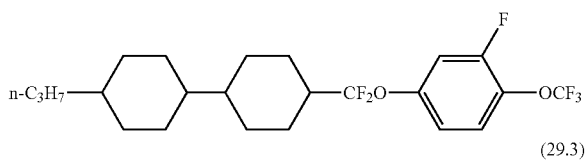
(29.2)

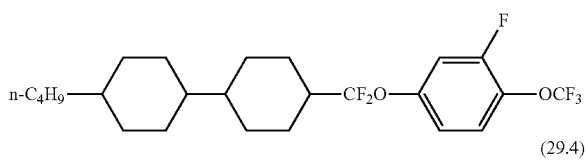
(29.3)

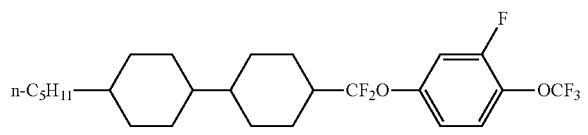
(29.4)

Moreover, the compound represented by general formula (IX) is preferably a compound represented by general formula (IX-2).

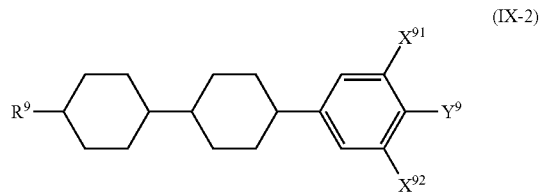
(IX-2)

In the formula, $R^9$ represents an alkyl group of 1 to 5 carbon atoms, an alkenyl group of 2 to 5 carbon atoms or an alkoxy group of 1 to 4 carbon atoms, each of $X^{91}$ and $X^{92}$ independently represents a hydrogen atom or a fluorine atom, and $Y^9$ represents a fluorine atom, a chlorine atom or —$OCF_3$.

There are no particular limitations on the types of these compounds that can be combined, and compounds can be combined and used as appropriate for each embodiment with due consideration of properties such as the solubility at low temperature, the transition temperature, the electrical reliability and the birefringence. For example, a single type of compound may be used in one embodiment of the present invention, two types of compounds may be used in another embodiment, three types of compounds may be used in yet another embodiment, 4 types of compounds may be used in yet another embodiment, 5 types of compounds may be used in yet another embodiment, and 6 or more types of compounds may be used in yet another embodiment.

Moreover, the compound represented by general formula (IX-2) is preferably a compound represented by general formula (IX-2-1).

(IX-2-1)

In the formula, $R^9$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, but one to three types of compounds are preferably combined with due consideration of properties such as the solubility at low temperature, the transition temperature, the electrical reliability and the birefringence.

The amount of the compound represented by general formula (IX-2-1) has a preferred upper limit and lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 1% in one embodiment of the present invention, 2% in another embodiment, 4% in yet another embodiment, 10% in yet another embodiment, 14% in yet another embodiment, 16% in yet another embodiment, and 21% in yet another embodiment. Further, the upper limit for the amount of the compound is 40% in one embodiment of the present invention, 35% in another embodiment, 30% in yet another embodiment, 25% in yet another embodiment, 22% in yet another embodiment, 20% in yet another embodiment, 10% in yet another embodiment, 7% in yet another embodiment, and 5% in yet another embodiment.

Moreover, the compound represented by general formula (IX-2-1) is preferably a compound represented by formula (30.1) to formula (30.4), and is more preferably a compound represented by formula (30.1) or formula (30.2).

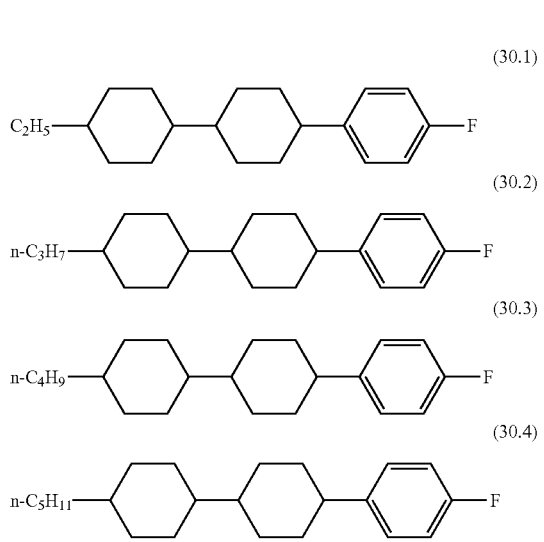

Further, the compound represented by general formula (IX-2) is preferably a compound represented by general formula (IX-2-2).

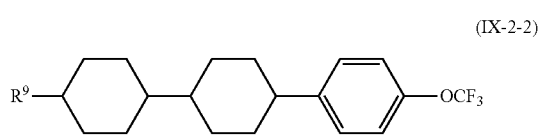

In the formula, $R^9$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, one to three types of compounds are preferably combined with due consideration of properties such as the solubility at low temperature, the transition temperature, the electrical reliability and the birefringence, and a combination of 1 to 4 types of compounds is particularly preferable.

The amount of the compound represented by general formula (IX-2-2) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 1% in one embodiment of the present invention, 2% in another embodiment, 4% in yet another embodiment, 10% in yet another embodiment, 14% in yet another embodiment, 16% in yet another embodiment, and 21% in yet another embodiment. Further, the upper limit for the amount of the compound is 40% in one embodiment of the present invention, 35% in another embodiment, 30% in yet another embodiment, 25% in yet another embodiment, 22% in yet another embodiment, 15% in yet another embodiment, 12% in yet another embodiment, 8% in yet another embodiment, and 4% in yet another embodiment.

The compound represented by general formula (IX-2-2) is preferably a compound represented by formula (31.1) to formula (31.4), and is more preferably a compound represented by formula (31.1) to formula (31.4).

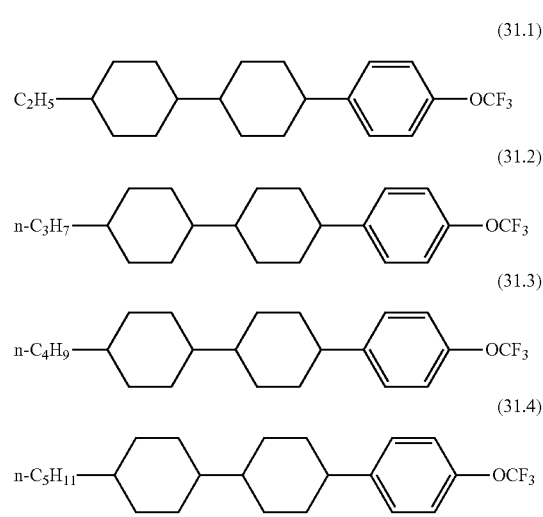

Moreover, the compound represented by general formula (IX-2) is preferably a compound represented by general formula (IX-2-3).

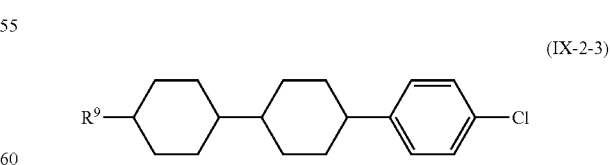

In the formula, $R^9$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and either one type of compound or a combination of two types is preferably included with due consideration of properties such as the solubility at low temperature, the transition temperature, the electrical reliability and the birefringence.

The amount of the compound represented by general formula (IX-2-3) relative to the total mass of the liquid crystal composition of the present invention is preferably at least 1% by mass, more preferably 3% by mass or more, still more preferably 6% by mass or more, still more preferably 8% by mass or more, and particularly preferably 15% by mass or more. Further, in consideration of the solubility at low temperature, the transition temperature and the electrical reliability and the like, the maximum amount of the compound is preferably restricted to not more than 30% by mass, more preferably less than 20% by mass, still more preferably 15% by mass or less, and particularly preferably less than 10% by mass.

The compound represented by general formula (IX-2-3) is preferably a compound represented by formula (32.1) to formula (32.4), and is more preferably a compound represented by formula (32.2) and/or formula (32.4).

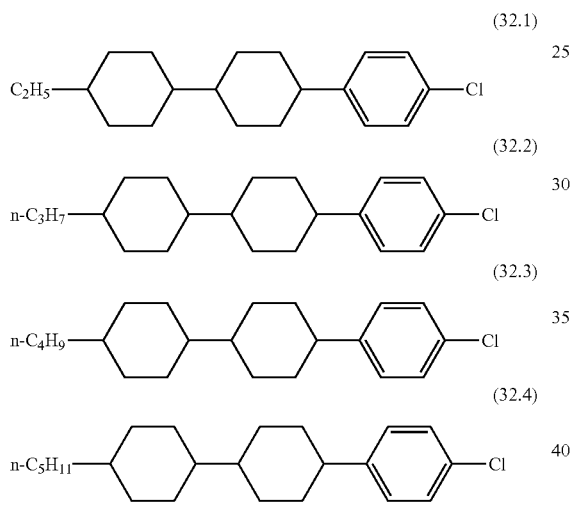

Moreover, the compound represented by general formula (IX-2) is preferably a compound represented by general formula (IX-2-4).

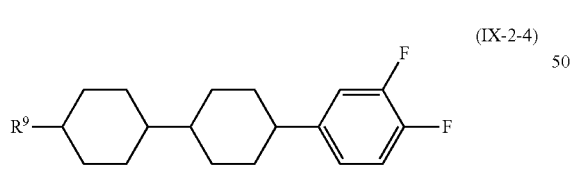

In the formula, $R^9$ represents an alkyl group of 1 to 5 carbon atoms, an alkenyl group of 2 to 5 carbon atoms, or an alkoxy group of 1 to 4 carbon atoms.

The amount of the compound represented by general formula (IX-2-4) relative to the total mass of the liquid crystal composition of the present invention is preferably at least 1% by mass, more preferably 3% by mass or more, still more preferably 6% by mass or more, and particularly preferably 8% by mass or more. Further, in consideration of the solubility at low temperature, the transition temperature and the electrical reliability and the like, the maximum amount of the compound is preferably restricted to not more than 30% by mass, more preferably 20% by mass or less, still more preferably 15% by mass or less, and particularly preferably less than 10% by mass.

The compound represented by general formula (IX-2-4) is preferably a compound represented by formula (33.1) to formula (33.5), and is more preferably a compound represented by formula (33.1) and/or formula (33.3).

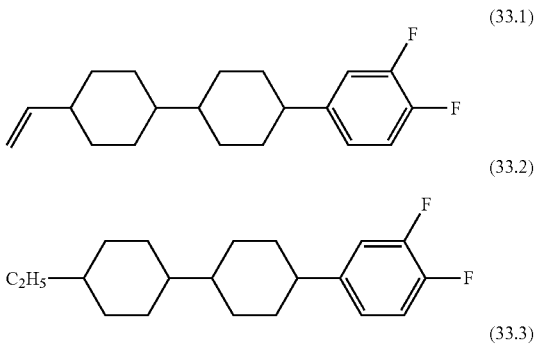

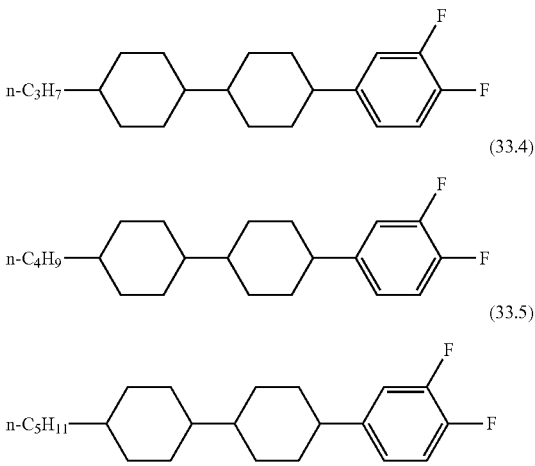

Moreover, the compound represented by general formula (IX-2) is preferably a compound represented by general formula (IX-2-5).

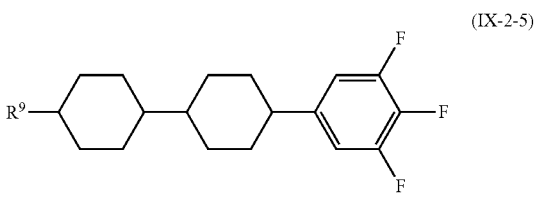

In the formula, $R^9$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined and used as appropriate for each embodiment with due consideration of properties such as the solubility at low temperature, the transition temperature, the electrical reliability and the birefringence. For example, a single type of compound may be used in one embodiment of the present invention, two types of compounds may be used in another embodiment, three types of compounds may be used in yet another embodiment, and 4 or more types of compounds may be used in yet another embodiment.

The amount of the compound represented by general formula (IX-2-5) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 4% in one embodiment of the present invention, 8% in another embodiment, 12% in yet another embodiment, 21% in yet another embodiment, 30% in yet another embodiment, 31% in yet another embodiment, and 34% in yet another embodiment. Further, the upper limit for the amount of the compound is 45% in one embodiment of the present invention, 40% in another embodiment, 35% in yet another embodiment, 32% in yet another embodiment, 22% in yet another embodiment, 13% in yet another embodiment, 9% in yet another embodiment, 8% in yet another embodiment, and 5% in yet another embodiment.

When it is necessary to maintain the viscosity of the liquid crystal composition of the present invention at a low value, and obtain a liquid crystal composition having a fast response speed, it is preferable that the lower limit and the upper limit mentioned above are set to low values. Moreover, when it is necessary to maintain the Tni of the liquid crystal composition of the present invention at a high value, and obtain a liquid crystal composition having resistance to burn-in, it is preferable that the lower limit and the upper limit mentioned above are set to low values. Further, when it is desirable to have a large dielectric anisotropy in order to ensure a low drive voltage, it is preferable that the lower limit and the upper limit mentioned above are set to high values.

The compound represented by general formula (IX-2-5) is preferably a compound represented by formula (34.1) to formula (34.5), and is more preferably a compound represented by formula (34.1), formula (34.2), formula (34.3) and/or formula (34.5).

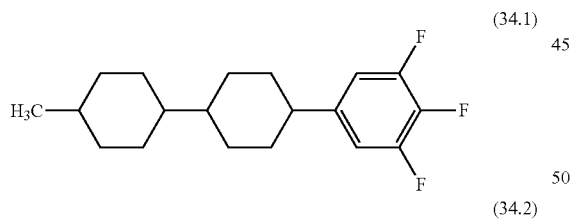

(34.1)

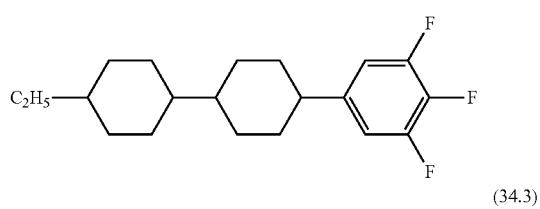

(34.2)

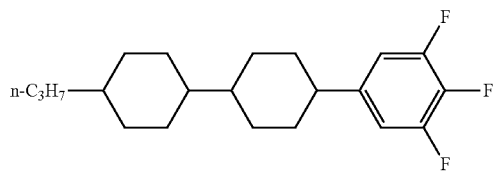

(34.3)

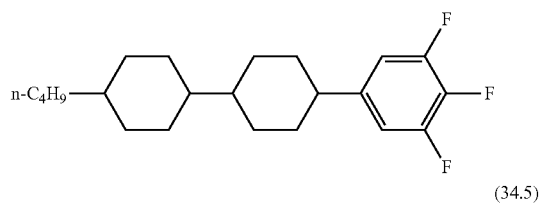

(34.4)

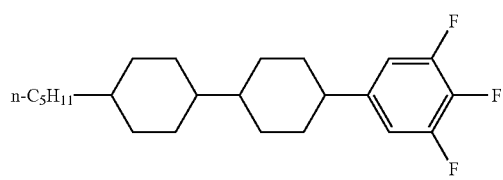

(34.5)

In addition, the compound represented by general formula (IX) is preferably a compound represented by general formula (IX-3).

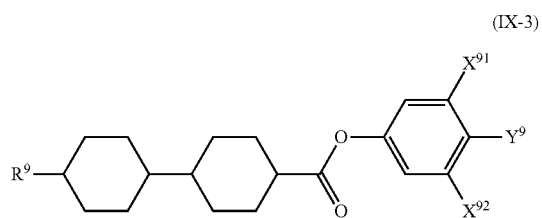

(IX-3)

In the formula, $R^9$ represents an alkyl group of 1 to 5 carbon atoms, an alkenyl group of 2 to 5 carbon atoms or an alkoxy group of 1 to 4 carbon atoms, each of $X^{91}$ and $X^{92}$ independently represents a hydrogen atom or a fluorine atom, and $Y^9$ represents a fluorine atom, a chlorine atom or —$OCF_3$.

The compound represented by general formula (IX-3) is preferably a compound represented by general formula (IX-3-1).

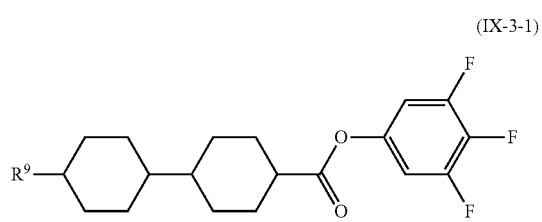

(IX-3-1)

In the formula, $R^9$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and either one type of compound or a combination of two or more types is preferably included in accordance with the level of performance required for properties such as the solubility at low temperature, the transition temperature, the electrical reliability and the birefringence.

The amount of the compound represented by general formula (IX-3-1) relative to the total mass of the liquid crystal composition of the present invention is preferably at least 3% by mass, more preferably 7% by mass or more, still more preferably 13% by mass or more, and particularly preferably 15% by mass or more. Further, in consideration of the solubility at low temperature, the transition temperature and the electrical reliability and the like, the maximum amount of the compound is preferably restricted to not more than 30% by mass, more preferably 20% by mass or less, still more preferably 18% by mass or less, and particularly preferably less than 10% by mass.

Moreover, the compound represented by general formula (IX-3-1) is preferably a compound represented by formula (35.1) to formula (35.4), and is more preferably a compound represented by formula (35.1) and/or formula (35.2).

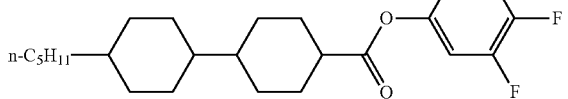

(35.1)

(35.2)

(35.3)

(35.4)

Further, the compound represented by general formula (M) is preferably a compound represented by general formula (X).

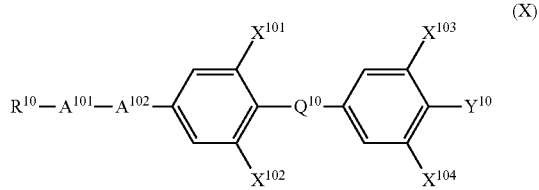

(X)

In the formula, each of $X^{101}$ to $X^{104}$ independently represents a fluorine atom or a hydrogen atom, $Y^{10}$ represents a fluorine atom, a chlorine atom or —$OCF_3$, $Q^{10}$ represents a single bond or —$CF_2O$—, $R^{10}$ represents an alkyl group of 1 to 5 carbon atoms, an alkenyl group of 2 to 5 carbon atoms or an alkoxy group of 1 to 4 carbon atoms, each of $A^{101}$ and $A^{102}$ independently represents a 1,4-cyclohexylene group, 1,4-phenylene group or a group represented by one of the formulas shown below,

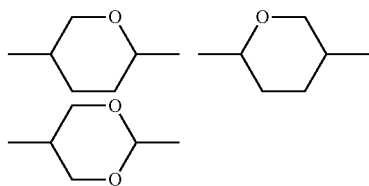

and a hydrogen atom on the 1,4-phenylene group may be substituted with a fluorine atom.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention. Further, in another embodiment of the present invention, two types of compounds may be used. In yet another embodiment, three types of compounds may be used. In yet another embodiment, 4 types of compounds may be used. Moreover, in yet another embodiment, 5 or more types of compounds may be used.

The amount of the compound represented by general formula (X) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 2% in one embodiment of the present invention, 3% in another embodiment, 6% in yet another embodiment, 8% in yet another embodiment, 9% in yet another embodiment, 11% in yet another embodiment, 12% in yet another embodiment, and 18% in yet another embodiment. Furthermore, the lower limit is 19% in yet another embodiment, 23% in yet another embodiment, and 25% in yet another embodiment. Further, the upper limit for the amount of the compound is 45% in one embodiment of the present invention, 35% in another embodiment, 30% in yet another embodiment, 25% in yet another embodiment, 20% in yet another embodiment, 13% in yet another embodiment, 9% in yet another embodiment, 6% in yet another embodiment, and 3% in yet another embodiment.

When it is necessary to maintain the viscosity of the liquid crystal composition of the present invention at a low value, and obtain a liquid crystal composition having a fast response speed, it is preferable that the lower limit and the upper limit mentioned above are set to low values. Moreover, when it is necessary to obtain a liquid crystal composition having resistance to burn-in, it is preferable that the lower limit and the upper limit mentioned above are set to low values. Further, when it is desirable to have a large dielectric anisotropy in order to ensure a low drive voltage, it is preferable that the lower limit and the upper limit mentioned above are set to high values.

The compound represented by general formula (X) used in the liquid crystal composition of the present invention is preferably a compound represented by general formula (X-1).

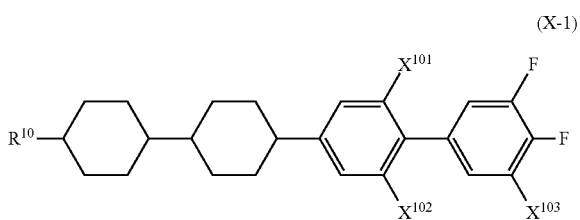

(X-1)

In the formula, each of $X^{101}$ to $X^{103}$ independently represents a fluorine atom or a hydrogen atom, and $R^{10}$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention. Further, in another embodiment of the present invention, two types of compounds may be used. In yet another embodiment, three types of compounds may be used. In yet another embodiment, 4 types of compounds may be used. Moreover, in yet another embodiment, 5 or more types of compounds may be used.

The amount of the compound represented by general formula (X-1) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 2% in one embodiment of the present invention, 3% in another embodiment, 5% in yet another embodiment, 6% in yet another embodiment, 7% in yet another embodiment, 8% in yet another embodiment, and 9% in yet another embodiment. Furthermore, the lower limit is 13% in yet another embodiment, 18% in yet another embodiment, and 23% in yet another embodiment.

Further, the upper limit for the amount of the compound is 40% in one embodiment of the present invention, 30% in another embodiment, 25% in yet another embodiment, 20% in yet another embodiment, 15% in yet another embodiment, 10% in yet another embodiment, 6% in yet another embodiment, 4% in yet another embodiment, and 2% in yet another embodiment.

The compound represented by general formula (X-1) used in the liquid crystal composition of the present invention is preferably a compound represented by general formula (X-1-1).

(X-1-1)

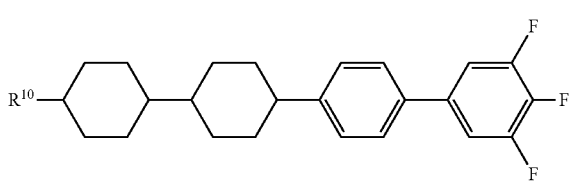

In the formula, $R^{10}$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention. Further, in another embodiment of the present invention, two types of compounds may be used. In yet another embodiment, three types of compounds may be used. Moreover, in yet another embodiment, 4 or more types of compounds may be used.

The amount of the compound represented by general formula (X-1-1) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 3% in one embodiment of the present invention, 4% in another embodiment, 6% in yet another embodiment, 9% in yet another embodiment, 12% in yet another embodiment, 15% in yet another embodiment, 18% in yet another embodiment, and 21% in yet another embodiment.

Further, the upper limit for the amount of the compound is 30% in one embodiment of the present invention, 20% in another embodiment, 13% in yet another embodiment, 10% in yet another embodiment, 7% in yet another embodiment, and 3% in yet another embodiment.

More specifically, the compound represented by general formula (X-1-1) used in the liquid crystal composition of the present invention is preferably a compound represented by formula (36.1) to formula (36.4), and the liquid crystal composition particularly preferably includes a compound represented by formula (36.1) and/or formula (36.2).

(36.1)

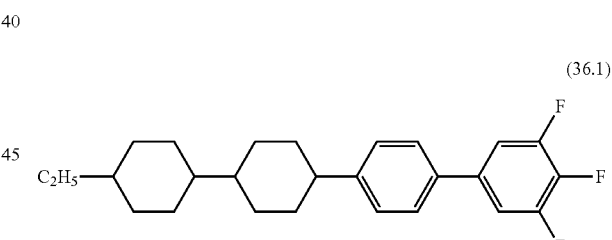

(36.2)

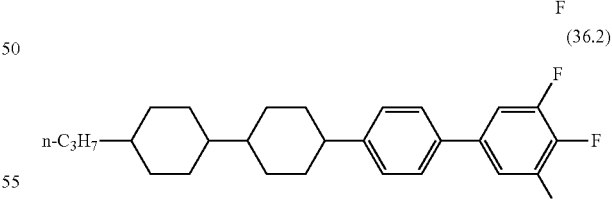

(36.3)

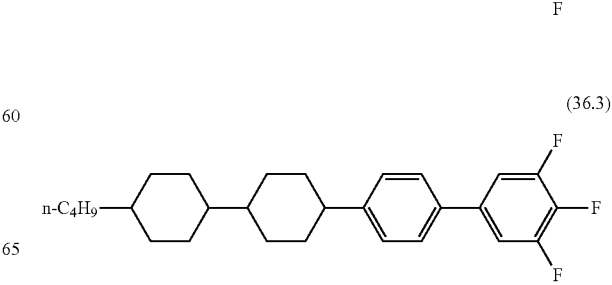

-continued (36.4)
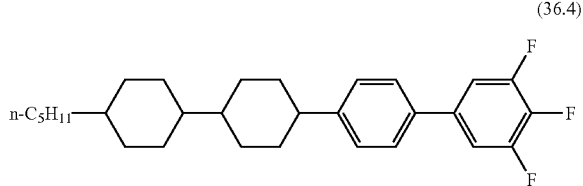

Further, the compound represented by general formula (X-1) used in the liquid crystal composition of the present invention is preferably a compound represented by general formula (X-1-2).

(X-1-2)
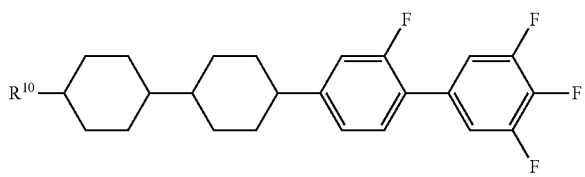

In the formula, $R^{10}$ represents an alkyl group of 1 to 5 carbon atoms, an alkenyl group of 2 to 5 carbon atoms, or an alkoxy group of 1 to 4 carbon atoms.

The amount of the compound represented by general formula (X-1-2) relative to the total mass of the liquid crystal composition of the present invention is preferably at least 1% by mass, more preferably 2% by mass or more, and still more preferably 6% by mass or more. Further, in consideration of the solubility at low temperature, the transition temperature and the electrical reliability and the like, the maximum amount is preferably restricted to not more than 20% by mass, more preferably 16% by mass or less, still more preferably 12% by mass or less, and particularly preferably 10% by mass or less.

More specifically, the compound represented by general formula (X-1-2) used in the liquid crystal composition of the present invention is preferably a compound represented by formula (37.1) to formula (37.4), and the liquid crystal composition preferably includes a compound represented by formula (37.2).

(37.1)
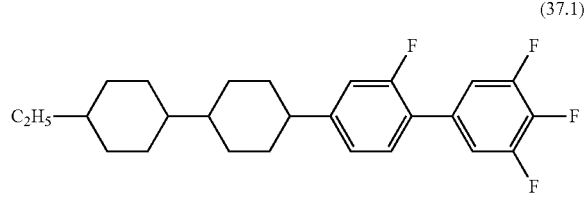

(37.2)
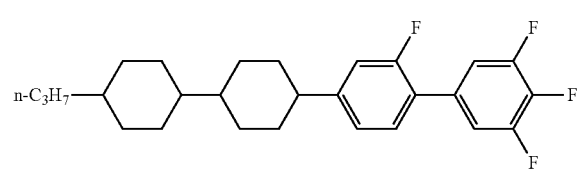

-continued (37.3)
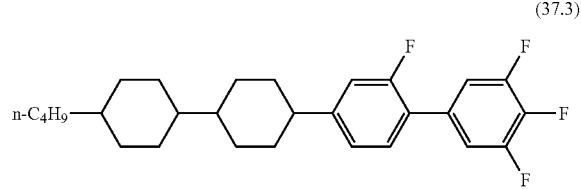

(37.4)
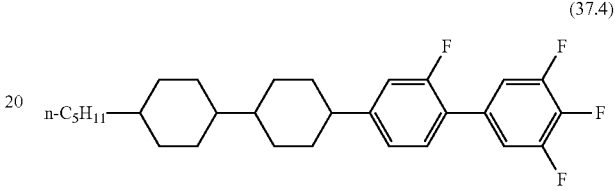

Further, the compound represented by general formula (X-1) used in the liquid crystal composition of the present invention is preferably a compound represented by general formula (X-1-3).

(X-1-3)
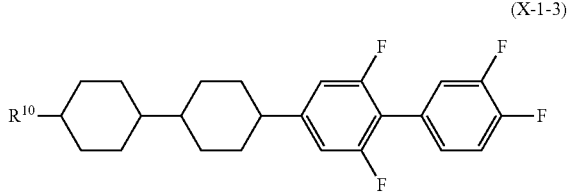

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence.

The amount of the compound represented by general formula (X-1-3) relative to the total mass of the liquid crystal composition of the present invention is preferably at least 1% by mass, more preferably 2% by mass or more, and still more preferably 6% by mass or more. Further, in consideration of the solubility at low temperature, the transition temperature and the electrical reliability and the like, the maximum amount is preferably restricted to not more than 20% by mass, more preferably 16% by mass or less, still more preferably 12% by mass or less, and particularly preferably 10% by mass or less.

More specifically, the compound represented by general formula (X-1-3) used in the liquid crystal composition of the present invention is preferably a compound represented by formula (38.1) to formula (38.4), and the liquid crystal composition particularly preferably includes a compound represented by formula (38.2).

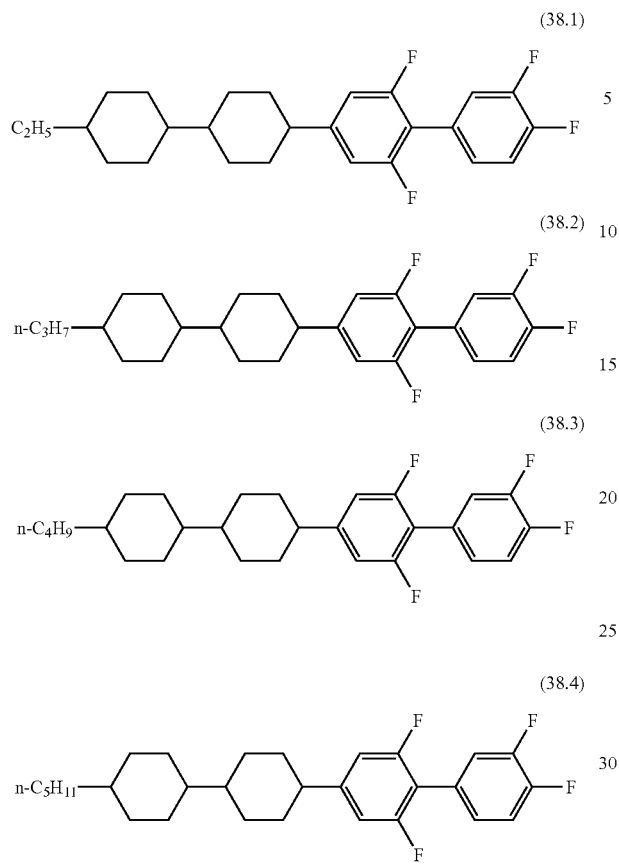

(38.1), (38.2), (38.3), (38.4)

Moreover, the compound represented by general formula (X) used in the liquid crystal composition of the present invention is preferably a compound represented by general formula (X-2).

(X-2)

In the formula, each of $X^{102}$ and $X^{103}$ independently represents a fluorine atom or a hydrogen atom, $Y^{10}$ represents a fluorine atom, a chlorine atom or —$OCF_3$, and $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence.

Further, the compound represented by general formula (X-2) used in the liquid crystal composition of the present invention is preferably a compound represented by general formula (X-2-1).

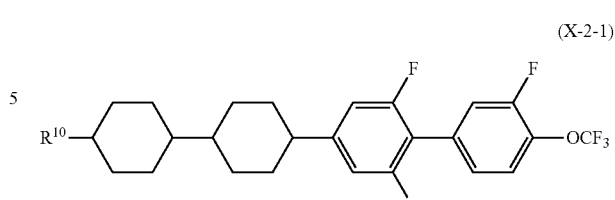

(X-2-1)

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types is more preferred.

The amount of the compound represented by general formula (X-2-1) relative to the total mass of the liquid crystal composition of the present invention is preferably at least 3% by mass, more preferably 4% by mass or more, and still more preferably 5% by mass or more. Further, in consideration of the solubility at low temperature, the transition temperature and the electrical reliability and the like, the maximum amount is preferably restricted to not more than 20% by mass, more preferably 16% by mass or less, still more preferably 12% by mass or less, and particularly preferably 10% by mass or less.

More specifically, the compound represented by general formula (X-2-1) used in the liquid crystal composition of the present invention is preferably a compound represented by formula (39.1) to formula (39.4), and the liquid crystal composition particularly preferably includes a compound represented by formula (39.2).

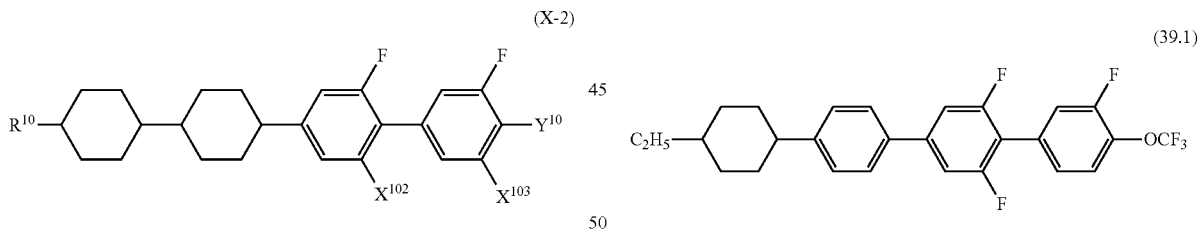

(39.1)

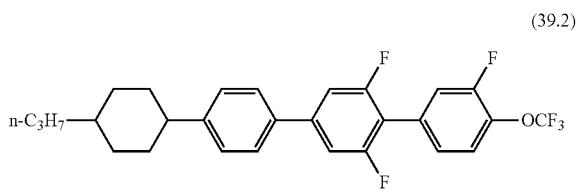

(39.2)

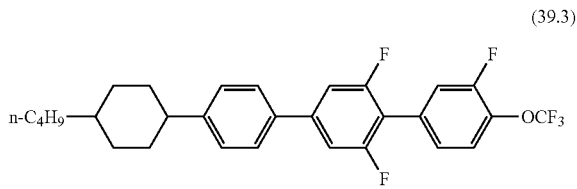

(39.3)

(39.4)

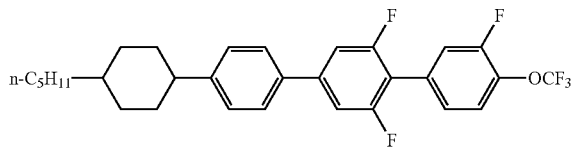

(40.2)

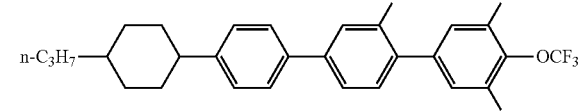

(40.3)

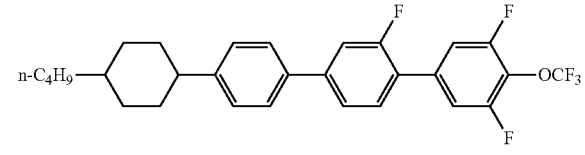

(40.4)

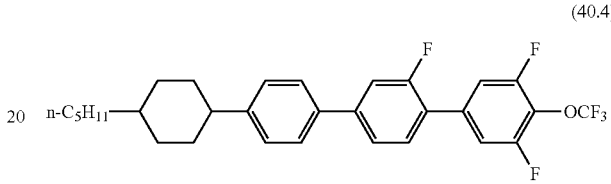

Moreover, the compound represented by general formula (X-2) used in the liquid crystal composition of the present invention is preferably a compound represented by general formula (X-2-2).

(X-2-2)

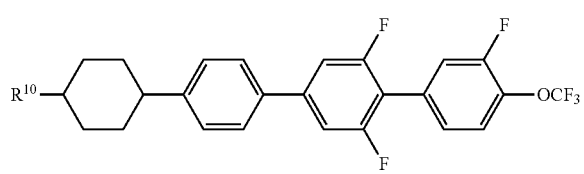

In addition, the compound represented by general formula (X) is preferably a compound represented by general formula (X-3).

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence.

The amount of the compound represented by general formula (X-2-2) relative to the total mass of the liquid crystal composition of the present invention is preferably at least 3% by mass, more preferably 6% by mass or more, and still more preferably 9% by mass or more. Further, in consideration of the solubility at low temperature, the transition temperature and the electrical reliability and the like, the maximum amount is preferably restricted to not more than 20% by mass, more preferably 16% by mass or less, still more preferably 12% by mass or less, and particularly preferably 10% by mass or less.

More specifically, the compound represented by general formula (X-2-2) used in the liquid crystal composition of the present invention is preferably a compound represented by formula (40.1) to formula (40.4), and the liquid crystal composition particularly preferably includes a compound represented by formula (40.2).

(X-3)

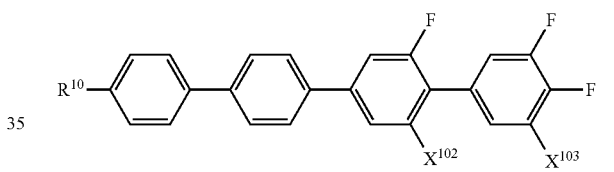

In the formula, each of $X^{102}$ and $X^{103}$ independently represents a fluorine atom or a hydrogen atom, and $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence.

Further, the compound represented by general formula (X-3) used in the liquid crystal composition of the present invention is preferably a compound represented by general formula (X-3-1).

(X-3-1)

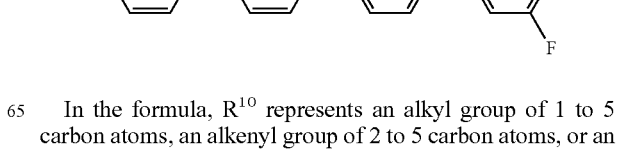

In the formula, $R^{10}$ represents an alkyl group of 1 to 5 carbon atoms, an alkenyl group of 2 to 5 carbon atoms, or an alkoxy group of 1 to 4 carbon atoms.

(40.1)

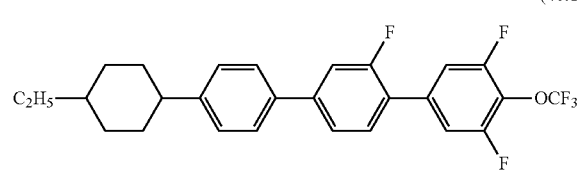

Although there are no particular limitations on the types of these compounds that can be combined, either one type of compound or a combination of two or more types is preferably included with due consideration of properties such as the solubility at low temperature, the transition temperature, the electrical reliability and the birefringence.

The amount of the compound represented by general formula (X-3-1) relative to the total mass of the liquid crystal composition of the present invention is preferably at least 1% by mass, more preferably 2% by mass or more, and still more preferably 3% by mass or more. Further, in consideration of the solubility at low temperature, the transition temperature and the electrical reliability and the like, the maximum amount is preferably restricted to not more than 10% by mass, more preferably 8% by mass or less, still more preferably 6% by mass or less, and particularly preferably 4% by mass or less.

More specifically, the compound represented by general formula (X-3-1) used in the liquid crystal composition of the present invention is preferably a compound represented by formula (41.1) to formula (41.4), and the liquid crystal composition particularly preferably includes a compound represented by formula (41.2).

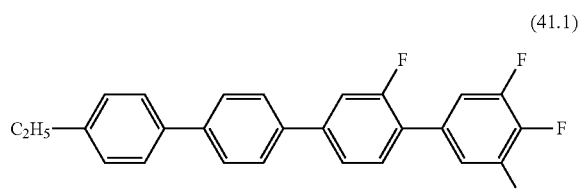
(41.1)

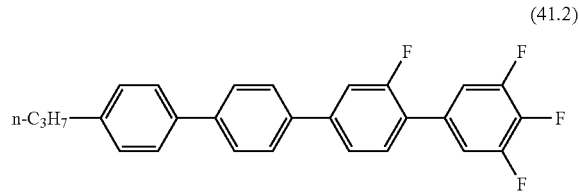
(41.2)

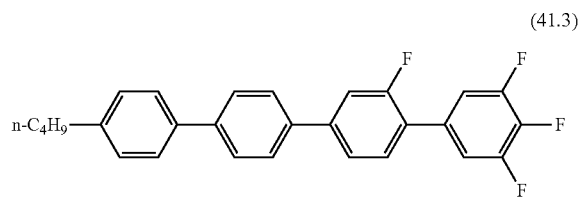
(41.3)

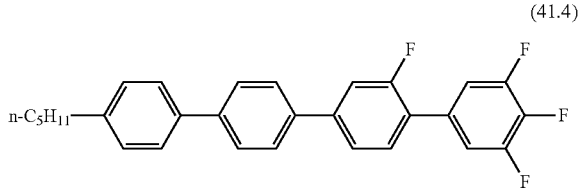
(41.4)

In addition, the compound represented by general formula (X) is preferably a compound represented by general formula (X-4).

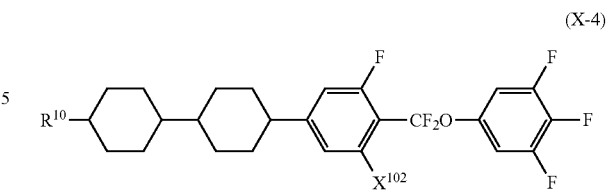
(X-4)

In the formula, $X^{102}$ represents a fluorine atom or a hydrogen atom, and $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types is more preferred.

The compound represented by general formula (X-4) used in the liquid crystal composition of the present invention is preferably a compound represented by general formula (X-4-1).

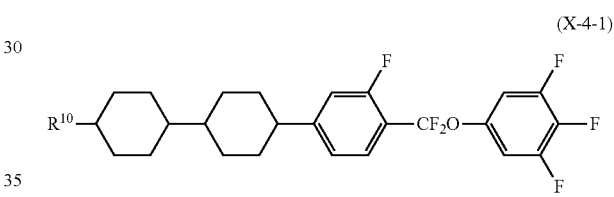
(X-4-1)

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types is more preferred.

The amount of the compound represented by general formula (X-4-1) relative to the total mass of the liquid crystal composition of the present invention is preferably at least 1% by mass, more preferably 2% by mass or more, and still more preferably 3% by mass or more. Further, in consideration of the solubility at low temperature, the transition temperature and the electrical reliability and the like, the maximum amount is preferably restricted to not more than 20% by mass, more preferably 17% by mass or less, still more preferably 15% by mass or less, still more preferably 13% by mass or less, and particularly preferably 10% by mass or less.

More specifically, the compound represented by general formula (X-4-1) used in the liquid crystal composition of the present invention is preferably a compound represented by formula (42.1) to formula (42.4), and the liquid crystal composition particularly preferably includes a compound represented by formula (42.3).

(42.1)

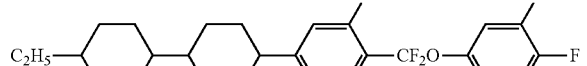
(42.2)

(42.3)

(42.4)

In addition, the compound represented by general formula (X) is preferably a compound represented by general formula (X-5).

(X-5)

In the formula, $X^{102}$ represents a fluorine atom or a hydrogen atom, and $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types is more preferred.

The compound represented by general formula (X-5) used in the liquid crystal composition of the present invention is preferably a compound represented by general formula (X-5-1).

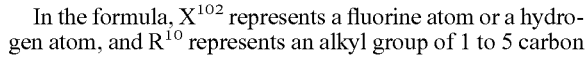
(X-5-1)

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types is more preferred.

More specifically, the compound represented by general formula (X-5-1) used in the liquid crystal composition of the present invention is preferably a compound represented by formula (43.1) to formula (43.4), and the liquid crystal composition particularly preferably includes a compound represented by formula (43.2).

(43.1)

(43.2)

(43.3)

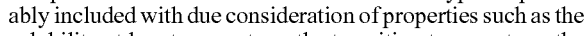
(43.4)

In addition, the compound represented by general formula (X) used in the liquid crystal composition of the present invention is preferably a compound represented by general formula (X-6).

(X-6)

In the formula, $R^{10}$ represents an alkyl group of 1 to 5 carbon atoms, an alkenyl group of 2 to 5 carbon atoms, or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence.

The amount of the compound represented by general formula (X-6) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 4% in one embodiment of the present invention, 5% in another embodiment, 6% in yet another embodiment, 8% in yet another embodiment, 9% in yet another embodiment, 11% in yet another embodiment, 14% in yet another embodiment, and 18% in yet another embodiment.

Further, the upper limit for the amount of the compound is 30% in one embodiment of the present invention, 20% in another embodiment, 13% in yet another embodiment, 10% in yet another embodiment, 7% in yet another embodiment, and 3% in yet another embodiment.

Moreover, the compound represented by general formula (X-6) used in the liquid crystal composition of the present invention is preferably a compound represented by formula (44.1) to formula (44.4), and the liquid crystal composition particularly preferably includes a compound represented by formula (44.1) and/or formula (44.2).

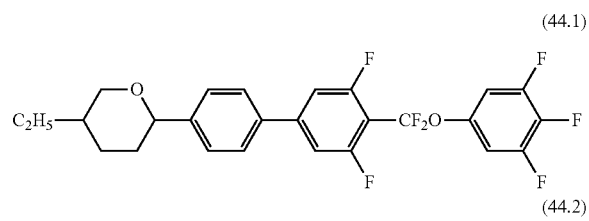
(44.1)

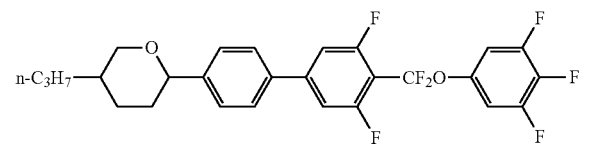
(44.2)

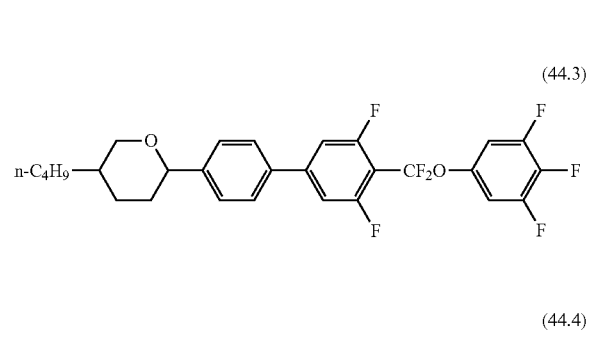
(44.3)

(44.4)

Moreover, the compound represented by general formula (L) or the compound represented by general formula (X) is preferably a compound selected from the group of compounds represented by general formula (XI).

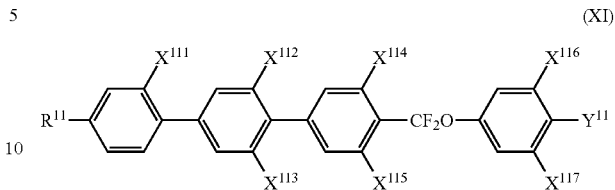
(XI)

In the formula, each of $X^{111}$ to $X^{117}$ independently represents a fluorine atom or a hydrogen atom, provided that at least one of $X^{111}$ to $X^{117}$ represents a fluorine atom, $R^{11}$ represents an alkyl group of 1 to 5 carbon atoms, an alkenyl group of 2 to 5 carbon atoms or an alkoxy group of 1 to 4 carbon atoms, and $Y^{11}$ represents a fluorine atom or —$OCF_3$.

Although there are no particular limitations on the types of these compounds that can be combined, one to three or more types of compounds are preferably combined with due consideration of properties such as the solubility at low temperature, the transition temperature, the electrical reliability and the birefringence.

The amount of the compound represented by general formula (XI) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 2% in one embodiment of the present invention, 4% in another embodiment, 5% in yet another embodiment, 7% in yet another embodiment, 9% in yet another embodiment, 10% in yet another embodiment, and 12% in yet another embodiment. Further, the lower limit is 13% in another embodiment, 15% in yet another embodiment, and 18% in yet another embodiment.

Furthermore, the upper limit for the amount of the compound is 30% in one embodiment of the present invention, 25% in another embodiment, 20% in yet another embodiment, 15% in yet another embodiment, 10% in yet another embodiment, and 5% in yet another embodiment.

When the liquid crystal composition of the present invention is used for a liquid crystal display device having a small cell gap, it is appropriate to increase the amount of the compound represented by general formula (XI). When the liquid crystal composition is used in a liquid crystal display device having a low drive voltage, it is appropriate to increase the amount of the compound represented by general formula (XI). Further, when the liquid crystal composition is used for a liquid crystal display device used in a low-temperature environment, it is appropriate to reduce the amount of the compound represented by general formula (XI). In the case of a liquid crystal composition used for a liquid crystal display device having a fast response speed, it is appropriate to reduce the amount of the compound represented by general formula (XI).

Moreover, the compound represented by general formula (XI) used in the liquid crystal composition of the present invention is preferably a compound represented by general formula (XI-1).

(XI-1)

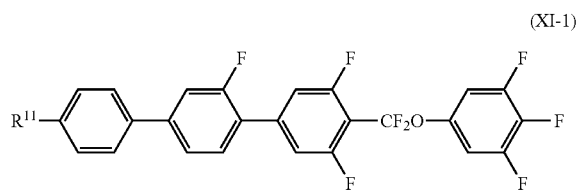

In the formula, $R^{11}$ represents an alkyl group of 1 to 5 carbon atoms, an alkenyl group of 2 to 5 carbon atoms or an alkoxy group of 1 to 4 carbon atoms.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention, two types of compounds may be used in another embodiment, and three or more types of compounds may be used in yet another embodiment.

The amount of the compound represented by general formula (XI-1) relative to the total mass of the liquid crystal composition of the present invention is preferably at least 1% by mass, more preferably 2% by mass or more, still more preferably 3% by mass or more, still more preferably 4% by mass or more, and particularly preferably 5% by mass or more. Further, in consideration of the solubility at low temperature, the transition temperature and the electrical reliability and the like, the maximum amount of the compound is preferably restricted to not more than 20% by mass, more preferably 15% by mass or less, still more preferably 12% by mass or less, and particularly preferably 8% by mass or less.

More specifically, the compound represented by general formula (XI-1) used in the liquid crystal composition of the present invention is preferably a compound represented by formula (45.1) to formula (45.4), and is more preferably a compound represented by formula (45.2) to formula (45.4), and the liquid crystal composition particularly preferably includes a compound represented by formula (45.2).

(45.1)

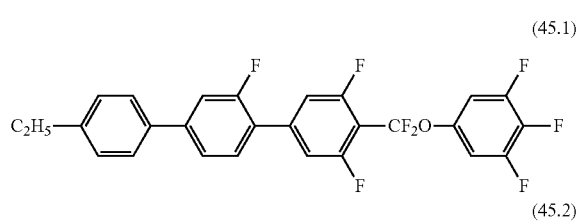

(45.2)

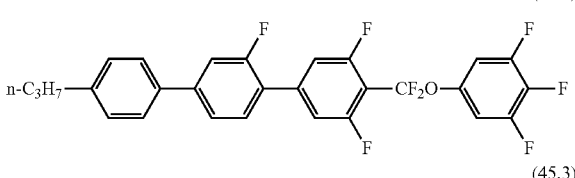

(45.3)

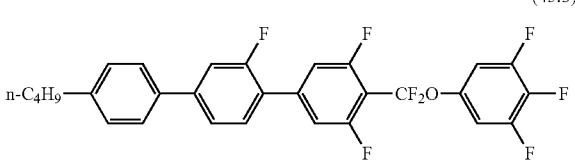

(45.4)

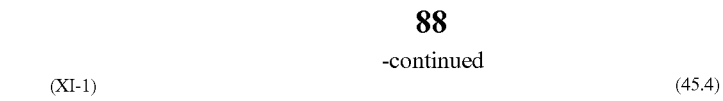

Moreover, the compound represented by general formula (L) or the compound represented by general formula (X) is preferably a compound selected from the group of compounds represented by general formula (XII).

(XII)

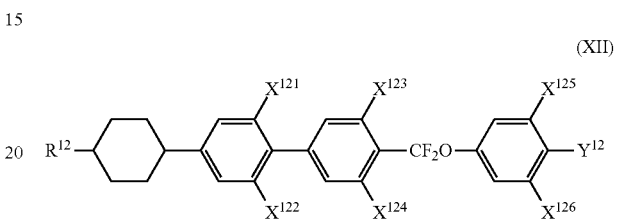

In the formula, each of $X^{121}$ to $X^{126}$ independently represents a fluorine atom or a hydrogen atom, $R^{12}$ represents an alkyl group of 1 to 5 carbon atoms, an alkenyl group of 2 to 5 carbon atoms or an alkoxy group of 1 to 4 carbon atoms, and $Y^{12}$ represents a fluorine atom or $-OCF_3$.

Although there are no particular limitations on the types of these compounds that can be combined, one to three or more types of compounds are preferably included in accordance with the level of performance required for properties such as the solubility at low temperature, the transition temperature, the electrical reliability and the birefringence, and a combination of one to four or more types of compounds is particularly preferable.

Moreover, the compound represented by general formula (XII) used in the liquid crystal composition of the present invention is preferably a compound represented by general formula (XII-1).

(XII-1)

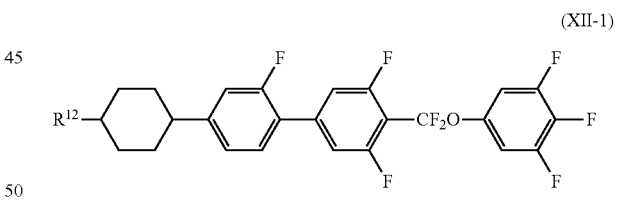

In the formula, $R^{12}$ represents an alkyl group of 1 to 5 carbon atoms, an alkenyl group of 2 to 5 carbon atoms or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types of compounds is particularly preferable.

The amount of the compound represented by general formula (XII-1) relative to the total mass of the liquid crystal composition of the present invention is preferably at least 1% by mass, more preferably 2% by mass or more, still more preferably 3% by mass or more, and particularly preferably 4% by mass or more. Further, in consideration of the solubility at low temperature, the transition temperature and the electrical reliability and the like, the maximum amount of the compound is preferably restricted to not more than 15% by mass, more preferably 10% by mass or less, still more preferably 8% by mass or less, and particularly preferably 6% by mass or less.

More specifically, the compound represented by general formula (XII-1) used in the liquid crystal composition of the present invention is preferably a compound represented by formula (46.1) to formula (46.4), and is particularly preferably a compound represented by formula (46.2) to formula (46.4).

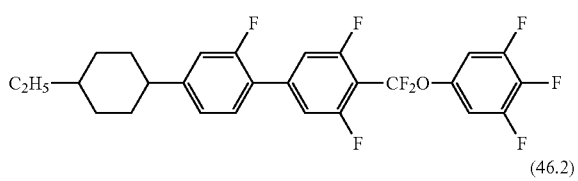

(46.1)

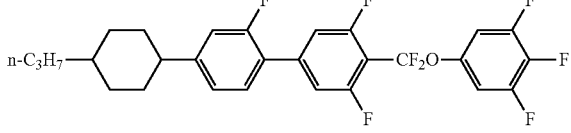

(46.2)

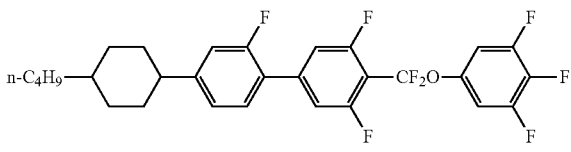

(46.3)

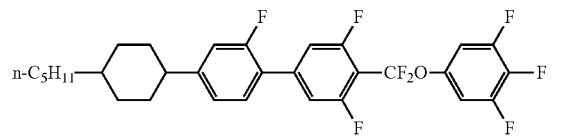

(46.4)

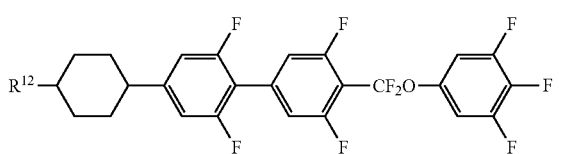

Further, the compound represented by general formula (XII) is preferably a compound represented by general formula (XII-2).

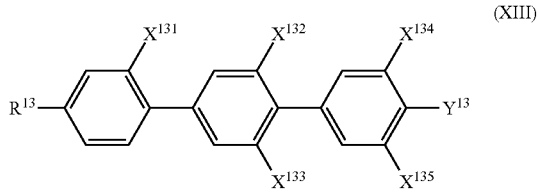

(XII-2)

In the formula, $R^{12}$ represents an alkyl group of 1 to 5 carbon atoms, an alkenyl group of 2 to 5 carbon atoms or an alkoxy group of 1 to 4 carbon atoms.

Although there are no particular limitations on the types of these compounds that can be combined, either one type of compound or a combination of two or more types is preferably included with due consideration of properties such as the solubility at low temperature, the transition temperature, the electrical reliability and the birefringence, and a combination of one to three or more types of compounds is particularly preferable.

The amount of the compound represented by general formula (XII-2) relative to the total mass of the liquid crystal composition of the present invention is preferably at least 1% by mass, more preferably 3% by mass or more, still more preferably 4% by mass or more, still more preferably 6% by mass or more, and particularly preferably 9% by mass or more. Further, in consideration of the solubility at low temperature, the transition temperature and the electrical reliability and the like, the maximum amount of the compound is preferably restricted to not more than 20% by mass, more preferably 17% by mass or less, still more preferably 15% by mass or less, and particularly preferably 13% by mass or less.

More specifically, the compound represented by general formula (XII-2) used in the liquid crystal composition of the present invention is preferably a compound represented by formula (47.1) to formula (47.4), and is particularly preferably a compound represented by formula (47.2) to formula (47.4).

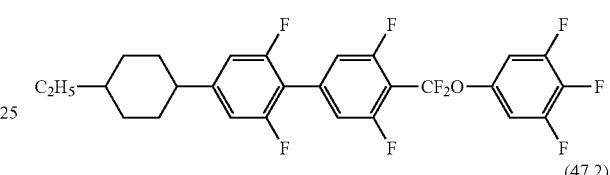

(47.1)

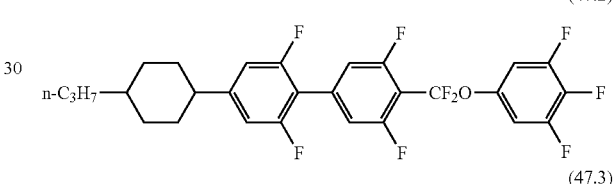

(47.2)

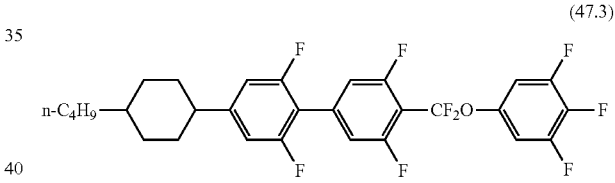

(47.3)

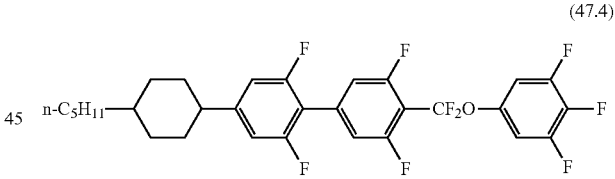

(47.4)

In addition, the compound represented by general formula (M) is preferably a compound selected from the group of compounds represented by general formula (XIII).

(XIII)

In the formula, each of $X^{131}$ to $X^{135}$ independently represents a fluorine atom or a hydrogen atom, $R^{13}$ represents an alkyl group of 1 to 5 carbon atoms, an alkenyl group of 2 to 5 carbon atoms or an alkoxy group of 1 to 4 carbon atoms, and $Y^{13}$ represents a fluorine atom or —$OCF_3$.

Although there are no particular limitations on the types of these compounds that can be combined, one or two types of these compounds are preferably included, a combination of one to three types of compounds is more preferable, and a combination of 1 to 4 types is even more preferable.

The amount of the compound represented by general formula (XIII) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 2% in one embodiment of the present invention, 4% in another embodiment, 5% in yet another embodiment, 7% in yet another embodiment, 9% in yet another embodiment, 11% in yet another embodiment, and 13% in yet another embodiment. Furthermore, the lower limit is 14% in another embodiment, 16% in yet another embodiment, and 20% in yet another embodiment.

Further, the upper limit for the amount of the compound is 30% in one embodiment of the present invention, 25% in another embodiment, 20% in yet another embodiment, 15% in yet another embodiment, 10% in yet another embodiment, and 5% in yet another embodiment.

When the liquid crystal composition of the present invention is used for a liquid crystal display device having a small cell gap, it is appropriate to increase the amount of the compound represented by general formula (XIII). When the liquid crystal composition is used in a liquid crystal display device having a low drive voltage, it is appropriate to increase the amount of the compound represented by general formula (XIII). Further, when the liquid crystal composition is used for a liquid crystal display device used in a low-temperature environment, it is appropriate to reduce the amount of the compound represented by general formula (XIII). In the case of a liquid crystal composition used for a liquid crystal display device having a fast response speed, it is appropriate to reduce the amount of the compound represented by general formula (XIII).

Further, the compound represented by general formula (XIII) is preferably a compound represented by general formula (XIII-1).

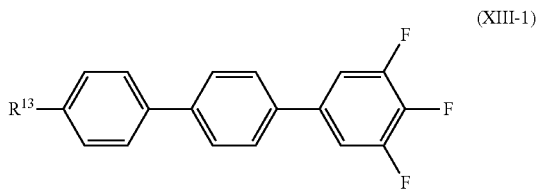

(XIII-1)

In the formula, $R^{13}$ represents an alkyl group of 1 to 5 carbon atoms, an alkenyl group of 2 to 5 carbon atoms or an alkoxy group of 1 to 4 carbon atoms.

The amount of the compound represented by general formula (XIII-1) relative to the total mass of the liquid crystal composition of the present invention is preferably at least 1% by mass, more preferably 3% by mass or more, still more preferably 5% by mass or more, and particularly preferably 10% by mass or more. Further, the maximum amount that can be included is preferably not more than 25% by mass, more preferably 20% by mass or less, and still more preferably 15% by mass or less.

The compound represented by general formula (XIII-1) is preferably a compound represented by formula (48.1) to formula (48.4), and is more preferably a compound represented by formula (48.2).

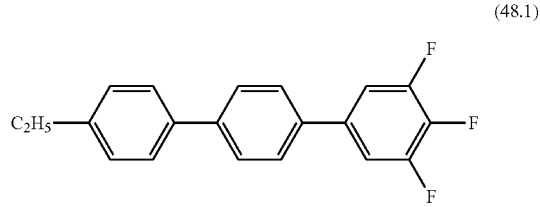

(48.1)

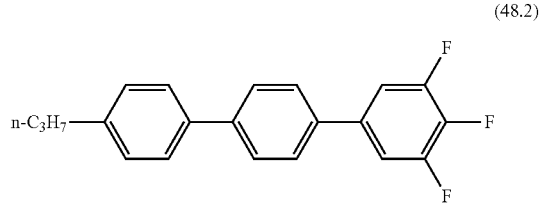

(48.2)

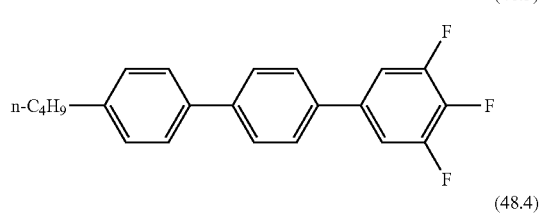

(48.3)

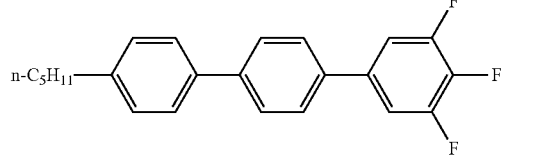

(48.4)

Moreover, the compound represented by general formula (XIII) is preferably a compound represented by general formula (XIII-2).

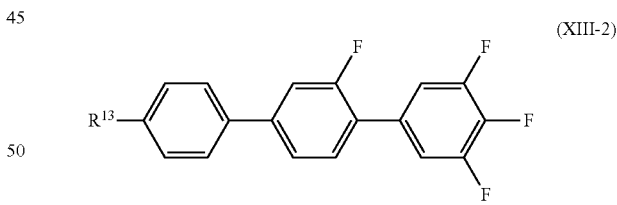

(XIII-2)

In the formula, $R^{13}$ represents an alkyl group of 1 to 5 carbon atoms, an alkenyl group of 2 to 5 carbon atoms or an alkoxy group of 1 to 4 carbon atoms.

There are no particular limitations on the types of these compounds that can be combined, and either one type of compound or a combination of two or more types is preferably included from among these compounds.

The amount of the compound represented by general formula (XIII-2) relative to the total mass of the liquid crystal composition of the present invention is preferably at least 5% by mass, more preferably 6% by mass or more, still more preferably 8% by mass or more, and particularly preferably 10% by mass or more. Further, the maximum amount that can be included is preferably not more than 25% by mass, more preferably 20% by mass or less, and still more preferably 15% by mass or less.

The compound represented by general formula (XIII-2) is preferably a compound represented by formula (49.1) to formula (49.4), and is more preferably a compound represented by formula (49.1) and/or formula (49.2).

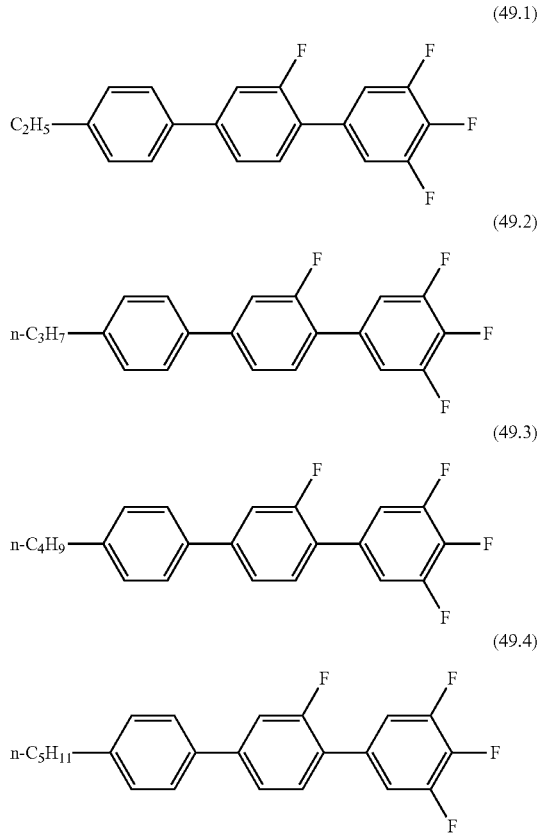

Moreover, the compound represented by general formula (XIII) is preferably a compound represented by general formula (XIII-3).

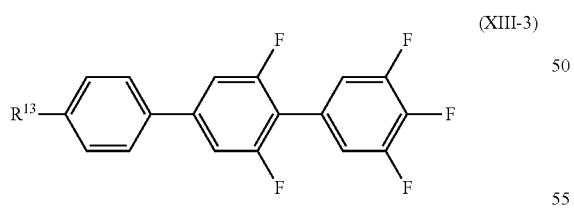

In the formula, R$^{13}$ represents an alkyl group of 1 to 5 carbon atoms, an alkenyl group of 2 to 5 carbon atoms or an alkoxy group of 1 to 4 carbon atoms.

There are no particular limitations on the types of these compounds that can be combined, and either one type of compound or a combination of two types is preferably included from among these compounds.

The amount of the compound represented by general formula (XIII-3) relative to the total mass of the liquid crystal composition of the present invention is preferably at least 2% by mass, more preferably 4% by mass or more, still more preferably 9% by mass or more, and particularly preferably 11% by mass or more. Further, the maximum amount that can be included is preferably not more than 20% by mass, more preferably 17% by mass or less, and still more preferably 14% by mass or less.

The compound represented by general formula (XIII-3) is preferably a compound represented by formula (50.1) to formula (50.4), and is more preferably a compound represented by formula (50.1) and/or formula (50.2).

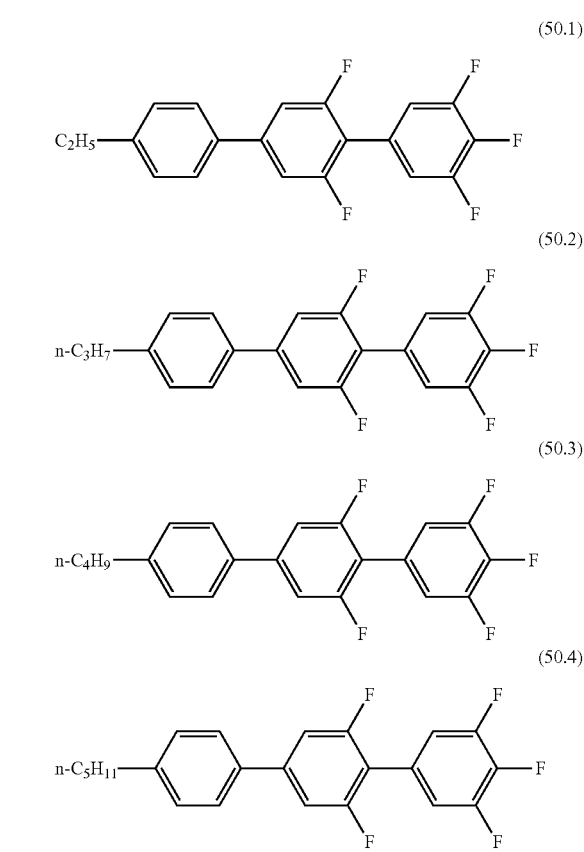

In addition, the compound represented by general formula (M) is preferably a compound selected from the group of compounds represented by general formula (XIV).

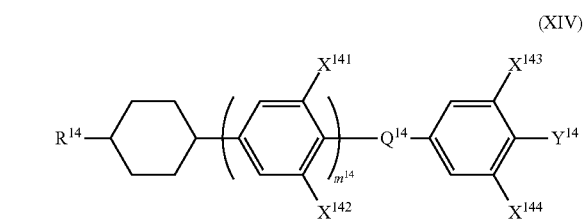

In the formula, R$^{14}$ represents an alkyl group of 1 to 7 carbon atoms, an alkenyl group of 2 to 7 carbon atoms or an alkoxy group of 1 to 7 carbon atoms, each of X$^{141}$ to X$^{144}$ independently represents a fluorine atom or a hydrogen atom, Y$^{14}$ represents a fluorine atom, a chlorine atom or —OCF$_3$, Q$^{14}$ represents a single bond, —COO— or —CF$_2$O—, and m$^{14}$ represents 0 or 1.

There are no particular limitations on the types of these compounds that can be combined, and compounds can be combined as appropriate for each embodiment, with due consideration of properties such as the solubility at low temperature, the transition temperature, the electrical reliability and the birefringence. The type of compound used may, for example, be a single type of compound in one embodiment of the present invention. Alternatively, in another embodiment of the present invention, two types of compounds may be used. Further, in yet another embodiment of the present invention, three types of compounds may be used. In yet another embodiment of the present invention, 4 types of compounds may be used. In yet another embodiment of the present invention, 5 types of compounds may be used. Alternatively, in yet another embodiment of the present invention, 6 or more types of compounds may be used.

The amount of the compound represented by general formula (XIV) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 3% in one embodiment of the present invention, 7% in another embodiment, 8% in yet another embodiment, 11% in yet another embodiment, 12% in yet another embodiment, 16% in yet another embodiment, and 18% in yet another embodiment. Further, the lower limit is 19% in another embodiment, 22% in yet another embodiment, and 25% in yet another embodiment.

Furthermore, the upper limit for the amount of the compound is 40% in one embodiment of the present invention, 35% in another embodiment, 30% in yet another embodiment, 25% in yet another embodiment, 20% in yet another embodiment, and 15% in yet another embodiment.

When the liquid crystal composition of the present invention is used in a liquid crystal display device having a low drive voltage, it is appropriate to increase the amount of the compound represented by general formula (XIV). Further, in the case of a liquid crystal composition used for a liquid crystal display device having a fast response speed, it is appropriate to reduce the amount of the compound represented by general formula (XIV).

Moreover, the compound represented by general formula (XIV) is preferably a compound represented by general formula (XIV-1).

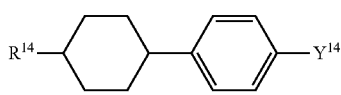

(XIV-1)

In the formula, $R^{14}$ represents an alkyl group of 1 to 7 carbon atoms, an alkenyl group of 2 to 7 carbon atoms or an alkoxy group of 1 to 7 carbon atoms, and $Y^{14}$ represents a fluorine atom, a chlorine atom or —$OCF_3$.

Although there are no particular limitations on the types of these compounds that can be combined, one to three types of compounds are preferably combined with due consideration of properties such as the solubility at low temperature, the transition temperature, the electrical reliability and the birefringence.

Further, the compound represented by general formula (XIV-1) is preferably a compound represented by general formula (XIV-1-1).

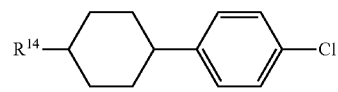

(XIV-1-1)

In the formula, $R^{14}$ represents an alkyl group of 1 to 7 carbon atoms, an alkenyl group of 2 to 7 carbon atoms or an alkoxy group of 1 to 7 carbon atoms.

The amount of the compound represented by general formula (XIV-1-1) relative to the total mass of the liquid crystal composition of the present invention is preferably at least 2% by mass, more preferably 4% by mass or more, still more preferably 7% by mass or more, still more preferably 10% by mass or more, and particularly preferably 18% by mass or more. Furthermore, in consideration of the solubility at low temperature, the transition temperature and the electrical reliability and the like, the maximum amount is preferably restricted to not more than 30% by mass, more preferably 27% by mass or less, still more preferably 24% by mass or less, and particularly preferably less than 21% by mass.

More specifically, the compound represented by general formula (XIV-1-1) is preferably a compound represented by formula (51.1) to formula (51.4), and is more preferably a compound represented by formula (51.1).

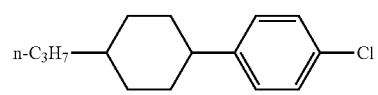

(51.1)

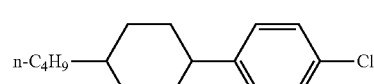

(51.2)

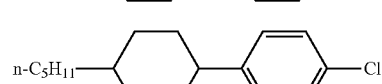

(51.3)

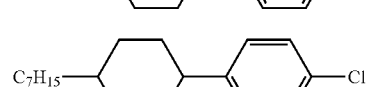

(51.4)

Moreover, the compound represented by general formula (XIV-1) is preferably a compound represented by general formula (XIV-1-2).

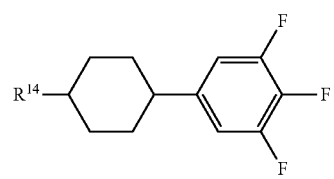

(XIV-1-2)

In the formula, $R^{14}$ represents an alkyl group of 1 to 7 carbon atoms, an alkenyl group of 2 to 7 carbon atoms or an alkoxy group of 1 to 7 carbon atoms.

The amount of the compound represented by general formula (XIV-1-2) relative to the total mass of the liquid crystal composition of the present invention is preferably at least 1% by mass, more preferably 3% by mass or more, still more preferably 5% by mass or more, and particularly preferably 7% by mass or more. Further, in consideration of the solubility at low temperature, the transition temperature and the electrical reliability and the like, the maximum amount is preferably restricted to not more than 15% by mass, more preferably 13% by mass or less, still more preferably 11% by mass or less, and particularly preferably less than 9% by mass.

More specifically, the compound represented by general formula (XIV-1-2) is preferably a compound represented by formula (52.1) to formula (52.4), and is particularly preferably a compound represented by formula (52.4).

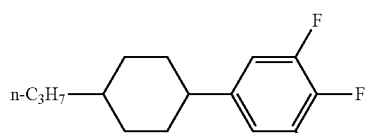

(52.1)

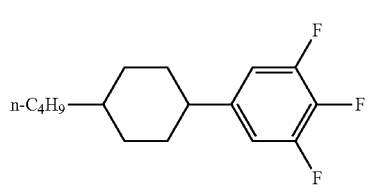

(52.2)

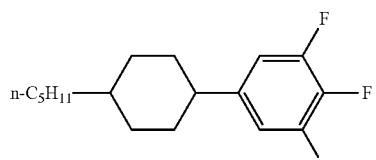

(52.3)

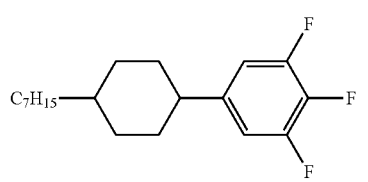

(52.4)

Furthermore, the compound represented by general formula (XIV) is preferably a compound represented by general formula (XIV-2).

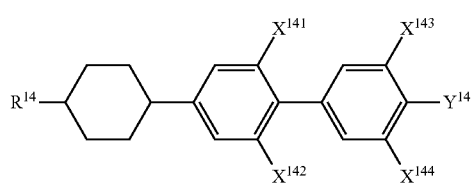

(XIV-2)

In the formula, $R^{14}$ represents an alkyl group of 1 to 5 carbon atoms, an alkenyl group of 2 to 5 carbon atoms or an alkoxy group of 1 to 4 carbon atoms, each of $X^{141}$ to $X^{144}$ independently represents a fluorine atom or a hydrogen atom, and $Y^{14}$ represents a fluorine atom, a chlorine atom or —$OCF_3$.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention. Further, in another embodiment of the present invention, two types of compounds may be used. Alternatively, in yet another embodiment of the present invention, three types of compounds may be used. In yet another embodiment of the present invention, 4 types of compounds may be used. Alternatively, in yet another embodiment of the present invention, 5 or more types of compounds may be used.

The amount of the compound represented by general formula (XIV-2) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 3% in one embodiment of the present invention, 7% in another embodiment, 8% in yet another embodiment, 10% in yet another embodiment, 11% in yet another embodiment, 12% in yet another embodiment, and 18% in yet another embodiment. Further, the lower limit is 19% in another embodiment, 21% in yet another embodiment, and 22% in yet another embodiment.

Furthermore, the upper limit for the amount of the compound is 40% in one embodiment of the present invention, 35% in another embodiment, 25% in yet another embodiment, 20% in yet another embodiment, 15% in yet another embodiment, and 10% in yet another embodiment.

When the liquid crystal composition of the present invention is used in a liquid crystal display device having a low drive voltage, it is appropriate to increase the amount of the compound represented by general formula (XIV-2). Further, in the case of a liquid crystal composition used for a liquid crystal display device having a fast response speed, it is appropriate to reduce the amount of the compound represented by general formula (XIV-2).

The compound represented by general formula (XIV-2) is preferably a compound represented by general formula (XIV-2-1).

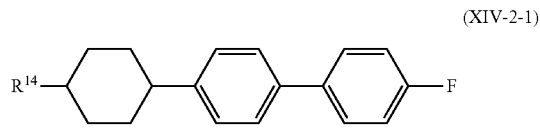

(XIV-2-1)

In the formula, $R^{14}$ represents an alkyl group of 1 to 5 carbon atoms, an alkenyl group of 2 to 5 carbon atoms, or an alkoxy group of 1 to 4 carbon atoms.

The amount of the compound represented by general formula (XIV-2-1) relative to the total mass of the liquid crystal composition of the present invention is preferably at least 1% by mass, more preferably 3% by mass or more, still more preferably 5% by mass or more, and particularly preferably 7% by mass or more. Further, in consideration of the solubility at low temperature, the transition temperature and the electrical reliability and the like, the maximum amount is preferably restricted to not more than 15% by mass, more preferably 13% by mass or less, still more preferably 11% by mass or less, and particularly preferably less than 9% by mass.

More specifically, the compound represented by general formula (XIV-2-1) is preferably a compound represented by formula (53.1) to formula (53.4), and the liquid crystal composition particularly preferably includes a compound represented by formula (53.4).

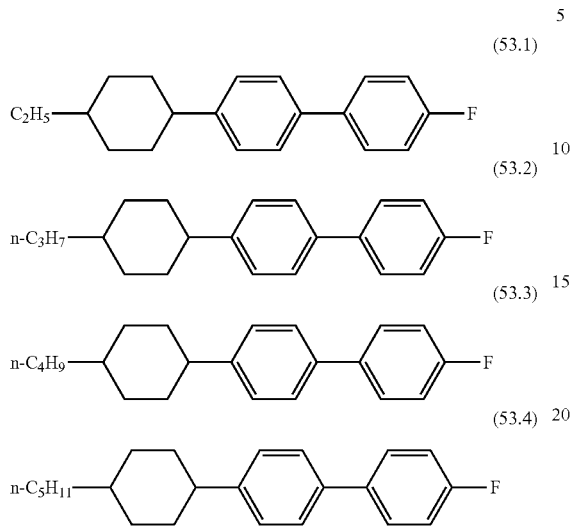

(53.1), (53.2), (53.3), (53.4)

Moreover, the compound represented by general formula (XIV-2) is preferably a compound represented by general formula (XIV-2-2).

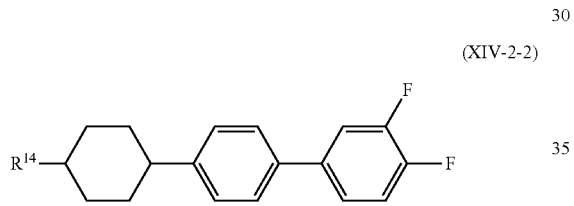

(XIV-2-2)

In the formula, $R^{14}$ represents an alkyl group of 1 to 5 carbon atoms, an alkenyl group of 2 to 5 carbon atoms, or an alkoxy group of 1 to 4 carbon atoms.

The amount of the compound represented by general formula (XIV-2-2) relative to the total mass of the liquid crystal composition of the present invention is preferably at least 3% by mass, more preferably 6% by mass or more, still more preferably 9% by mass or more, and particularly preferably 12% by mass or more. Further, in consideration of the solubility at low temperature, the transition temperature and the electrical reliability and the like, the maximum amount is preferably restricted to not more than 20% by mass, more preferably 17% by mass or less, still more preferably 15% by mass or less, and particularly preferably 14% by mass or less.

More specifically, the compound represented by general formula (XIV-2-2) is preferably a compound represented by formula (54.1) to formula (54.4), and the liquid crystal composition particularly preferably includes a compound represented by formula (54.2) and/or formula (54.4).

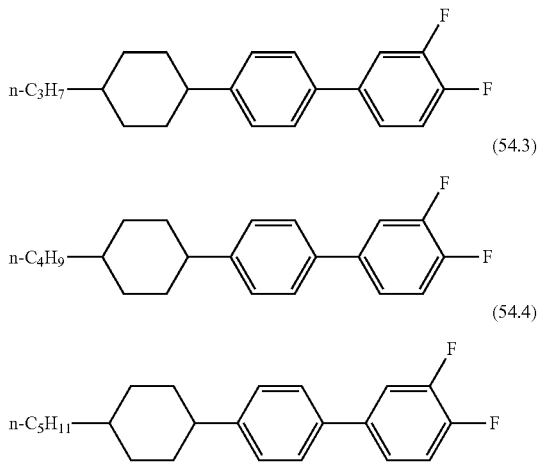

(54.1), (54.2), (54.3), (54.4)

Moreover, the compound represented by general formula (XIV-2) is preferably a compound represented by general formula (XIV-2-3).

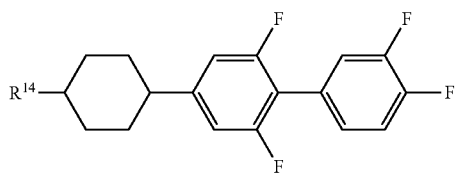

(XIV-2-3)

In the formula, $R^{14}$ represents an alkyl group of 1 to 5 carbon atoms, an alkenyl group of 2 to 5 carbon atoms, or an alkoxy group of 1 to 4 carbon atoms.

The amount of the compound represented by general formula (XIV-2-3) relative to the total mass of the liquid crystal composition of the present invention is preferably at least 5% by mass, more preferably 9% by mass or more, and particularly preferably 12% by mass or more. Further, in consideration of the solubility at low temperature, the transition temperature and the electrical reliability and the like, the maximum amount is preferably restricted to not more than 30% by mass, more preferably less than 27% by mass, still more preferably 24% by mass or less, and particularly preferably less than 20% by mass.

More specifically, the compound represented by general formula (XIV-2-3) is preferably a compound represented by formula (55.1) to formula (55.4), and the liquid crystal composition particularly preferably includes a compound represented by formula (55.2) and/or formula (55.4).

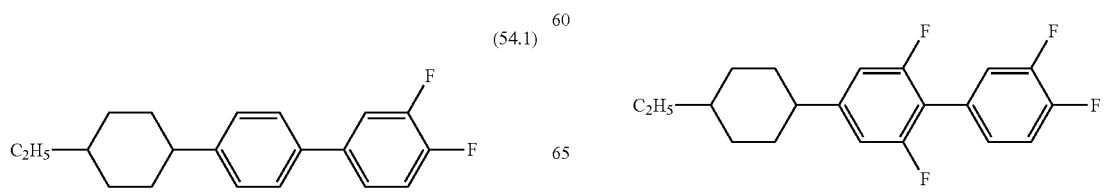

(55.1)

-continued

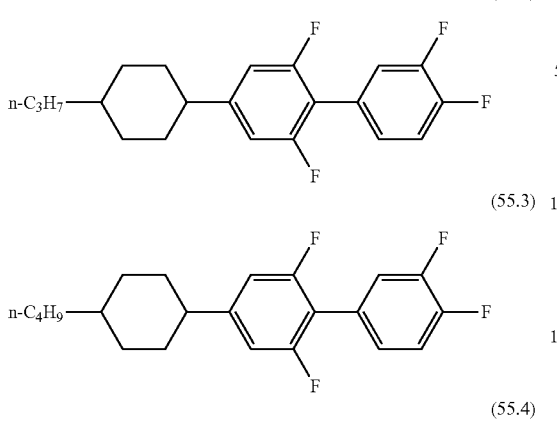

(55.2)

(55.3)

(55.4)

Moreover, the compound represented by general formula (XIV-2) is preferably a compound represented by general formula (XIV-2-4).

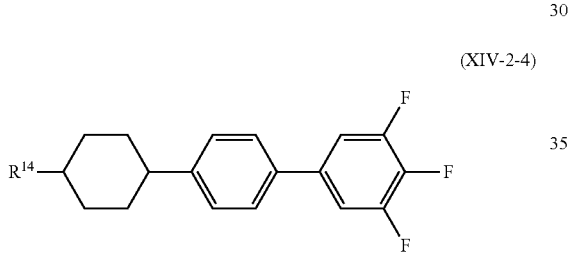

(XIV-2-4)

In the formula, $R^{14}$ represents an alkyl group of 1 to 5 carbon atoms, an alkenyl group of 2 to 5 carbon atoms, or an alkoxy group of 1 to 4 carbon atoms.

There are no particular limitations on the types of these compounds that can be combined, and compounds can be combined as appropriate for each embodiment, with due consideration of properties such as the solubility at low temperature, the transition temperature, the electrical reliability and the birefringence. For example, a single type of compound may be used in one embodiment of the present invention. Further, two types of compounds may be used in another embodiment of the present invention. Alternatively, three or more types of compounds may be used in yet another embodiment of the present invention.

The amount of the compound represented by general formula (XIV-2-4) has an upper limit and a lower limit which are determined for each embodiment with due consideration of properties such as the solubility at low temperature, the transition temperature, the electrical reliability and the birefringence. For example, the lower limit for the amount of the compound relative to the total mass of the liquid crystal composition of the present invention is 2% in one embodiment of the present invention, 5% in another embodiment, 8% in yet another embodiment, 9% in yet another embodiment, 10% in yet another embodiment, 18% in yet another embodiment, and 21% in yet another embodiment. Further, the lower limit is 22% in another embodiment, and 24% in yet another embodiment.

Furthermore, the upper limit for the amount of the compound is 35% in one embodiment of the present invention, 30% in another embodiment, 25% in yet another embodiment, 20% in yet another embodiment, 15% in yet another embodiment, and 10% in yet another embodiment.

When the liquid crystal composition of the present invention is used in a liquid crystal display device having a low drive voltage, it is appropriate to increase the amount of the compound represented by general formula (XIV-2-4). Further, in the case of a liquid crystal composition used for a liquid crystal display device having a fast response speed, it is appropriate to reduce the amount of the compound represented by general formula (XIV-2-4).

More specifically, the compound represented by general formula (XIV-2-4) is preferably a compound represented by formula (56.1) to formula (56.4), and is particularly preferably a compound represented by formula (56.1), formula (56.2) and/or formula (56.4).

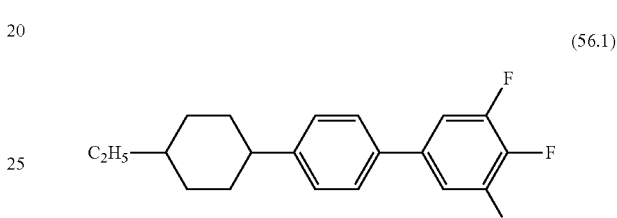

(56.1)

(56.2)

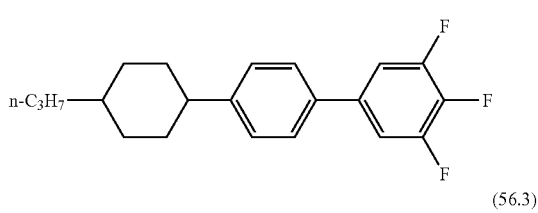

(56.3)

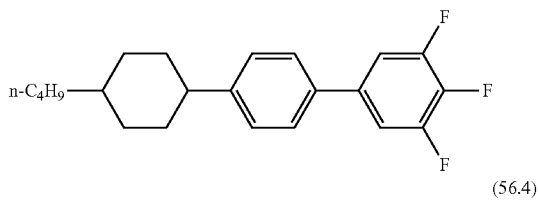

(56.4)

Moreover, the compound represented by general formula (XIV-2) is preferably a compound represented by general formula (XIV-2-5).

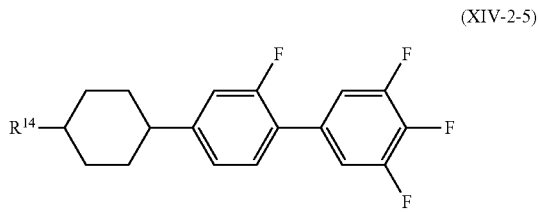

(XIV-2-5)

In the formula, $R^{14}$ represents an alkyl group of 1 to 5 carbon atoms, an alkenyl group of 2 to 5 carbon atoms, or an alkoxy group of 1 to 4 carbon atoms.

The amount of the compound represented by general formula (XIV-2-5) relative to the total mass of the liquid crystal composition of the present invention is preferably at least 5% by mass, more preferably 10% by mass or more, and particularly preferably 13% by mass or more. Further, in consideration of the solubility at low temperature, the transition temperature and the electrical reliability and the like, the maximum amount is preferably restricted to not more than 25% by mass, more preferably less than 22% by mass, still more preferably 18% by mass or less, and particularly preferably less than 15% by mass.

More specifically, the compound represented by general formula (XIV-2-5) is preferably a compound represented by formula (57.1) to formula (57.4), and the liquid crystal composition particularly preferably includes a compound represented by formula (57.1).

(57.1)

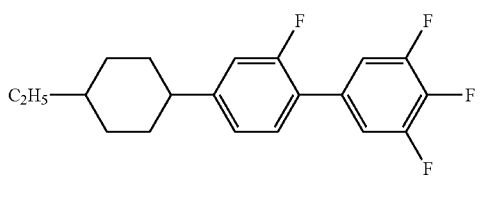

(57.2)

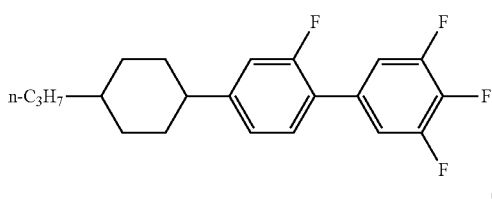

(57.3)

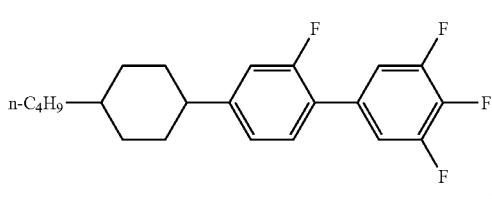

(57.4)

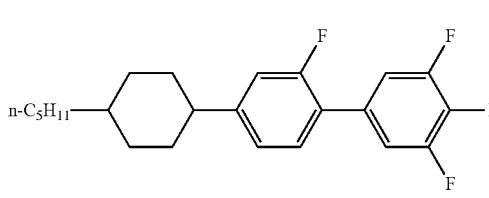

Moreover, the compound represented by general formula (XIV-2) is preferably a compound represented by general formula (XIV-2-6).

(XIV-2-6)

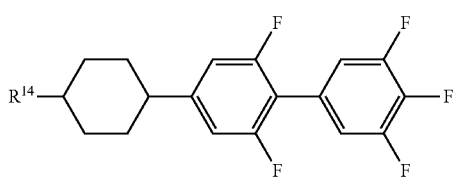

In the formula, $R^{14}$ represents an alkyl group of 1 to 5 carbon atoms, an alkenyl group of 2 to 5 carbon atoms, or an alkoxy group of 1 to 4 carbon atoms.

The amount of the compound represented by general formula (XIV-2-6) relative to the total mass of the liquid crystal composition of the present invention is preferably at least 5% by mass, more preferably 10% by mass or more, and particularly preferably 15% by mass or more. Further, in consideration of the solubility at low temperature, the transition temperature and the electrical reliability and the like, the maximum amount is preferably restricted to not more than 25% by mass, more preferably 22% by mass or less, still more preferably 20% by mass or less, and particularly preferably less than 17% by mass.

More specifically, the compound represented by general formula (XIV-2-6) is preferably a compound represented by formula (58.1) to formula (58.4), and the liquid crystal composition particularly preferably includes a compound represented by formula (58.2).

(58.1)

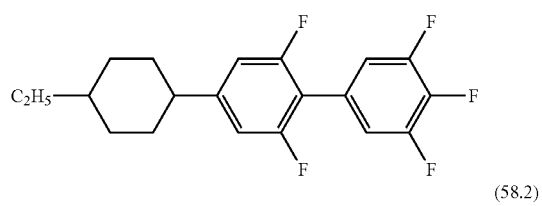

(58.2)

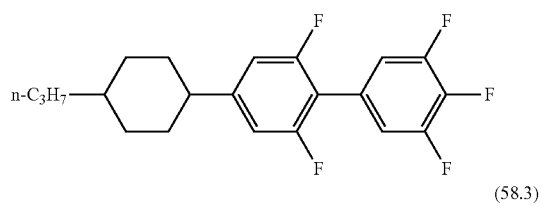

(58.3)

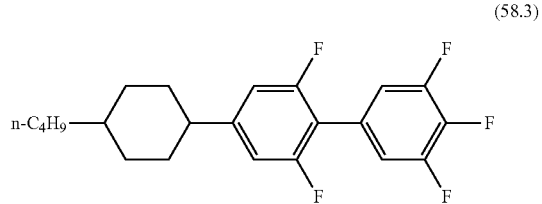

(58.4)

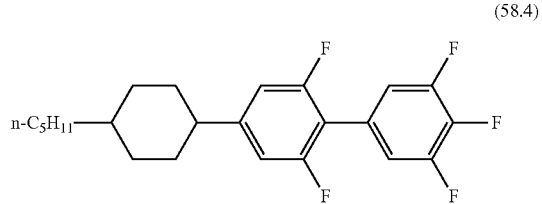

The compounds used in the present invention do not have a peracid (—CO—OO—) structure within the molecule. Further, when the reliability and long-term stability of the liquid crystal composition are deemed important, it is preferable not to use compounds having a carbonyl group. Further, when stability relative to UV irradiation is deemed important, it is desirable not to use compounds that have been substituted with one or more chlorine atoms.

In order to enable fabrication of a liquid crystal display device such as a PS mode device, a horizontal electric field PSA mode device, or a horizontal electric field PSVA mode device, a polymerizable compound may be included in the liquid crystal composition of the present invention. Examples of polymerizable compounds which can be used include photopolymerizable monomers and the like which undergo polymerization in the presence of energy rays such as light, and examples of these compounds include polymerizable compounds having a liquid crystal backbone in the structures thereof in which a plurality of 6-membered rings are linked together, such as biphenyl derivatives and terphenyl derivatives. More specifically, difunctional monomers represented by general formula (XX) are preferable.

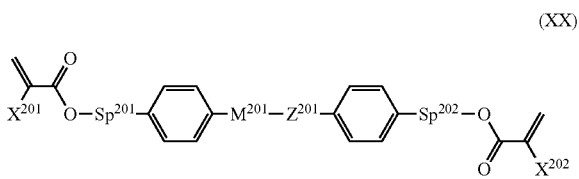

(XX)

In the formula, each of $X^{201}$ and $X^{202}$ independently represents a hydrogen atom or a methyl group, each of $Sp^{201}$ and $Sp^{202}$ independently represents a single bond, an alkylene group of 1 to 8 carbon atoms, or —O—$(CH_2)_s$— (wherein s represents an integer of 2 to 7, and the oxygen atom is bonded to the aromatic ring), $Z^{201}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (wherein each of $Y^1$ and $Y^2$ independently represents a fluorine atom or a hydrogen atom), —C≡C—, or a single bond, $M^{201}$ represents a 1,4-phenylene group, a trans-1,4-cyclohexylene group or a single bond, and in all of the 1,4-phenylene groups within the formula, any arbitrary hydrogen atom may be substituted with a fluorine atom.

A diacrylate derivative in which $X^{201}$ and $X^{202}$ both represent hydrogen atoms and a dimethacrylate derivative in which $X^{201}$ and $X^{202}$ both represent methyl groups are both preferable, and a compound in which one of $X^{201}$ and $X^{202}$ represents a hydrogen atom and the other represents a methyl group is also preferred. In terms of the polymerization rates of these compounds, the diacrylate derivative is the fastest, the dimethacrylate derivative is the slowest, and the asymmetrical compound is midway between the other two, and the most appropriate configuration can be used depending on the intended application. In a PSA display device, a dimethacrylate derivative is particularly desirable.

Each of $Sp^{201}$ and $Sp^{202}$ independently represents a single bond, an alkylene group of 1 to 8 carbon atoms, or —O—$(CH_2)_s$—, and in a PSA display device, at least one of $Sp^{201}$ and $Sp^{202}$ is preferably a single bond, and compounds in which $Sp^{201}$ and $Sp^{202}$ both represents single bonds, or compounds in which one represents a single bond and the other represents an alkylene group of 1 to 8 carbon atoms or —O—$(CH_2)_s$— are preferred. In this case, an alkyl group of 1 to 4 carbon atoms is preferable, and therefore s is preferably 1 to 4.

$Z^{201}$ preferably represents —OCH$_2$—, —CH$_2$O—, —COO—, —OCO—, —CF$_2$O—, —OCF$_2$—, —CH$_2$CH$_2$—, —CF$_2$CF$_2$— or a single bond, and more preferably represents —COO—, —OCO— or a single bond. A single bond is particularly preferable.

$M^{201}$ represents a 1,4-phenylene group in which any arbitrary hydrogen atom may be substituted with a fluorine atom, a trans-1,4-cyclohexylene group or a single bond, and is preferably a 1,4-phenylene group or a single bond. When C represents a cyclic structure and not a single bond, $Z^{201}$ is preferably a linking group other than a single bond, whereas when $M^{201}$ is a single bond, $Z^{201}$ is preferably a single bond.

On the basis of these points, the cyclic structure between $Sp^{201}$ and $Sp^{202}$ in general formula (XX) is preferably one of the specific structures described below.

In general formula (XX), when $M^{201}$ represents a single bond and the cyclic structure is formed from two rings, cyclic structures represented by the following formula (XXa-1) to formula (XXa-5) are preferable, structures represented by formula (XXa-1) to formula (XXa-3) are more preferable, and a structure represented by formula (XXa-1) is particularly preferable.

(XXa-1)

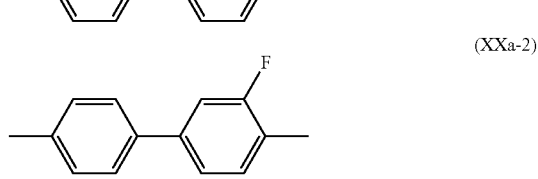

(XXa-2)

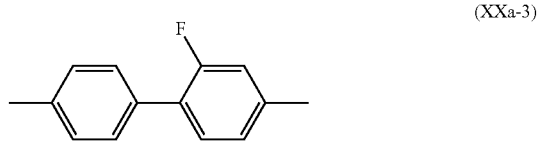

(XXa-3)

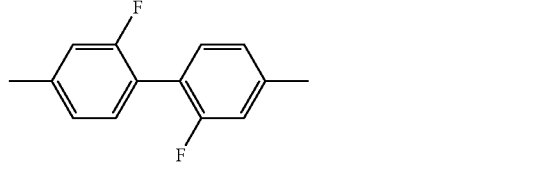

(XXa-4)

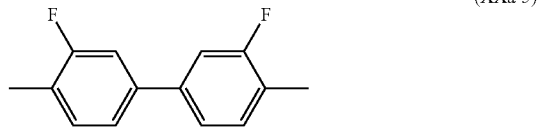

(XXa-5)

In the formulas, the two terminals are bonded to $Sp^{201}$ and $Sp^{202}$ respectively.

Polymerizable compounds containing these types of structures produce an alignment regulating force following polymerization which is ideal for PSA liquid crystal display devices, and because a favorable alignment state can be obtained, display irregularities are either inhibited, or completely eliminated.

For the reasons outlined above, compounds represented by general formula (XX-1) to general formula (XX-4) are particularly preferable as the polymerizable monomer, and of these, a monomer of general formula (XX-2) is the most desirable.

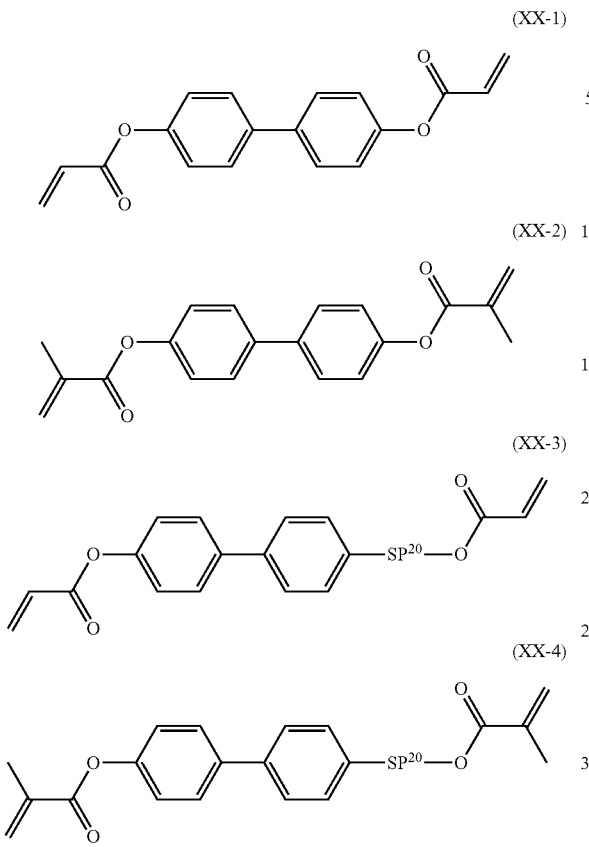

(XX-1)
(XX-2)
(XX-3)
(XX-4)

In the formulas, Sp$^{20}$ represents an alkylene group of 2 to 5 carbon atoms.

In those cases where a monomer is added to the liquid crystal composition of the present invention, the polymerization proceeds even in the absence of a polymerization initiator, but a polymerization initiator may be added to accelerate the polymerization. Examples of the polymerization initiator include benzoin ethers, benzophenones, acetophenones, benzyl ketals and acylphosphine oxides.

The liquid crystal composition in the present invention may also include a compound represented by general formula (Q).

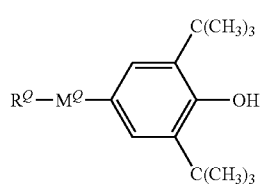

(Q)

In the formula, R$^Q$ represents a linear alkyl group or branched alkyl group of 1 to 22 carbon atoms, wherein one CH$_2$ group or two or more CH$_2$ groups within the alkyl group may be substituted with —O—, —CH=CH—, —CO—, —OCO—, —COO—, —C≡C—, —CF$_2$O— or —OCF$_2$-such that oxygen atoms are not positioned directly adjacent to one another, and M$^Q$ represents a trans-1,4-cyclohexylene group, a 1,4-phenylene group or a single bond.

R$^Q$ represents a linear alkyl group or branched alkyl group of 1 to 22 carbon atoms, wherein one CH$_2$ group or two or more CH$_2$ groups within the alkyl group may be substituted with —O—, —CH=CH—, —CO—, —OCO, —COO—, —C≡C—, —CF$_2$O— or —OCF$_2$— such that oxygen atoms are not positioned directly adjacent to one another. R$^Q$ is preferably a group of 1 to 10 carbon atoms that is a linear alkyl group, a linear alkoxy group, a linear alkyl group in which one CH$_2$ group has been substituted with —OCO— or —COO—, a branched alkyl group, a branched alkoxy group, or a branched alkyl group in which one CH$_2$ group has been substituted with —OCO— or —COO—, and is more preferably a group of 1 to 20 carbon atoms that is a linear alkyl group, a linear alkyl group in which one CH$_2$ group has been substituted with —OCO— or —COO—, a branched alkyl group, a branched alkoxy group, or a branched alkyl group in which one CH$_2$ group has been substituted with —OCO— or —COO—. M$^Q$ represents a trans-1,4-cyclohexylene group, a 1,4-phenylene group or a single bond, but is preferably a trans-1,4-cyclohexylene group or 1,4-phenylene group.

More specifically, the compound represented by general formula (Q) is preferably a compound represented by general formula (Q-a) to general formula (Q-d) shown below.

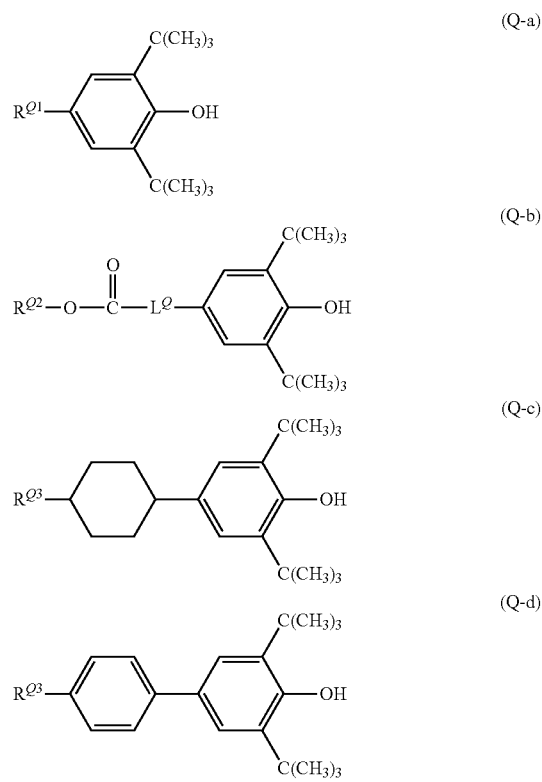

(Q-a)
(Q-b)
(Q-c)
(Q-d)

In the above formulas, R$^{Q1}$ is preferably a linear alkyl group or branched alkyl group of 1 to 10 carbon atoms, R$^{Q2}$ is preferably a linear alkyl group or branched alkyl group of 1 to 20 carbon atoms, R$^{Q3}$ is preferably a linear alkyl group, branched alkyl group, linear alkoxy group or branched alkoxy group of 1 to 8 carbon atoms, and L$^Q$ is preferably a linear alkylene group or branched alkylene group of 1 to 8 carbon atoms. Among the compounds represented by general formula (Q-a) to general formula (Q-d), compounds represented by general formula (Q-c) and general formula (Q-d) are particularly preferable.

The liquid crystal composition of the present invention preferably contains one or two types of compounds represented by general formula (Q), and more preferably contains from 1 to 5 types of compounds represented by general formula (Q), wherein the amount of the compound(s) is preferably from 0.001 to 1% by mass, more preferably from 0.001 to 0.1% by mass, and particularly preferably from 0.001 to 0.05% by mass.

The liquid crystal composition containing a polymerizable compound according to the present invention can be used in a liquid crystal display device in which a liquid crystal alignment capability is imparted by polymerizing the polymerizable compound within the composition by irradiation with ultraviolet rays, and the amount of transmitted light is controlled using the birefringence of the liquid crystal composition. Examples of liquid crystal display devices for which the liquid crystal composition is useful include AM-LCD (active matrix liquid crystal display devices), TN (nematic liquid crystal display devices), STN-LCD (super twisted nematic liquid crystal display devices), OCB-LCD and IPS-LCD (in-plane switching liquid crystal display devices), and FFS (fringe field switching mode liquid crystal display devices), but the composition is particularly useful in AM-LCD, and can be used in transmission-type and reflection-type liquid crystal display devices.

The two substrates of the liquid crystal cell used in the liquid crystal display device can employ a transparent material such as glass or a flexible plastic, or one substrate may be formed using a non-transparent material such as silicon. A transparent substrate having a transparent electrode layer can be obtained, for example, by forming a layer of indium tin oxide (ITO) by sputtering on the surface of a transparent substrate such as glass.

Color filters can be formed by a pigment dispersion method, a printing method, an electrodeposition method, or a staining method or the like. In one example of a method of preparing a color filter by the pigment dispersion method, a curable colored composition for a color filter is applied to the transparent substrate, a patterning process is performed, and the colored composition is then cured by heat or light irradiation. By performing this process for the three colors of red, green and blue, a color filter pixel portion can be produced. In addition, a pixel electrode provided with an active element such as a TFT, thin-film diode or metal-insulator-metal resistive element may also be installed on the substrate.

The aforementioned substrates are positioned facing each other with the transparent electrode layers facing inward. A spacer may be provided to adjust the spacing between the substrates. At this time, it is preferably controlled such that the thickness of the obtained light adjustment layer is 1 to 100 µm. A thickness of 1.5 to 10 µm is particularly preferable, and in those cases where a polarization plate is used, the product of the refractive index anisotropy Δn of the liquid crystal and the cell thickness d is preferably adjusted to achieve maximum contrast. Further, in the case of two polarization plates, the polarization axis of each polarization plate can be adjusted to ensure a favorable viewing angle and contrast. Moreover, a phase difference film may also be used to widen the viewing angle. Examples of the spacer include glass particles, plastic particles, alumina particles, and columnar spacers formed from a photoresist material or the like. Subsequently, a sealant such as an epoxy-based heat-curable composition is screen printed onto the substrate in a form that provides a liquid crystal injection port, and the substrates are then bonded together and heated to cure the sealant.

In terms of the method used for sandwiching the polymerizable compound-containing liquid crystal composition between the two substrates, a typical vacuum injection method or ODF method or the like can be used, and although dropping mark defects do not occur in the vacuum injection method, another problem arises in that injection traces tend to be retained. The present invention can be employed particularly favorably in display devices produced using the ODF method. In a liquid crystal display device production process using the ODF method, a sealant such as an epoxy-based light and heat curable sealant is applied using a dispenser to form a closed loop ridge on the substrate of either the back plane or the front plane, a prescribed amount of the liquid crystal composition is dropped into the closed loop under vacuum conditions, and the front plane and the back plane are then bonded together to complete production of the liquid crystal display device. The liquid crystal composition of the present invention enables the dropping of the liquid crystal composition during the ODF process to be performed with good stability, and can therefore be used very favorably in the ODF method.

In the method of polymerizing the polymerizable compound, an appropriate polymerization rate is desirable in order to achieve good alignment of the liquid crystal, and therefore a method is preferably used in which polymerization is performed by irradiation with active energy rays such as ultraviolet rays and an electron beam, which may be used individually, consecutively or sequentially. When ultraviolet rays are used, a polarized light source or a non-polarized light source may be used. Further, in those cases where the polymerization is performed with the polymerizable compound-containing liquid crystal composition sandwiched between the two substrates, at least the substrate on the irradiated surface must have an appropriate level of transparency relative to the active energy rays. Furthermore, a technique may also be used in which a mask is used during the irradiation process so that only a specific portion of the composition is polymerized, the conditions such as the electric filed, magnetic field or temperature or the like are then altered to change the state of alignment of the unpolymerized portion, and additional active energy rays are then irradiated to complete the polymerization. Particularly in the case of exposure using ultraviolet rays, the ultraviolet exposure is preferably performed while an AC electric field is applied to the polymerizable compound-containing liquid crystal composition. The applied AC electric field preferably has an AC frequency of 10 Hz to 10 kHz, and a frequency of 60 Hz to 10 kHz is more preferable. The voltage is selected in accordance with the desired pretilt angle for the liquid crystal display device. In other words, the pretilt angle of the liquid crystal display device can be controlled using the applied voltage. In a horizontal electric field MVA mode liquid crystal display device, from the viewpoints of the alignment stability and the contrast, the pretilt angle is preferably controlled within a range from 80 degrees to 89.9 degrees.

The temperature during irradiation is preferably within a temperature range that maintains the liquid crystal state of the liquid crystal composition of the present invention. The polymerization is preferably performed at a temperature close to room temperature, typically within a range from 15 to 35° C. Examples of lamps that can be used to generate the ultraviolet rays include a metal halide lamp, a high-pressure mercury lamp, and an ultra high-pressure mercury lamp. Further the wavelength of the irradiated ultraviolet rays is preferably within a wavelength region outside of the absorption wavelength region for the liquid crystal composition, and if necessary, the ultraviolet rays may be cut prior to use. The intensity of the irradiated ultraviolet rays is preferably from 0.1 mW/cm$^2$ to 100 W/cm$^2$, and more preferably from 2 mW/cm$^2$ to 50 W/cm$^2$. The amount of energy of the irradiated ultraviolet rays may be adjusted as appropriate, but is preferably from 10 mJ/cm² to 500 J/cm², and is more preferably from 100 mJ/cm² to 200 J/cm². The intensity may be varied during the irradiation of the ultraviolet rays. The time of the ultraviolet irradiation may be selected appropriately in accordance with the intensity of the irradiated ultraviolet rays, but is preferably from 10 seconds to 3,600 seconds, and more preferably from 10 seconds to 600 seconds.

A liquid crystal display device using the liquid crystal composition of the present invention is a useful device which can have a fast response speed with good suppression of display defects, and is useful in active matrix driven liquid crystal display devices, and particularly effective for use in VA mode, PSVA mode, PSA mode, IPS mode, FSS mode and ECB mode liquid crystal display devices.

A preferred embodiment of a liquid crystal display apparatus according to the present invention is described below in detail with reference to the drawings.

FIG. 1 is a cross-sectional view illustrating a liquid crystal display device having two mutually opposing substrates, a sealing material provided between the substrates, and a liquid crystal that is injected into a sealed region surrounding by the sealing material.

A specific configuration of a liquid crystal display device is illustrated which includes a back plane in which a TFT layer 102 and a pixel electrode 103 are provided on a first substrate 100, and a passivation film 104 and a first alignment film 105 are then provided thereon, a front plane in which a black matrix 202, a color filter 203, a smoothing film (overcoat layer) 201 and a transparent electrode 204 are provided on a second substrate 200, a second alignment film 205 is provided thereon, and the resulting structure is then positioned facing the back plane, a sealing material 301 that is provided between the substrates, and a liquid crystal layer 303 that is injected into a sealed region surrounded by the sealing material, wherein protrusions (columnar spacers) 302 and 304 are provided on the surface of the substrate that contacts the sealing material 301.

There are no particular limitations on the material of the first substrate or the second substrate, provided the material is substantially transparent, and glass, ceramics and plastics and the like can be used. Examples of plastic substrates that can be used include cellulose and cellulose derivatives such as triacetyl cellulose and diacetyl cellulose, polycycloolefin derivatives, polyesters such as polyethylene terephthalate and polyethylene naphthalate, polyolefins such as polypropylene and polyethylene, polycarbonate, polyvinyl alcohol, polyvinyl chloride, polyvinylidene chloride, polyamide, polyimide, polyimide-amide, polystyrene, polyacrylate, poly(methyl methacrylate), polyethersulfone and polyarylate, as well as inorganic-organic composite materials such as glass fiber-epoxy resins and glass fiber-acrylic resins.

When a plastic substrate is used, a barrier film is preferably provided. The functions of the barrier film are to reduce the inherent moisture permeability of the plastic substrate and improve the reliability of the electrical properties of the liquid crystal display device. There are no particular limitations on the barrier film in so far as the barrier film exhibits high transparency and minimal water vapor permeability, and generally, a thin film of an inorganic material such as silicon oxide is formed by vapor deposition, sputtering or chemical vapor deposition (CVD) and is used.

In the present invention, the first substrate and the second substrate may be formed using the same material, or formed from different materials, and there are no particular limitations. The use of glass substrates is preferable in terms of producing a liquid crystal display device having excellent heat resistance and dimensional stability. Further, the use of plastic substrates is preferable in terms of being suitable for use in production methods employing roll-to-roll processing, and enabling the production of devices of reduced weight and improved flexibility. Further, if superior flatness and heat resistance are required, then good results can be obtained by using a combination of a plastic substrate and a glass substrate.

In the examples described below, substrates are used for the material for the first substrate 100 and the second substrate 200.

In the back plane, the TFT layer 102 and the pixel electrode 103 are provided on the first substrate 100. These components are produced using a typical array process. The passivation film 104 and the first alignment film 105 are then provided thereon to obtain the back plane.

The passivation film 104 (also referred to as an inorganic protective film) is a film that protects the TFT layer, and is usually produced by forming a nitride film (SiNx) or an oxide film (SiOx) or the like using a chemical vapor deposition (CVD) technique or the like.

Further, the first alignment film 105 is a film having a function of aligning the liquid crystal, and a polymer material such as a polyimide is often used. An alignment agent solution composed of the polymer material and a solvent is used as the coating solution. Because the alignment film can sometimes inhibit the bonding strength with the sealing material, patterned coating is used inside the sealed region. A printing method such as flexographic printing or a liquid droplet discharge method such as an inkjet method can be used for applying the coating solution. The applied alignment agent solution is subjected to preliminary drying to evaporate the solvent, and is then baked to effect cross-linking and curing. Subsequently, alignment processing is performed to realize the alignment function.

Alignment processing is usually performed by a rubbing method. A liquid crystal alignment capability is generated by rubbing the polymer film formed in the manner described above in a single direction with a rubbing cloth formed from a fiber such as rayon.

Further, a photoalignment method may also be used. A photoalignment method is a method in which an alignment capability is generated by irradiating a polarized light onto an alignment film containing an organic material having photosensitivity, and does not suffer from the type of substrate damage or dust that can be generated by the rubbing method. Examples of the organic material used in the photoalignment method include materials containing a dichroic dye. Examples of compounds that can be used as the dichroic dye include compounds having a group (hereafter referred to as the photoalignment group) that causes a photoreaction which acts as the origin of the liquid crystal alignment capability, such as a molecular alignment-inducing or isomerization reaction caused by the Weigert effect arising from photodichroism (example: azobenzene group), a dimerization reaction (example: cinnamoyl group), a photo-crosslinking reaction (example: benzophenone group) or a photodecomposition reaction (example: polyimide group). By subjecting the applied alignment agent solution to preliminary drying to evaporate the solvent, and then performing irradiation with light having an arbitrary polarization (polarized light), an alignment film having an alignment function in an arbitrary direction can be obtained.

In the opposing front plane, the black matrix 202, the color filter 203, the smoothing film 201, the transparent electrode 204 and the second alignment film 205 are provided on the second substrate 200.

The black matrix 202 is formed, for example, by the pigment dispersion method. Specifically, a colored resin liquid which has a black colorant dispersed uniformly therein and is used for forming the black matrix is applied to the second substrate 200 having the barrier film 201 formed thereon, thereby forming a colored layer. Subsequently, the colored layer is baked and cured. A photoresist is then applied and prebaked. The photoresist is exposed through a mask pattern and developing is then performed to pattern the colored layer. Subsequently, the photoresist layer is stripped away, and the colored layer is baked to complete preparation of the black matrix 202.

Alternatively, a photoresist-type pigment dispersion may be used. In this case, the photoresist-type pigment dispersion is applied, prebaked, subsequently exposed through a mask pattern, and then developed in order to pattern the colored layer. Subsequently, the photoresist layer is stripped away, and the colored layer is baked to complete preparation of the black matrix 202.

The color filter 203 is prepared by a pigment dispersion method, an electrodeposition method, a printing method or a staining method or the like. Using the pigment dispersion method as an example, a colored resin liquid containing a pigment (such as a red pigment) dispersed uniformly therein is applied to the second substrate 200, and following baking and curing, a photoresist is applied and prebaked. The photoresist is exposed through a mask pattern and then developed to effect patterning. Subsequently, the photoresist layer is stripped away, and a second baking operation is performed to complete preparation of the (red) color filter 203 (203a). There are no particular limitations on the sequence in which the various colors are formed. A green color filter 203 (203b) and a blue color filter 203 (203c) are formed in a similar manner.

The transparent electrode 204 is provided on top of the color filter 203 (if necessary, an overcoat layer (201) may be provided on top of the color filter 203 to smooth the surface). The transparent electrode 204 preferably has a high light transmittance, and preferably has a small electrical resistance. The transparent electrode 204 is formed from an oxide film such as ITO by a sputtering method or the like.

Further, in some cases a passivation film may be provided on the transparent electrode 204 for the purpose of protecting the transparent electrode 204.

The second alignment film 205 is the same as the first alignment film 105 described above.

Descriptions of specific configurations of the back plane and the front plane used in the present invention have been provided above, but the present invention is not limited to these specific configurations, and alterations to these configurations can be made freely in accordance with the desired liquid crystal display device.

There are no particular limitations on the shape of the aforementioned columnar spacers, and the horizontal cross-sectional shape may be a variety of shapes including circles, squares and polygons, but in consideration of ensuring a favorable misalignment margin during fabrication, the horizontal cross-sectional shape is preferably circular or a regular polygon shape. Further, the shapes of the protrusions may be circular truncated cones or truncated pyramids.

There are no particular limitations on the material used for forming the columnar spacers, provided the material does not dissolve in the sealing material, the organic solvent used in the sealing material, or the liquid crystal, but from the viewpoints of processability and weight reduction, a synthetic resin (curable resin) is preferable. On the other hand, the protrusions can be provided on the surface of the first substrate that contacts the sealing material by employing a photolithography method or a liquid droplet discharge method. For these reasons, a photocurable resin that is suitable for use with a photolithography method or a liquid droplet discharge method is preferably used.

Figure 2:
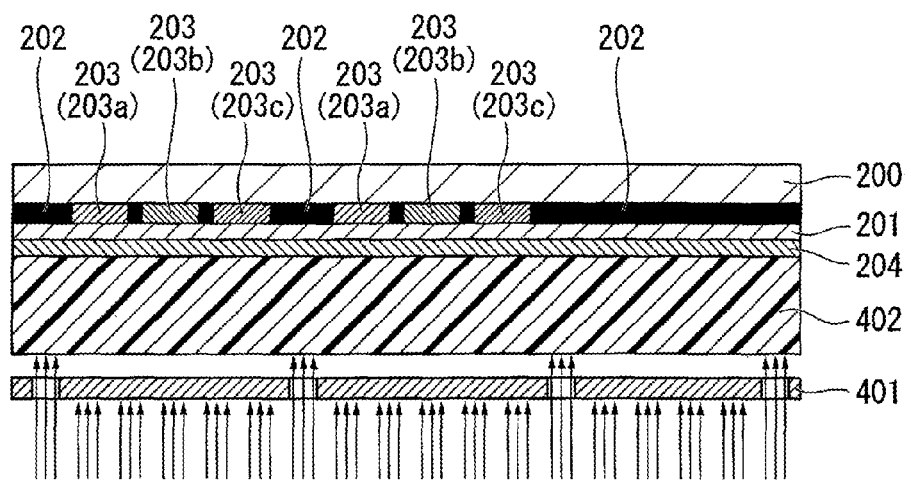
FIG. 2 is a diagram illustrating an exposure treatment step which uses a columnar spacer-generating pattern formed on a black matrix as a photomask pattern.

The case in which a photolithography method is used to form the columnar spacers is described below as an example. FIG. 2 is a diagram illustrating an exposure treatment step which uses a columnar spacer-generating pattern formed on a black matrix as a photomask pattern.

A resin liquid (containing no colorant) for forming the columnar spacers is applied to the transparent electrode 204 of the aforementioned front plane. Subsequently, the resin layer 402 is baked and cured. A photoresist is then applied to the resin layer 402 and prebaked. Following exposure of the photoresist through a mask pattern 401, developing is performed to pattern the resin layer. The photoresist layer is then stripped away, and the resin layer is baked to complete preparation of the columnar spacers (302 and 304 in FIG. 1).

The positions in which the columnar spacers are formed can be set at desired positions by the mask pattern. Accordingly, the columnar spacers can be created simultaneously at the inside of the sealed region and the region outside the sealed region (the portion where the sealing material is applied) of the liquid crystal display device. Further, in order to ensure that the columnar spacers do not lower the quality of the sealed region, the spacers are preferably formed so as to be positioned on top of the black matrix. The columnar spacers prepared in this manner by a photolithography method are also referred to as photo spacers.

Examples of the material used for the spacers include negative type water-soluble resins such as PVA-Stilbazo photosensitive resins, and mixtures of a polyfunctional acrylic monomer, an acrylic acid copolymer, a triazole-based initiator and the like. An alternative method uses a color resin prepared by dispersing a colorant in a polyimide resin. There are no particular limitations in the present invention, and the spacers can be formed from a conventional material that exhibits good compatibility with the liquid crystal and the sealing material that are used.

Following provision of the columnar spacers on the surface of the front plane that becomes part of the sealed region, the sealing material (301 in FIG. 1) is applied to the surface of the back plane that contacts the sealing material.

There are no particular limitations on the material for the sealing material, and a curable resin composition prepared by adding a polymerization initiator to an epoxy-based or acrylic-based photocurable resin, heat curable resin, or light and heat curable resin is typically used. Further, in order to control the moisture permeability, the elastic modulus and the viscosity and the like, a filler composed of an inorganic substance or an organic substance may sometimes be added. There are no particular limitations on the shape of these fillers, and spherical, fibrous or amorphous fillers may be used. Moreover, in order to ensure favorable control of the cell gap, a spherical or fibrous gap material having a monodisperse diameter may be mixed into the resin composition, or a fibrous substance that readily entangles itself around the protrusions on the substrate, thereby increasing the adhesion to the substrate, may also be mixed into the composition. The fibrous substance used preferably has a diameter that is approximately ⅕ to 1/10 of the cell gap, and the length of the fibrous substance is preferably shorter than the width across which the sealing material is applied.

Further, there are no particular limitations on the material used for the fibrous substance, provided the desired shape can be obtained, and for example, synthetic fibers such as cellulose, polyamide and polyester, or inorganic materials such as glass or carbon can be selected as appropriate.

The method used for applying the sealing material may be a printing method or a dispensing method, but a dispensing method which uses a smaller amount of the sealing material is preferable. The position to which the sealing material is applied is usually on the black matrix, in order to avoid any adverse effect on the sealed region. In order to form the liquid crystal drop region for the subsequent step (and prevent leakage of the liquid crystal), the sealing material is applied in the shape of a closed loop.

The liquid crystal is dropped into the front plane closed loop shape (sealed region) formed by application of the sealing material. A dispenser is usually used. In order to ensure that the amount of the dropped liquid crystal matches the volume of the liquid crystal cell, the basic volume is the same as that obtained by multiplying the height of the columnar spacers by the surface area of the sealed region. However, in order to prevent liquid crystal leakage during the cell bonding step and optimize the display properties, the amount of the liquid crystal that is dropped may be adjusted appropriately, and the liquid crystal dropping position may also be dispersed in some cases.

Next, the back plane is bonded to the front plane having the sealing material applied thereto and the liquid crystal dropped thereon. Specifically, the front plane and the back plane are attached to stages which have a mechanism for retaining substrates such as an electrostatic chuck, and the second alignment film of the front plane and the first alignment film of the back plane are disposed facing each other at positions (a separation distance) where the sealing material and the other substrate do not make contact. In this state, the inside of the system is then evacuated to reduced pressure. Following completion of the evacuation, the positions of the two substrates are adjusted (alignment operation) with ongoing confirmation of the bonding positions of the front plane and the back plane. Following completion of this bonding position adjustment, the substrates are brought closer together until the sealing material on the front plane contacts the back plane, and in this state, an inert gas is introduced into the system to gradually release the reduced pressure state and return the system to normal pressure. At this time, the front plane and the back plane are bonded together by the atmospheric pressure, and the cell gap is formed by the height of the columnar spacers. Ultraviolet rays are then irradiated onto the sealing material in this state, thereby curing the sealing material and forming the liquid crystal cell. Subsequently, a heating step may sometimes be added to accelerate the curing of the sealing material. A heating step is often added to improve the adhesive strength of the sealing material and the reliability of the electrical properties.

EXAMPLES

The present invention is described below in further detail using a series of examples, but the present invention is in no way limited by these examples. Further, in the compositions of the following examples and comparative examples, the units "%" refer to "% by mass".

In the examples, the properties measured were as follows.
Tni: nematic phase-isotropic liquid phase transition temperature (° C.)
$\Delta n$: refractive index anisotropy at 295 K (alternative name: birefringence)
$\Delta \varepsilon$: dielectric anisotropy at 295 K
$\eta$: viscosity at 295 K (mPa·s)
$\gamma 1$: rotational viscosity at 295 K (mPa·s)

VHR: voltage holding rate (%) at 313 K under conditions including a frequency of 60 Hz and an applied voltage of 5 V.
Burn-in:
Evaluation of the burn-in of a liquid crystal display device was performed by displaying a predetermined fixed pattern within the display area for 1,440 hours, and then visually evaluating the level of the afterimage of the fixed pattern when the entire screen was switched to a uniform display, using the 4-grade evaluation described below.
A: no afterimage.
B: very faint afterimage, but of a permissible level.
C: afterimage present at an impermissible level.
D: afterimage present, causing significant image degradation.
Volatility/Contamination of Production Apparatus:
Evaluation of the volatility of the liquid crystal material was performed by observing the material while illuminating the operational state of a vacuum agitation defoaming mixer with a stroboscope, and visually determining the degree of foaming of the liquid crystal material. Specifically, 0.8 kg of the liquid crystal composition was placed in the dedicated container of a vacuum agitation defoaming mixer having a capacity of 2.0 L, the vacuum agitation defoaming mixer was operated under degassing conditions of 4 kPa, an orbital velocity of 15 $S^{-1}$ and a rotational velocity of 7.5 $S^{-1}$, and the time taken for foaming to start was evaluated using the following 4-grade evaluation.
A: three or more minutes were needed before foaming started. The probability of apparatus contamination caused by volatilization is low.
B: foaming started after at least 1 minute but less than 3 minutes. There is some concern about light apparatus contamination caused by volatilization.
C: foaming started after at least 30 seconds but less than 1 minute. Apparatus contamination caused by volatilization occurs.
D: foaming started within 30 seconds. There is a danger of major apparatus contamination caused by volatilization.
Process Compatibility:
The process compatibility in the ODF process was evaluated by performing 100,000 repetitions of a process of dropping 40 pL of the liquid crystal per repetition using a constant volume measuring pump, and then evaluating changes in the liquid crystal volume after each 200 repetitions, namely 0 to 200 repetitions, 201 to 400 repetitions, 401 to 600 repetitions, . . . through to 99,801 to 10,000 repetitions, using the following 4-grade evaluation.
A: extremely little change (meaning liquid crystal display devices can be produced with good stability).
B: slight change, but of a permissible level.
C: some change, and of an impermissible level (causing a worsening in yield due to spot formation).
D: change occurs, with significant degradation (occurrence of liquid crystal leakage and vacuum foaming).
Solubility at Low Temperature:
Evaluation of the solubility at low temperature was performed by preparing the liquid crystal composition, weighing 0.5 g of the liquid crystal composition into a 1 mL sample vial, subjecting the vial to continuous temperature variation in a temperature control test tank, wherein a single cycle of the temperature variation involved [−20° C. (hold for 1 hour)→ increase temperature (0.2° C./minute)→0° C. (hold for 1 hour)→increase temperature (0.2° C./minute)→20° C. (hold for 1 hour)→reduce temperature (−0.2° C./minute)→0° C. (hold for 1 hour)→reduce temperature (−0.2° C./minute)→ −20° C.], visually observing the occurrence of precipitation from the liquid crystal composition, and evaluating the solubility using the following 4-grade evaluation.

A: precipitation was not observed for at least 600 hours.
B: precipitation was not observed for at least 300 hours.
C: precipitation was observed within 150 hours.
D: precipitation was observed within 75 hours.

Example 1

The composition shown below was prepared. The physical properties of the composition of Example 1 are shown in Table 1.

TABLE 1

|  | Example 1 |
| --- | --- |
| Tni/° C. | 68.0 |
| Δn | 0.119 |
| Δε | 6.09 |
| η/mPa · s | 17.7 |

| Example 1 | | |
| --- | --- | --- |
| Chemical structure | | Ratio |
| 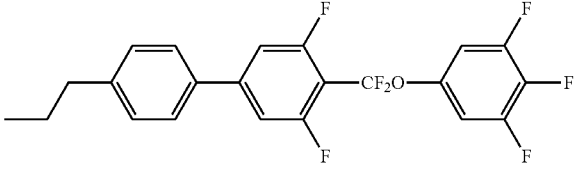 | (26.2) | 10% |
| 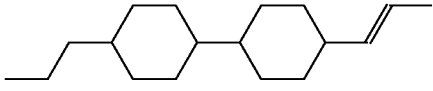 | (1.3) | 20% |
| 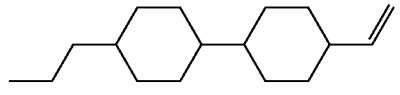 | (2.2) | 32% |
| 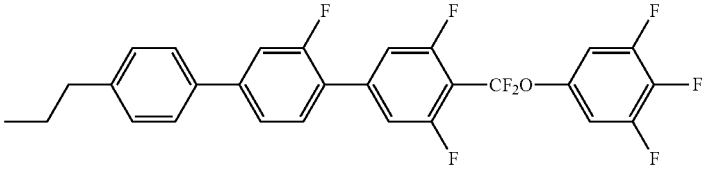 | (45.2) | 7% |
| 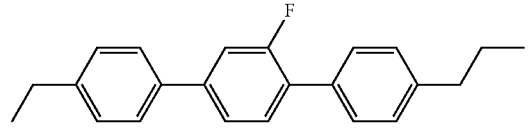 | (i-1) | 7% |
|  | (5.4) | 10% |
| 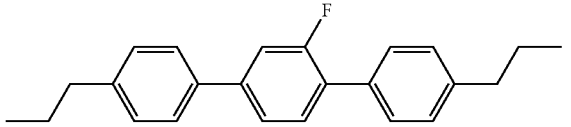 [SMILES: CCCc1ccc(-c2ccc(-c3ccc(CCC)cc3)c(F)c2)cc1] | (ii-1) | 7% |
| 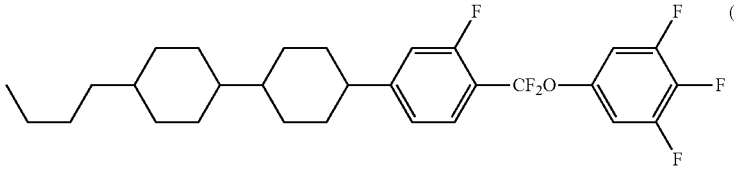 | (42.3) | 7% |

Comparative Example 1

The composition shown below, which did not include a compound represented by general formula (i), was prepared. The physical properties of the composition of Comparative Example 1 are shown in Table 2.

Comparative Example 2

The composition shown below, which did not include a compound represented by general formula (ii), was prepared. The physical properties of the composition of Comparative Example 2 are shown in Table 3.

| Comparative Example1 | | |
|---|---|---|
| Chemical structure | | Ratio |
| [propyl-biphenyl-(F,F)-CF₂O-(F,F)-phenyl-F] | (26.2) | 10% |
| [propyl-cyclohexyl-cyclohexyl-vinyl] | (1.3) | 20% |
| [propyl-cyclohexyl-cyclohexyl-vinyl] | (2.2) | 32% |
| [propyl-phenyl-(F)-phenyl-(F,F)-phenyl-CF₂O-(F,F)-phenyl-F] | (45.2) | 7% |
| [methyl-biphenyl-butenyl] | (5.4) | 10% |
| [propyl-phenyl-phenyl-(F)-phenyl-propyl] | (ii-1) | 14% |
| [butyl-cyclohexyl-cyclohexyl-(F)-phenyl-CF₂O-(F,F)-phenyl-F] | (42.3) | 7% |

TABLE 2

| | Comparative Example 1 |
|---|---|
| Tni/° C. | 69.3 |
| Δn | 0.119 |
| Δε | 6.11 |
| η/mPa · s | 18.1 |

| Comparative Example 2 | | |
|---|---|---|
| Chemical structure | | Ratio |
| Propyl-phenyl-(3,5-difluoro)phenyl-CF₂O-(3,4,5-trifluoro)phenyl | (26.2) | 10% |
| Propyl-cyclohexyl-cyclohexyl-CH=CH₂ (vinyl) | (1.3) | 20% |
| Propyl-cyclohexyl-cyclohexyl-CH=CH₂ | (2.2) | 32% |
| Propyl-phenyl-(3-fluoro)phenyl-(2,6-difluoro)phenyl-CF₂O-(3,4,5-trifluoro)phenyl | (45.2) | 7% |
| Ethyl-phenyl-(2-fluoro)phenyl-phenyl-propyl | (i-1) | 14% |
| Methyl-phenyl-phenyl-CH₂CH₂CH=CH- | (5.4) | 10% |
| Butyl-cyclohexyl-cyclohexyl-(3-fluoro)phenyl-CF₂O-(3,4,5-trifluoro)phenyl | (42.3) | 7% |

TABLE 3

| | Comparative Example 2 |
|---|---|
| Tni/° C. | 66.6 |
| Δn | 0.119 |
| Δε | 6.04 |
| η/mPa·s | 17.5 |

Example 2

The composition shown below was prepared. The physical properties of the composition of Example 2 are shown in Table 4.

Example 2

| Chemical structure | | Ratio |
|---|---|---|
| [structure] | (26.2) | 10% |
| [structure] | (1.3) | 20% |
| [structure] | (2.2) | 32% |
| [structure] | (45.2) | 8% |
| [structure] | (i-1) | 9% |
| [structure] | (5.4) | 10% |
| [structure] | (ii-1) | 3% |
| [structure] | (42.3) | 8% |

TABLE 4

| | Example 2 |
|---|---|
| Tni/° C. | 68.4 |
| Δn | 0.118 |
| Δε | 6.44 |
| η/mPa·s | 18.7 |

Example 3

The composition shown below was prepared. The physical properties of the composition of Example 3 are shown in Table 5.

| Example 3 | | |
|---|---|---|
| Chemical structure | | Ratio |
| 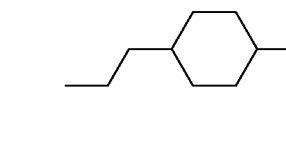 | (26.2) | 10% |
| 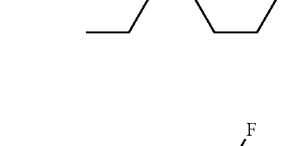 | (1.3) | 20% |
| 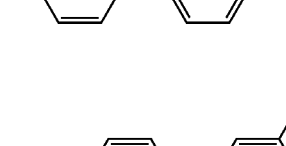 | (2.2) | 32% |
| 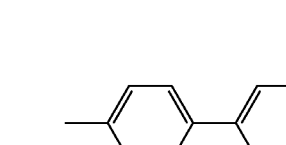 | (45.2) | 8% |
| 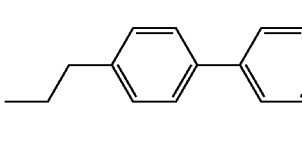 | (i-1) | 3% |
| 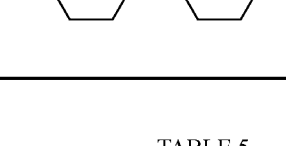 | (5.4) | 10% |
| 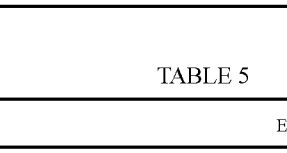 | (ii-1) | 9% |
|  | (42.3) | 8% |
TABLE 5
|  | Example 3 |
|---|---|
| Tni/° C. | 69.6 |
| Δn | 0.118 |
| Δε | 6.48 |
| η/mPa · s | 19.0 |

Example 4

The composition shown below was prepared. The physical properties of the composition of Example 4 are shown in Table 6.

| Example 4 | | |
|---|---|---|
| Chemical structure | Ratio | |
| [structure] | (26.2) | 10% |
| [structure] | (1.3) | 20% |
| [structure] | (2.2) | 32% |
| [structure] | (45.2) | 7% |
| [structure] | (i-1) | 4% |
| [structure] | (5.4) | 10% |
| [structure] | (ii-1) | 4% |
| [structure] | (42.3) | 7% |
| [structure] | (18.4) | 6% |

TABLE 6

| | Example 4 |
|---|---|
| Tni/° C. | 68.1 |
| Δn | 0.120 |
| Δε | 6.00 |
| η/mPa · s | 18.5 |

Example 5

The composition shown below was prepared. The physical properties of the composition of Example 5 are shown in Table 7.

| Example 5 | | |
|---|---|---|
| Chemical structure | | Ratio |
| [3-fluoro-4-(difluoromethyleneoxy-3,4,5-trifluorophenyl)-3',5'-difluoro-4'-propylbiphenyl] | (26.2) | 4% |
| [4-propyl-4'-vinyl-bicyclohexyl] | (1.3) | 4% |
| [4-propyl-4'-vinyl-bicyclohexyl] | (2.2) | 48% |
| [difluoromethyleneoxy terphenyl derivative] | (45.2) | 5% |
| [2-fluoro-4,4''-diethyl-terphenyl] | (i-1) | 8% |
| [trifluoromethoxy phenyl-cyclohexyl derivative] | (39.2) | 6% |
| [4-propyl-cyclohexyl-ethyl-biphenyl] | (15.1) | 7% |
| [4-methyl-4'-(but-2-enyl)biphenyl] | (5.4) | 8% |
| [2-fluoro-4,4''-dipropyl-terphenyl] | (ii-1) | 7% |

Example 5

| Chemical structure | | Ratio |
|---|---|---|
| 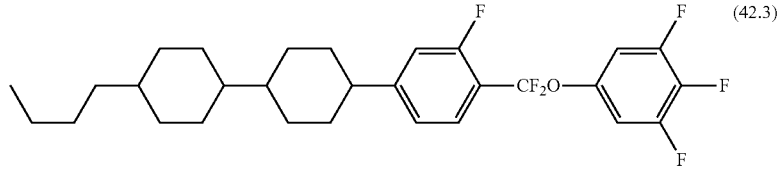 | (42.3) | 3% |

TABLE 7

| | Example 5 |
|---|---|
| Tni/° C. | 75.1 |
| Δn | 0.120 |
| Δε | 4.60 |
| η/mPa · s | 13.4 |

The compound represented by general formula (ii) has the same substituent at both terminals (wherein the side chain is a propyl group, or if the ring is also included, a 4-propylphenyl group) and is easy to produce, but is prone to precipitation during storage of the composition. In the compositions of Examples 1 to 5 which used the compound represented by general formula (i) in combination with the compound represented by general formula (ii), precipitation did not occur even when an evaluation of the solubility at low temperature was performed. In contrast, precipitation of the component compounds was observed in the composition of Comparative Example 1. In the composition of Comparative Example 1, which included the compound represented by general formula (ii) but not the compound represented by general formula (i), the Tni value, namely the nematic phase upper limit temperature, decreased.

Example of Liquid Crystal Display Apparatus

Using the liquid crystal composition described in Example 1, an IPS liquid crystal display apparatus with the structure illustrated in FIG. 1 and FIG. 2 was produced. This liquid crystal display apparatus had excellent display characteristics (see Table 8), and retained stable display characteristics over a long period of time.

TABLE 8

| | Example 1 | Example 2 | Example 3 |
|---|---|---|---|
| Initial voltage holding rate/% | 98.7 | 98.5 | 98.8 |
| Voltage holding rate after 1 hour at 150° C./% | 97.2 | 97.6 | 97.4 |
| Burn-in evaluation | A | A | A |
| Dropping mark defects evaluation | A | A | A |
| Process compatibility evaluation | A | A | A |
| Solubility at low temperature evaluation | A | A | A |

INDUSTRIAL APPLICABILITY

A composition which exhibits a positive Δε value and is stable relative to heat and light can be provided.

DESCRIPTION OF THE REFERENCE SIGNS

100: First substrate
102: TFT layer
103: Pixel electrode
104: Passivation film
105: First alignment film
200: Second substrate
201: Smoothing film (overcoat layer)
202: Black matrix
203: Color filter
204: Transparent electrode
205: Second alignment film
301: Sealing material
302: Protrusion (columnar spacer)
303: Liquid crystal layer
304: Protrusion (columnar spacer)
401: Mask pattern
402: Resin layer

The invention claimed is:

1. A composition comprising
    a compound represented by general formula (i) shown below,
    a compound represented by general formula (ii) shown below, and
    a compound represented by general formula (M) shown below:

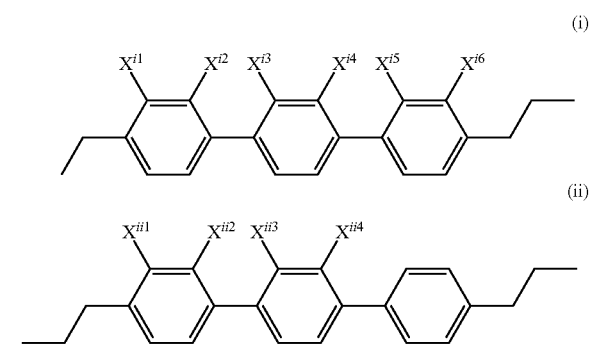

wherein each of $X^{i1}$ to $X^{i6}$ independently represents a hydrogen atom, a fluorine atom or a chlorine atom, in which at least one of $X^{i1}$ to $X^{i6}$ is a fluorine atom, and each of $X^{ii1}$ to $X^{ii4}$ independently represents a hydrogen atom, a fluorine atom or a chlorine atom, in which at least one of $X^{ii1}$ to $X^{ii4}$ is a fluorine atom; and

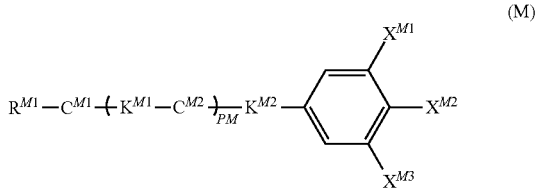

wherein $R^{M1}$ represents an alkyl group of 1 to 8 carbon atoms, and one —CH$_2$— group or two or more non-adjacent —CH$_2$— groups within the alkyl group may each be independently substituted with —CH=CH—, —C≡C—, —O—, —CO—, —COO— or —OCO—, PM represents 0, 1, 2, 3 or 4, each of $C^{M1}$ and $C^{M2}$ independently represents a group selected from the group consisting of:

(d) a 1,4-cyclohexylene group (wherein one —CH$_2$— group or two or more non-adjacent —CH$_2$— groups that exist within this group may each be substituted with —O— or —S—), and (e) a 1,4-phenylene group (wherein one —CH= group or two or more non-adjacent —CH= groups that exist within this group may each be substituted with —N=), and the group (d) and the group (e) may each be independently substituted with a cyano group, a fluorine atom or a chlorine atom, each of $K^{M1}$ and $K^{M2}$ independently represents a single bond, —CH$_2$CH$_2$—, —(CH$_2$)$_4$—, —OCH$_2$—, —CH$_2$O—, —OCF$_2$—, —CF$_2$O—, —COO—, —OCO— or —CC—, when PM represents 2, 3 or 4 and a plurality of $K^{M1}$ exists, the $K^{M1}$ may be identical or different, when PM represents 2, 3 or 4 and a plurality of $C^{M2}$ exists, the $C^{M2}$ may be identical or different, each of $X^{M1}$ and $X^{M3}$ independently represents a hydrogen atom, a chlorine atom or a fluorine atom, and $X^{M2}$ represents fluorine atom, chlorine atom, cyano group, trifluoromethyl group, fluoromethoxy group, difluoromethoxy group, trifluoromethoxy group or 2,2,2-trifluoroethyl group, wherein at least one of the compound represented by the general formula (M) in which at least one of $K^{M1}$ and $K^{M2}$ is —CF$_2$O— is included in the composition; and compounds represented by the general formula 26.2 and 45.2:

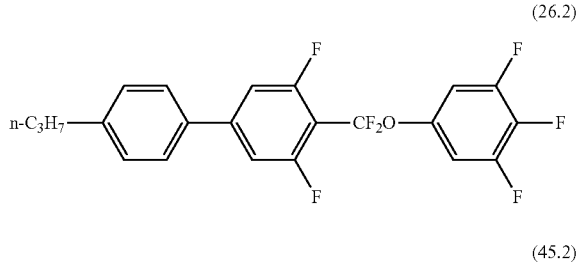

2. The composition according to claim 1, wherein an amount of the compound represented by general formula (i) is at least 3% by mass, and an amount of the compound represented by general formula (ii) is at least 3% by mass.

3. The composition according to claim 1, further comprising a compound represented by general formula (L) shown below:

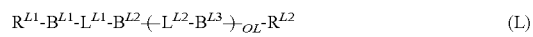

wherein each of $R^{L1}$ and $R^{L2}$ independently represents an alkyl group of 1 to 8 carbon atoms, and one —CH$_2$— group or two or more non-adjacent —CH$_2$— groups within the alkyl group may each be independently substituted with —CH=CH—, —C≡C—, —O—, —CO—, —COO— or —OCO—, OL represents 0, 1, 2 or 3, each of $B^{L1}$, $B^{L2}$ and $B^{L3}$ independently represents a group selected from the group consisting of:

(a) a 1,4-cyclohexylene group (wherein one —CH$_2$— group or two or more non-adjacent —CH$_2$— groups that exist within this group may each be substituted with —O—), and (b) a 1,4-phenylene group (wherein one —CH= group or two or more non-adjacent —CH= groups that exist within this group may each be substituted with —N=), and the group (a) and the group (b) may each be independently substituted with a cyano group, a fluorine atom or a chlorine atom, each of $L^{L1}$ and $L^{L2}$ independently represents a single bond, —CH$_2$CH$_2$—, —(CH$_2$)$_4$—, —OCH$_2$—, —CH$_2$O—, —COO—, —OCO—, —OCF$_2$—, —CF$_2$O—, —CH=N—N=CH—, —CH=CH—, —CF=CF— or —C≡C—, and when OL represents 2 or 3 and a plurality of $L^{L2}$ exists, the $L^{L2}$ may be identical or different, and when OL represents 2 or 3 and a plurality of $B^{L3}$ exists, the $B^{L3}$ may be identical or different, provided that the compound represented by general formula (L) excludes compounds represented by general formula (i) and compounds represented by general formula (ii).

4. A liquid crystal display device which uses the composition according to claim 1.

5. An IPS device which uses the composition according to claim 1.

6. An FFS device which uses the composition according to claim 1.

7. The composition according to claim 1, wherein an amount of the compound represented by general formula (i) is 3 to 30% by mass with respect to the total amount of the composition.

8. The composition according to claim 1, wherein an amount of the compound represented by general formula (ii) is 3 to 30% by mass with respect to the total amount of the composition.

9. The composition according to claim 1, wherein the composition is free of polymerizable compounds except for optionally a compound represented by general formula (XX) shown below:

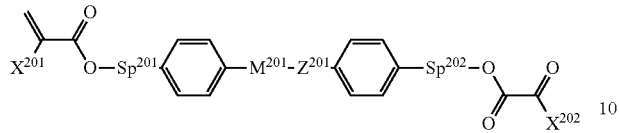

(XX)

wherein, each of $X^{201}$ and $X^{202}$ independently represents a hydrogen atom or a methyl group, each of $Sp^{201}$ and $S^{p202}$ independently represents a single bond, an alkylene group of 1 to 8 carbon atoms, or —O—$(CH_2)_s$— (wherein s represents an integer of 2 to 7, and the oxygen atom is bonded to the aromatic ring), $Z^{201}$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (wherein each of $Y^1$ and $Y^2$ independently represents a fluorine atom or a hydrogen atom), —C≡C—, or a single bond, $M^{201}$ represents a 1,4-phenylene group, a tran-1,4-cyclohexylene group or a single bond, and in all of the 1,4-phenylene groups within the formula, any arbitrary hydrogen atom may be substituted with a fluorine atom.

10. The composition according to claim 1, wherein at least one of $X^{i1}$, $X^{i2}$, $X^{i5}$ and $X^{i6}$ of the compound represented by general formula (i) represents a fluorine atom, and at least one of $X^{ii1}$ and $X^{ii2}$ of the compound represented by general formula (ii) represents a fluorine atom.

* * * * *